US008277921B2

(12) United States Patent
Imaeda et al.

(10) Patent No.: US 8,277,921 B2
(45) Date of Patent: Oct. 2, 2012

(54) HONEYCOMB STRUCTURE AND METHOD FOR MANUFACTURING THE SAME

(75) Inventors: Masaki Imaeda, Ibi-gun (JP); Hiroki Sato, Ibi-gun (JP)

(73) Assignee: Ibiden Co., Ltd., Ogaki-Shi (JP)

( * ) Notice: Subject to any disclaimer, the term of this patent is extended or adjusted under 35 U.S.C. 154(b) by 1022 days.

(21) Appl. No.: 12/250,633

(22) Filed: Oct. 14, 2008

(65) Prior Publication Data

US 2009/0130378 A1 May 21, 2009

(30) Foreign Application Priority Data

Nov. 21, 2007 (WO) .................. PCT/JP2007/072582

(51) Int. Cl.
*B01D 39/14* (2006.01)
*B32B 3/12* (2006.01)
*B32B 7/12* (2006.01)
*B29C 65/54* (2006.01)

(52) U.S. Cl. ......................................... 428/116; 55/524
(58) Field of Classification Search ................... 428/116
See application file for complete search history.

(56) References Cited

U.S. PATENT DOCUMENTS

| 5,914,187 | A | 6/1999 | Naruse et al. |
| 6,395,370 | B1 | 5/2002 | Noda et al. |
| 6,669,751 | B1 | 12/2003 | Ohno et al. |
| 7,112,233 | B2 | 9/2006 | Ohno et al. |
| 7,284,980 | B2 | 10/2007 | Saijo et al. |
| 7,309,370 | B2 | 12/2007 | Kudo et al. |
| 7,332,014 | B2 | 2/2008 | Ono et al. |
| 7,341,614 | B2 | 3/2008 | Hayashi et al. |
| 7,348,049 | B2 | 3/2008 | Yoshida |
| 7,387,829 | B2 | 6/2008 | Ohno et al. |
| 7,393,376 | B2 | 7/2008 | Taoka et al. |
| 7,396,586 | B2 | 7/2008 | Ohno et al. |
| 7,427,308 | B2 | 9/2008 | Taoka et al. |
| 7,427,309 | B2 | 9/2008 | Ohno et al. |
| 7,438,967 | B2 | 10/2008 | Fujita |
| 7,449,427 | B2 | 11/2008 | Ohno et al. |
| 7,462,216 | B2 | 12/2008 | Kunieda et al. |
| 7,473,465 | B2 | 1/2009 | Ohno et al. |
| 7,491,057 | B2 | 2/2009 | Saijo et al. |
| 7,498,544 | B2 | 3/2009 | Saijo et al. |

(Continued)

FOREIGN PATENT DOCUMENTS

EP 1440722 7/2004

(Continued)

*Primary Examiner* — David Sample
(74) *Attorney, Agent, or Firm* — Ditthavong Mori & Steiner, P.C.

(57) ABSTRACT

A honeycomb structure includes a ceramic block including a plurality of honeycomb fired bodies, a first adhesive layer, and a second adhesive layer. The plurality of honeycomb fired bodies includes center-portion honeycomb fired bodies located at a center portion in a cross-section perpendicular to the longitudinal direction and peripheral honeycomb fired bodies surrounding the center-portion honeycomb fired bodies. The first adhesive layer is interposed between the center-portion honeycomb fired bodies to connect the center-portion honeycomb fired bodies. The second adhesive layer is interposed between each of the center-portion honeycomb fired bodies and each of the peripheral honeycomb fired bodies and between the peripheral honeycomb fired bodies. An adhesive strength α between the center-portion honeycomb fired bodies bonded via the first adhesive layer is higher than an adhesive strength β between honeycomb fired bodies bonded via the second adhesive layer.

16 Claims, 23 Drawing Sheets

U.S. PATENT DOCUMENTS

| | | |
|---|---|---|
| 7,504,359 B2 | 3/2009 | Ogyu et al. |
| 7,520,178 B2 | 4/2009 | Ohno et al. |
| 7,524,350 B2 | 4/2009 | Kunieda |
| 7,540,898 B2 | 6/2009 | Oshimi |
| 7,543,513 B2 | 6/2009 | Kobayashi et al. |
| 7,550,026 B2 | 6/2009 | Hayakawa |
| 7,556,666 B2 | 7/2009 | Kunieda |
| 2004/0045267 A1 | 3/2004 | Ichikawa et al. |
| 2004/0093858 A1 | 5/2004 | Aoki |
| 2004/0161596 A1 | 8/2004 | Taoka et al. |
| 2004/0258582 A1 | 12/2004 | Miwa et al. |
| 2005/0102984 A1 | 5/2005 | Bardon et al. |
| 2005/0109023 A1 | 5/2005 | Kudo et al. |
| 2005/0153099 A1 | 7/2005 | Yamada |
| 2005/0169819 A1 | 8/2005 | Shibata |
| 2005/0175514 A1 | 8/2005 | Ohno |
| 2005/0180898 A1 | 8/2005 | Yamada |
| 2005/0247038 A1 | 11/2005 | Takahashi |
| 2005/0272602 A1 | 12/2005 | Ninomiya |
| 2006/0029898 A1 | 2/2006 | Saijo et al. |
| 2006/0043652 A1 | 3/2006 | Saijo et al. |
| 2006/0051556 A1 | 3/2006 | Ohno et al. |
| 2006/0073970 A1 | 4/2006 | Yamada |
| 2006/0108347 A1 | 5/2006 | Koyama et al. |
| 2006/0118546 A1 | 6/2006 | Saijo |
| 2006/0210765 A1 | 9/2006 | Ohno et al. |
| 2006/0216466 A1 | 9/2006 | Yoshida |
| 2006/0216467 A1 | 9/2006 | Yoshida |
| 2006/0222812 A1 | 10/2006 | Koyama et al. |
| 2006/0225390 A1 | 10/2006 | Yoshida |
| 2006/0269722 A1 | 11/2006 | Yamada |
| 2007/0020155 A1 | 1/2007 | Ohno et al. |
| 2007/0028575 A1 | 2/2007 | Ohno et al. |
| 2007/0068128 A1 | 3/2007 | Oshimi et al. |
| 2007/0085233 A1 | 4/2007 | Yamada |
| 2007/0116908 A1 | 5/2007 | Ohno et al. |
| 2007/0126160 A1 | 6/2007 | Takahashi |
| 2007/0128405 A1 | 6/2007 | Sakaguchi et al. |
| 2007/0130897 A1 | 6/2007 | Sakaguchi et al. |
| 2007/0144561 A1 | 6/2007 | Saijo et al. |
| 2007/0148403 A1 | 6/2007 | Yamamura et al. |
| 2007/0152382 A1 | 7/2007 | Yamada et al. |
| 2007/0175060 A1 | 8/2007 | Idei et al. |
| 2007/0178275 A1 | 8/2007 | Takahashi |
| 2007/0187651 A1 | 8/2007 | Naruse et al. |
| 2007/0190350 A1 | 8/2007 | Ohno et al. |
| 2007/0196620 A1 | 8/2007 | Ohno et al. |
| 2007/0199205 A1 | 8/2007 | Hoshino et al. |
| 2007/0199643 A1 | 8/2007 | Kawai et al. |
| 2007/0212517 A1 | 9/2007 | Ohno et al. |
| 2007/0235895 A1 | 10/2007 | Yamamura et al. |
| 2007/0243283 A1 | 10/2007 | Yamamura et al. |
| 2007/0262497 A1 | 11/2007 | Yamamura et al. |
| 2007/0262498 A1 | 11/2007 | Saijo et al. |
| 2007/0277655 A1 | 12/2007 | Kawai et al. |
| 2007/0293392 A1 | 12/2007 | Ohno et al. |
| 2008/0006971 A1 | 1/2008 | Kawai et al. |
| 2008/0067725 A1 | 3/2008 | Naruse et al. |
| 2008/0084010 A1 | 4/2008 | Naruse et al. |
| 2008/0088072 A1 | 4/2008 | Kobayashi |
| 2008/0106008 A1 | 5/2008 | Kasai et al. |
| 2008/0106009 A1 | 5/2008 | Naruse et al. |
| 2008/0111274 A1 | 5/2008 | Kawai et al. |
| 2008/0116200 A1 | 5/2008 | Kawai et al. |
| 2008/0116601 A1 | 5/2008 | Naruse et al. |
| 2008/0120950 A1 | 5/2008 | Ohno et al. |
| 2008/0136053 A1 | 6/2008 | Kuribayashi et al. |
| 2008/0136062 A1 | 6/2008 | Kasai et al. |
| 2008/0138567 A1 | 6/2008 | Ninomiya et al. |
| 2008/0150200 A1 | 6/2008 | Tajima |
| 2008/0157445 A1 | 7/2008 | Kawai et al. |
| 2008/0160249 A1 | 7/2008 | Makino |
| 2008/0174039 A1 | 7/2008 | Saijo et al. |
| 2008/0179781 A1 | 7/2008 | Iwata |
| 2008/0190081 A1 | 8/2008 | Oshimi |
| 2008/0190083 A1 | 8/2008 | Oshimi |
| 2008/0197544 A1 | 8/2008 | Saijo et al. |
| 2008/0211127 A1 | 9/2008 | Naruse et al. |
| 2008/0213485 A1 | 9/2008 | Shibata |
| 2008/0236115 A1 | 10/2008 | Sakashita |
| 2008/0236122 A1 | 10/2008 | Ito |
| 2008/0236724 A1 | 10/2008 | Higuchi |
| 2008/0237942 A1 | 10/2008 | Takamatsu |
| 2008/0241015 A1 | 10/2008 | Kudo et al. |
| 2008/0241444 A1 | 10/2008 | Oshimi |
| 2008/0241466 A1 | 10/2008 | Saito et al. |
| 2008/0241501 A1* | 10/2008 | Ohno et al. ............... 428/305.5 |
| 2008/0251977 A1 | 10/2008 | Naruse et al. |
| 2008/0284067 A1 | 11/2008 | Naruse et al. |
| 2008/0305259 A1 | 12/2008 | Saijo |
| 2008/0318001 A1 | 12/2008 | Sakakibara |
| 2009/0004431 A1 | 1/2009 | Ninomiya |
| 2009/0079111 A1 | 3/2009 | Kasai et al. |
| 2009/0107879 A1 | 4/2009 | Otsuka et al. |
| 2009/0130378 A1 | 5/2009 | Imaeda et al. |

FOREIGN PATENT DOCUMENTS

| | | |
|---|---|---|
| EP | 1975139 | 10/2008 |
| JP | 2000-007455 | 1/2000 |
| JP | 2001-206780 | 7/2001 |
| JP | 2002-273130 | 9/2002 |
| JP | 2003-117322 | 4/2003 |
| JP | 2003-254034 | 9/2003 |
| JP | 2004-262670 | 9/2004 |
| JP | 2007-144365 | 6/2007 |
| JP | 2007-204360 | 8/2007 |

* cited by examiner

A-A line cross-sectional view

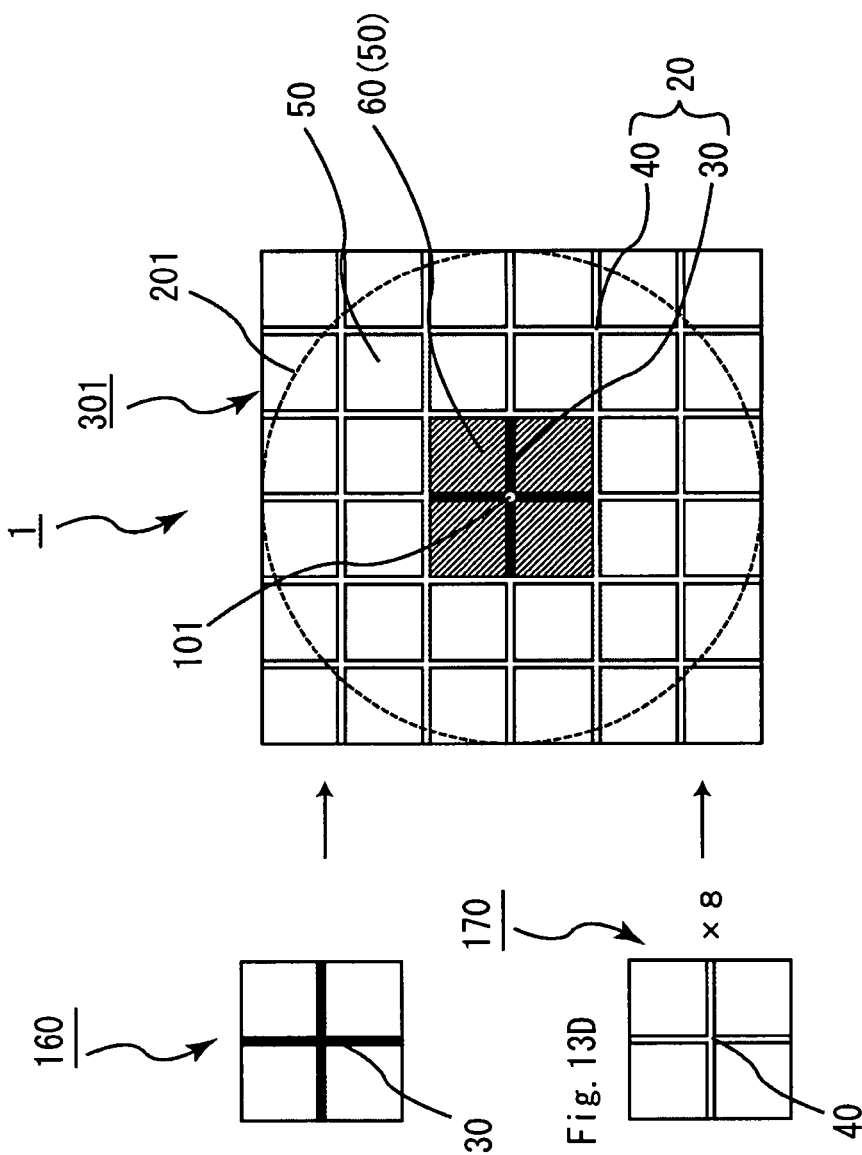

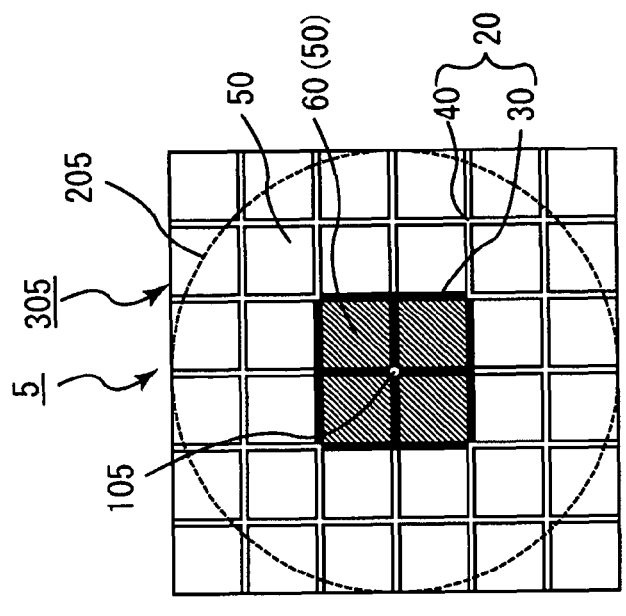
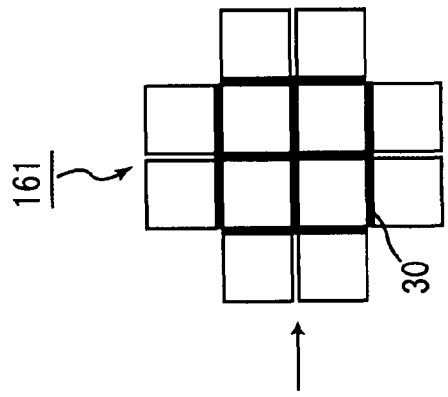
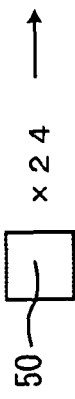
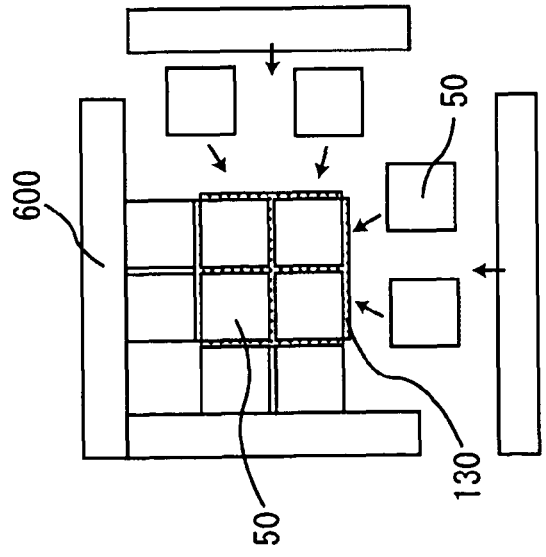
Fig. 14D
Fig. 14B
Fig. 14C
Fig. 14A

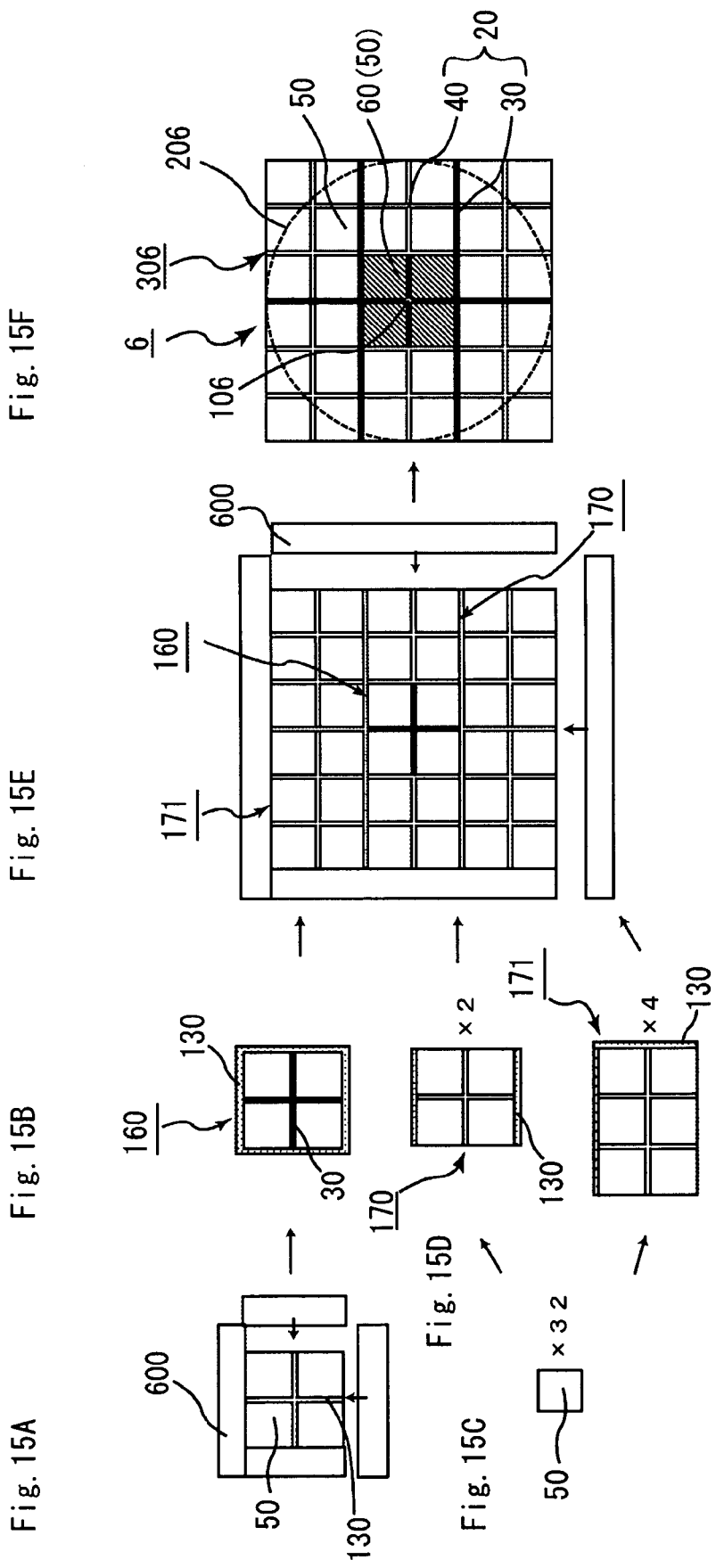

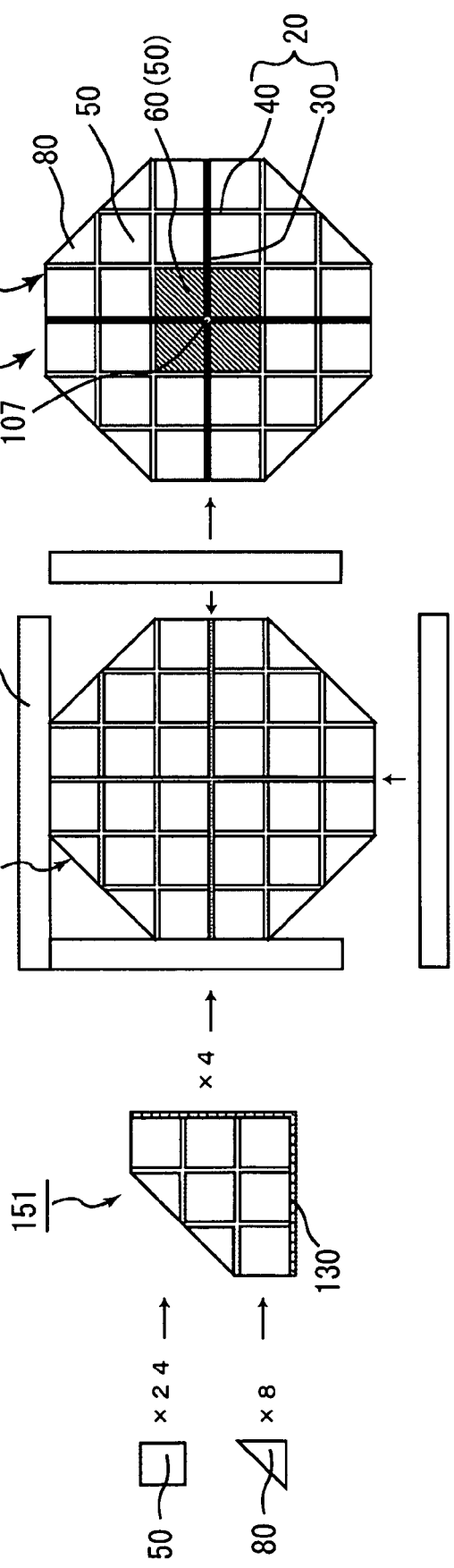

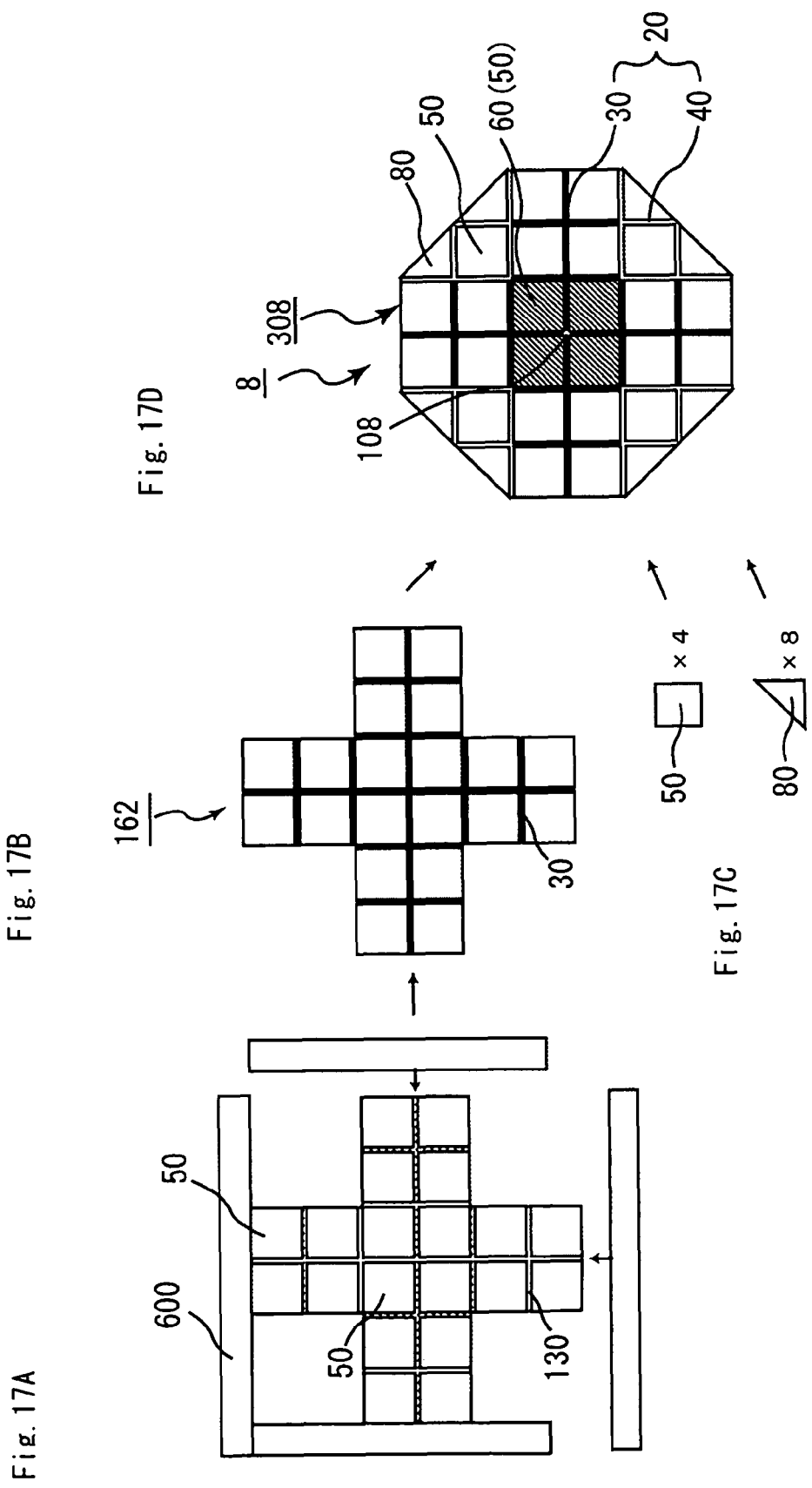

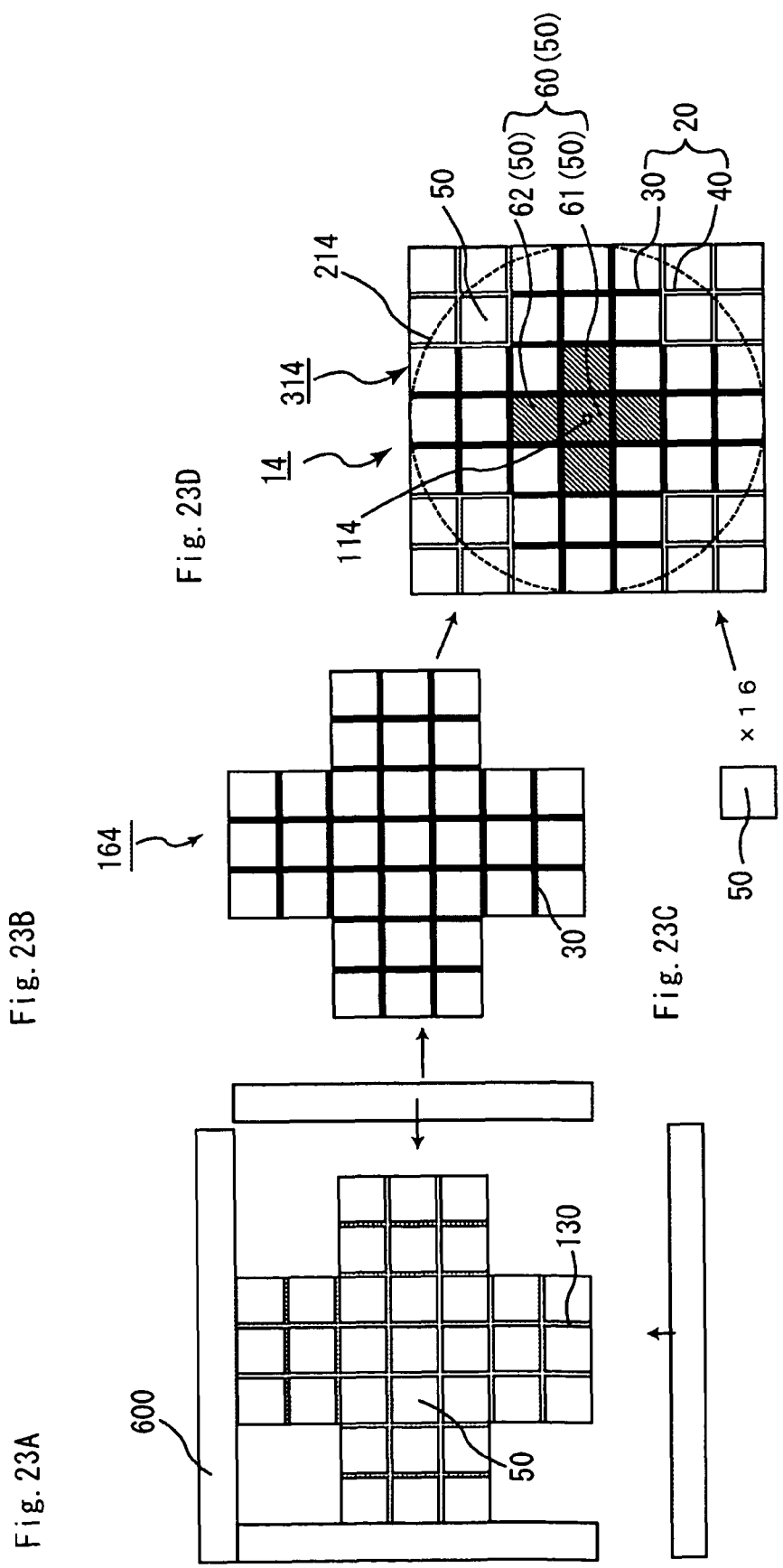

HONEYCOMB STRUCTURE AND METHOD FOR MANUFACTURING THE SAME

CROSS-REFERENCE TO RELATED APPLICATIONS

The present application claims priority under 35 U.S.C. §119 to PCT Application No. PCT/JP2007/072582, filed Nov. 21, 2007, the contents of which are incorporated herein by reference in their entirety.

BACKGROUND OF THE INVENTION

1. Field of the Invention

The present invention relates to a honeycomb structure and a method for manufacturing the honeycomb structure.

2. Discussion of the Background

In recent years, particulate matter (hereinafter, also referred to as PM) such as soot contained in exhaust gases discharged from internal combustion engines of vehicles such as buses and trucks, construction machines and the like, and other harmful contaminants have raised serious problems to the environment and the human body.

For this reason, various porous ceramic honeycomb structures have been proposed as filters that capture PM in exhaust gases and purify the exhaust gases and also as a catalyst supporting carriers that convert contaminants in exhaust gases by allowing the exhaust gases to pass through the inside of the honeycomb structures.

With respect to such a honeycomb structure, there has been known an aggregated honeycomb structure formed by combining a plurality of pillar-shaped honeycomb fired bodies each having a large number of cells placed in parallel with one another in the longitudinal direction. In such an aggregated honeycomb structure, an adhesive layer is formed on each of side faces of the honeycomb fired bodies, and the respective honeycomb fired bodies are bonded to one another with the adhesive layer interposed therebetween.

Several methods have been disclosed as a method for combining the honeycomb fired bodies during the manufacturing process of the aggregated honeycomb structure.

JP-A 2004-262670 has disclosed a method for joining a honeycomb structure in which a plurality of honeycomb fired bodies (honeycomb segments) are laminated with an adhesive layer interposed therebetween and the entire laminated honeycomb fired bodies are pressurized at the same time to carry out the bonding process. JP-A 2004-262670 has disclosed that, use of this method for joining a honeycomb structure allows the respective honeycomb fired bodies to be joined to one another uniformly with a desired adhesive strength regardless of the order in the stacking process.

Moreover, JP-A 2000-7455 has disclosed a method for joining honeycomb fired bodies (ceramic structured bodies) in which vibrations as well as a pressing force are applied to honeycomb fired bodies to join honeycomb fired bodies to one another. JP-A 2000-7455 has disclosed that the application of vibrations as described above permits manufacturing a honeycomb structure configured with the honeycomb fired bodies bonded with a high adhesive strength.

The contents of JP-A 2004-262670 and JP-A 2000-7455 are incorporated herein by reference in their entirety.

SUMMARY OF THE INVENTION

According to one aspect of the present invention, a honeycomb structure includes a ceramic block which includes a plurality of honeycomb fired bodies, a first adhesive layer, and a second adhesive layer. Each of the plurality of honeycomb fired bodies has a plurality of cell walls extending along the longitudinal direction to define a plurality of cells. The plurality of honeycomb fired bodies include center-portion honeycomb fired bodies located at a center portion in a cross-section perpendicular to the longitudinal direction and peripheral honeycomb fired bodies surrounding the center-portion honeycomb fired bodies. The first adhesive layer is interposed between the center-portion honeycomb fired bodies to connect the center-portion honeycomb fired bodies. The second adhesive layer is interposed between each of the center-portion honeycomb fired bodies and each of the peripheral honeycomb fired bodies and between the peripheral honeycomb fired bodies. An adhesive strength $\alpha$ between the center-portion honeycomb fired bodies bonded via the first adhesive layer is higher than an adhesive strength $\beta$ between honeycomb fired bodies bonded via the second adhesive layer.

According to another aspect of the present invention, a method for manufacturing a honeycomb structure which includes a ceramic block includes molding a ceramic raw material to produce a plurality of honeycomb molded bodies each having a plurality of cell walls extending along a longitudinal direction of the ceramic block to define a plurality of cells. The plurality of honeycomb molded bodies are fired to produce a plurality of honeycomb fired bodies. A first adhesive layer is provided with an adhesive strength $\alpha$ in first spaces between center-portion honeycomb fired bodies to bond center-portion honeycomb fired bodies each other to produce the ceramic block. The center-portion honeycomb fired bodies are located at a center portion of a cross-section perpendicular to the longitudinal direction. A second adhesive layer is provided with an adhesive strength $\beta$ in second spaces between honeycomb fired bodies other than the first spaces to produce the ceramic block. The adhesive strength $\alpha$ is higher than the adhesive strength $\beta$.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIGS. 12A to 12D are explanatory views that schematically show one example of a method for manufacturing a honeycomb structure of the second embodiment.

FIGS. 13A to 13E are explanatory views that schematically show one example of a method for manufacturing a honeycomb structure of the third embodiment.

FIGS. 14A to 14D are explanatory views that schematically show one example of a method for manufacturing a honeycomb structure of the fourth embodiment.

FIGS. 15A to 15F are explanatory views that schematically show one example of a method for manufacturing a honeycomb structure of the fifth embodiment.

FIGS. 16A to 16D are explanatory views that schematically show one example of a method for manufacturing a honeycomb structure of the sixth embodiment.

FIGS. 17A to 17D are explanatory views that schematically show one example of a method for manufacturing a honeycomb structure of the seventh embodiment.

FIGS. 23A to 23D are explanatory views that schematically show one example of the method for manufacturing a honeycomb structure of the thirteenth embodiment.

DESCRIPTION OF THE EMBODIMENTS

Figure 1:
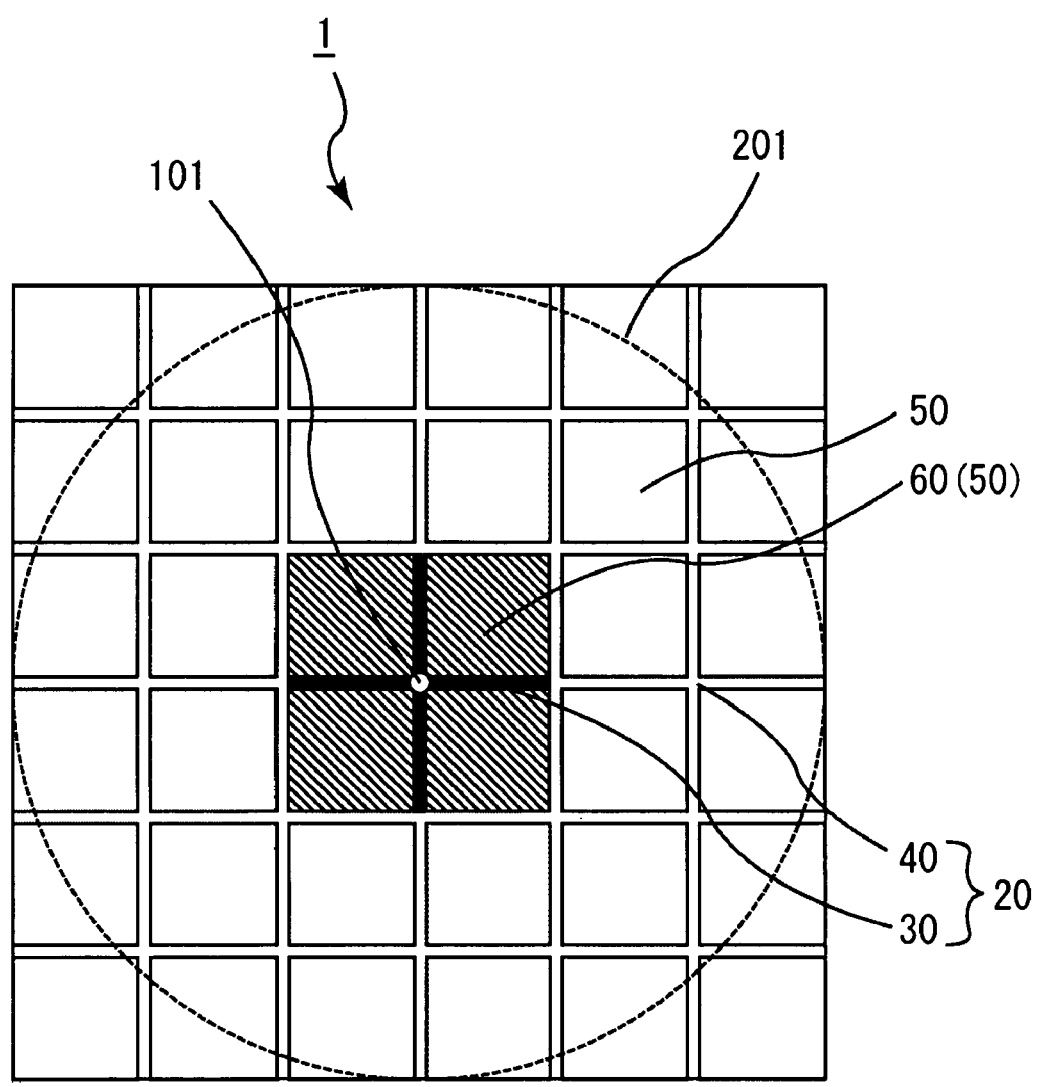
FIG. 1 is a cross-sectional view that schematically shows one example of a honeycomb structure according to an embodiment of the present invention in which honeycomb fired bodies arranged in an even number of columns and an even number of rows are combined with one another.

The embodiments will now be described with reference to the accompanying drawings, wherein like reference numerals designate corresponding or identical elements throughout the various drawings.

In the case when a conventional honeycomb structure used as a honeycomb filter or a catalyst supporting carrier has a comparatively large major axis in a cross-section perpendicular to the longitudinal direction, a problem arises in which honeycomb fired bodies located near a center of an end face of the honeycomb structure tend to slip out of the honeycomb structure.

Moreover, in particular, this problem frequently tends to occur in a honeycomb structure having a major axis of as large as about 200 mm or more in a cross-section perpendicular to the longitudinal direction.

Moreover, when a honeycomb structure is used as a honeycomb filter, PM is deposited inside the honeycomb filter. The honeycomb filter has a greater amount of captured PM in the center portion in the cross-section than an amount of PM deposited on the peripheral portion in the cross-section, after use for a predetermined period of time. In particular, in the case when the honeycomb structure has a diameter of the cross-section of about 200 mm or more, a significantly large difference tends to be found between the amounts of PM captured in the center portion and the peripheral portion.

Use of a honeycomb structure as a honeycomb filter requires carrying out a regenerating process for burning PM deposited inside the honeycomb filter after capturing a predetermined amount of PM. When the regenerating process is carried out on the honeycomb filter in which a large amount of PM has been deposited on the center portion as described above, a large amount of PM is burned in the center portion, leading to generation of a large amount of heat.

Generation of such a large amount of heat possibly causes cracks in the adhesive layer that bonds the honeycomb fired bodies to one another in the center portion.

Moreover, the cracks generated in the adhesive layer tend to further develop, and finally cause one portion of honeycomb fired bodies near the center to slip out of the honeycomb structure.

When a honeycomb structure according to an embodiment of the present invention is used as a honeycomb filter or a catalyst supporting carrier, cracks hardly occur in the adhesive layer near the center, and honeycomb fired bodies near the center hardly slip out of the honeycomb structure.

A honeycomb structure according to an embodiment of the present invention includes: a ceramic block in which a plurality of honeycomb fired bodies are combined with one another with an adhesive layer interposed therebetween, the honeycomb fired body having a large number of cells that are longitudinally placed in parallel with one another with a cell wall interposed therebetween, wherein the adhesive layer includes at least two kinds of adhesive layers each of which bonds honeycomb fired bodies on both sides of the adhesive layer with a different adhesive strength from each other, center-portion honeycomb fired bodies out of the honeycomb fired bodies are bonded to one another with one adhesive layer interposed therebetween, the center-portion honeycomb fired bodies being located in a center portion of a cross-section taken perpendicularly to the longitudinal direction of the ceramic block, and an adhesive strength $\alpha$ between the center-portion honeycomb fired bodies is higher than an adhesive strength $\beta$ between honeycomb fired bodies bonded to one another with an other adhesive layer interposed therebetween.

In the honeycomb structure according to an embodiment of the present invention, the adhesive layer includes at least two kinds of adhesive layers each of which bonds honeycomb fired bodies on both sides thereof with a different adhesive strength from each other.

Moreover, the center-portion honeycomb fired bodies are bonded to one another with one adhesive layer (first adhesive layer) interposed therebetween, and the adhesive strength α between the center-portion honeycomb fired bodies is higher than the adhesive strength β between honeycomb fired bodies bonded to one another with the other adhesive layer (second adhesive layer) interposed therebetween.

The following description will discuss the center-portion honeycomb fired bodies and the adhesive layers of the honeycomb structure according to an embodiment of the present invention.

First, the center-portion honeycomb fired bodies will be described.

The center-portion honeycomb fired bodies correspond to a honeycomb fired body overlapping the center of the cross-section taken perpendicularly to the longitudinal direction of at least one of the honeycomb structure and honeycomb fired bodies located near the center.

The honeycomb structure is formed by combining a plurality of honeycomb fired bodies with an adhesive layer interposed therebetween in the following arrangements of the honeycomb fired bodies in rows and columns (1) an even number x an even number, (2) an odd number x an odd number, or (3) an even number x an odd number, or an odd number x an even number.

The following description will define the center-portion honeycomb fired bodies for the above-mentioned three arrangements, respectively.

First, with reference to the figure, the following description will define the center-portion honeycomb fired bodies of a honeycomb structure in which honeycomb fired bodies arranged in an even number of columns and an even number of rows are combined with one another, as described in (1), using an example of a honeycomb structure in which honeycomb fired bodies arranged in six columns and six rows are combined with one another.

FIG. 1 is a cross-sectional view that schematically shows one example of a honeycomb structure according to an embodiment of the present invention in which honeycomb fired bodies arranged in an even number of columns and an even number of rows are combined with one another. Here, in the present specification, respective cross-sectional views are illustrated, with cells of the honeycomb fired bodies being omitted for simplicity of description.

In the honeycomb structure 1 according to the embodiment of the present invention shown in FIG. 1, a circle 201 indicated by a dotted line shows a peripheral cut face of a ceramic block formed into a round pillar-shape by carrying out peripheral cutting on a rectangular pillar-shaped ceramic block.

In the honeycomb structure 1, honeycomb fired bodies 50 arranged in six columns and six rows are combined with one another with an adhesive layer 20 interposed therebetween. The center of the honeycomb structure 1 in the cross-sectional view is a position (center 101) indicated by an outline point in FIG. 1, and one adhesive layer 30 of the adhesive layers 20 overlaps the center 101. The definition of the one adhesive layer will be described later.

In this case, the center-portion honeycomb fired bodies are defined to be four pieces of honeycomb fired bodies 60 located most closely to the center 101, out of the honeycomb fired bodies 50, and the four pieces of honeycomb fired bodies 60 are indicated by slanting lines in FIG. 1.

Next, with reference to the figure, the following description will define the center-portion honeycomb fired bodies of a honeycomb structure in which honeycomb fired bodies arranged in an odd number of columns and an odd number of rows are combined with one another, as described in (2), using an example of a honeycomb structure in which honeycomb fired bodies arranged in seven columns and seven rows are combined with one another.

Figure 2:
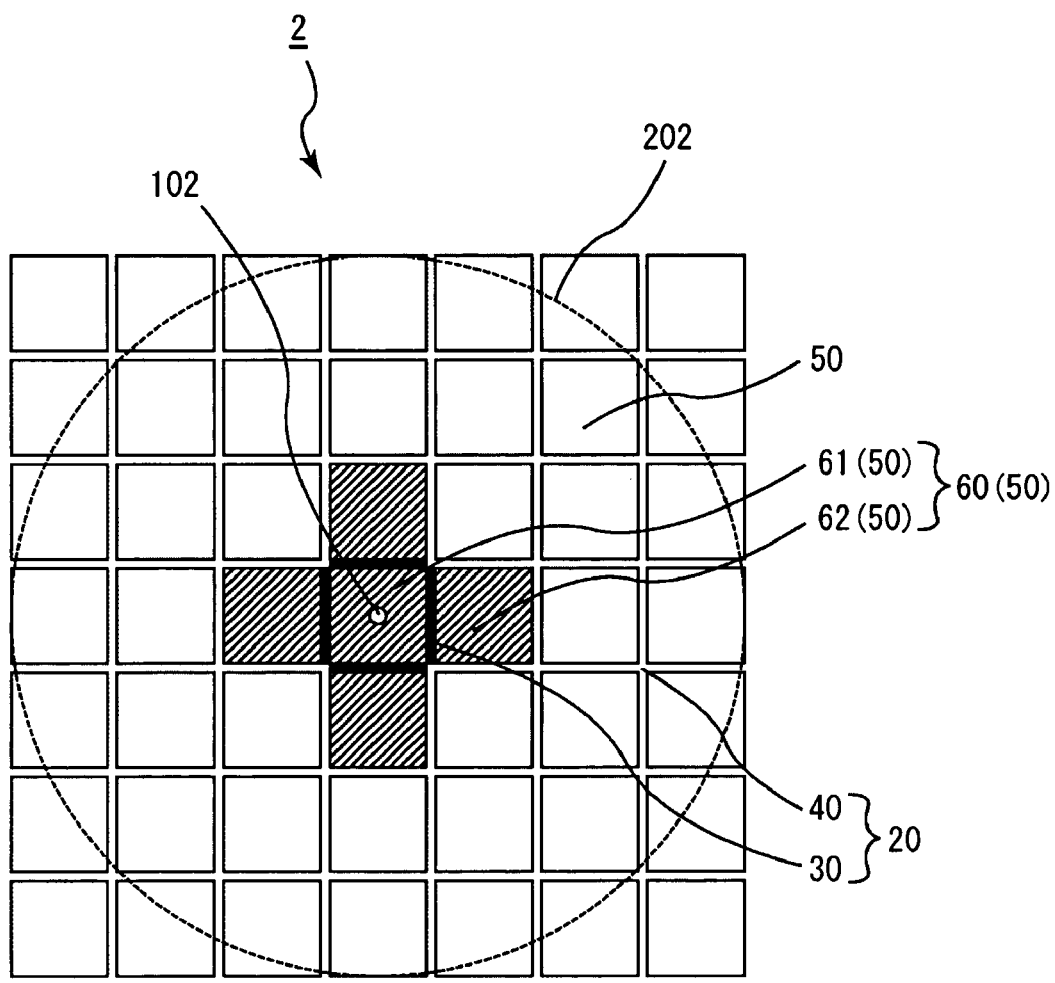
FIG. 2 is a cross-sectional view that schematically shows one example of a honeycomb structure according to an embodiment of the present invention in which honeycomb fired bodies arranged in an odd number of columns and an odd number of rows are combined with one another.

FIG. 2 is a cross-sectional view that schematically shows one example of a honeycomb structure according to an embodiment of the present invention in which honeycomb fired bodies arranged in an odd number of columns and an odd number of rows are combined with one another.

In the honeycomb structure 2 according to the embodiment of the present invention shown in FIG. 2, a circle 202 indicated by a dotted line shows a peripheral cut face of a ceramic block formed into a round pillar-shape by carrying out peripheral cutting on a rectangular pillar-shaped ceramic block.

In the honeycomb structure 2, the honeycomb fired bodies 50 arranged in seven columns and seven rows are combined with one another with an adhesive layer 20 interposed therebetween. The center of the honeycomb structure 2 in the cross-section is a position (center 102) indicated by an outline point in FIG. 2, and a honeycomb fired body 61 overlaps the center 102.

In this case, the innermost honeycomb fired body is defined to be the innermost honeycomb fired body 61 overlapping the center 102, out of the honeycomb fired bodies 50. The center-portion honeycomb fired bodies are defined to be the innermost honeycomb fired body 61 and honeycomb fired bodies 62 adjacent to the innermost honeycomb fired body 61. The other honeycomb fired bodies surrounding the center-portion honeycomb fired bodies are referred to as peripheral honeycomb fired bodies.

Here, "the honeycomb fired bodies adjacent to the innermost honeycomb fired body" are the honeycomb fired bodies bonded to the innermost honeycomb fired body with an adhesive layer interposed therebetween.

Therefore, in FIG. 2, the center-portion honeycomb fired bodies 60 are five pieces of honeycomb fired bodies indicated by slanting lines, that is, the innermost honeycomb fired body 61 and four pieces of honeycomb fired bodies 62 bonded to the innermost honeycomb fired body with an adhesive layer interposed therebetween.

Next, with reference to the figure, the following description will define the center-portion honeycomb fired bodies of a honeycomb structure in which honeycomb fired bodies arranged in an even number of columns and an odd number of rows or in an odd number of columns and an even number of rows are combined with one another, as described in (3), using an example of a honeycomb structure in which honeycomb fired bodies arranged in seven columns and six rows are combined with one another.

Figure 3:
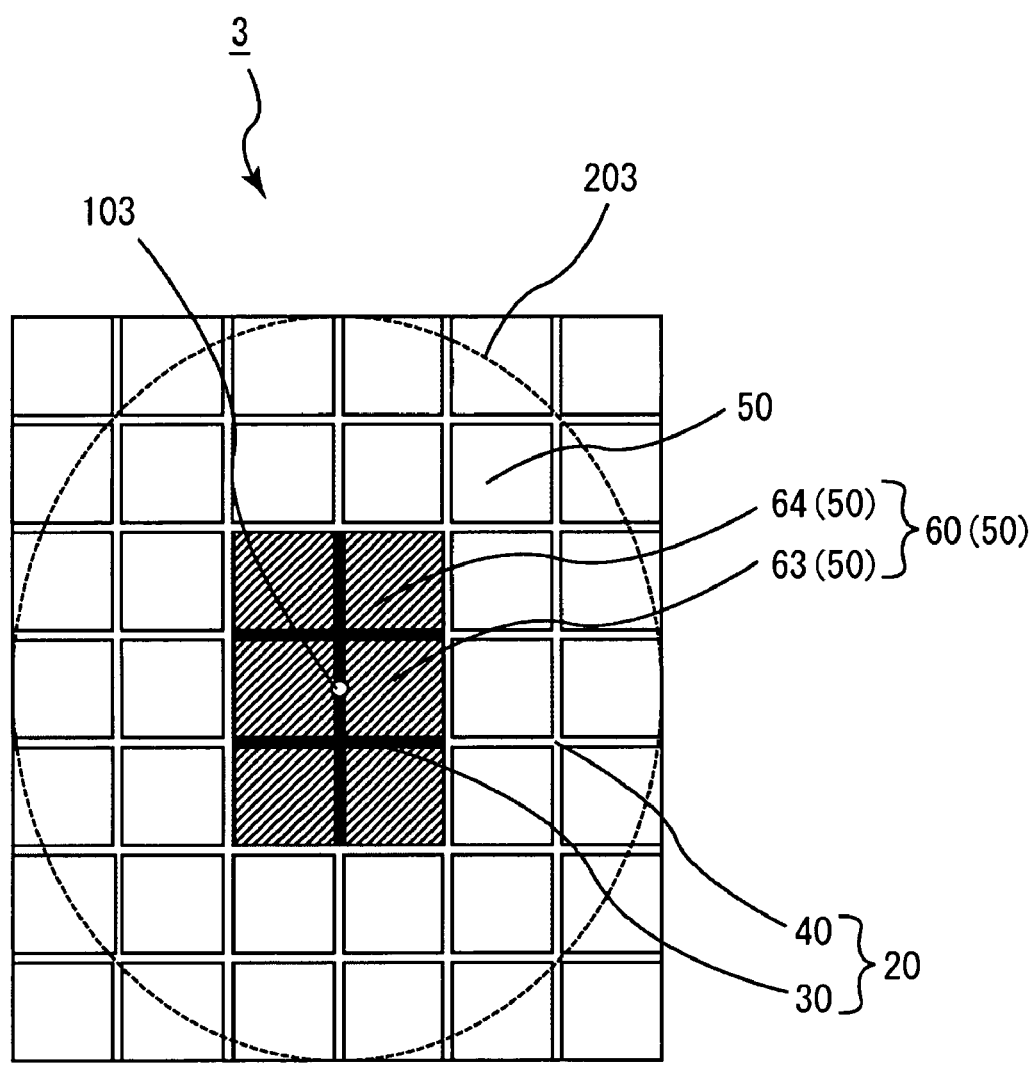
FIG. 3 is a cross-sectional view that schematically shows one example of a honeycomb structure according to an embodiment of the present invention in which honeycomb fired bodies arranged in an odd number columns and an even number of rows are combined with one another.

FIG. 3 is a cross-sectional view that schematically shows one example of a honeycomb structure according to an embodiment of the present invention in which honeycomb fired bodies arranged in an odd number columns and an even number of rows are combined with one another.

In the honeycomb structure 3 according to the embodiment shown in FIG. 3, an elliptical shape 203 indicated by a dotted line shows a peripheral cut face of a ceramic block formed into a cylindroid shape by carrying out peripheral cutting on a rectangular pillar-shaped ceramic block.

In the honeycomb structure 3, honeycomb fired bodies 50 arranged in seven columns and six rows are combined with one another with an adhesive layer 20 interposed therebetween. The center of the honeycomb structure 3 in the cross-sectional view is a position (center 103) indicated by an outline point in FIG. 3, and the one adhesive layer 30 of the adhesive layers 20 overlaps the center 103.

In this case, the center-portion honeycomb fired bodies are defined to be two pieces of honeycomb fired bodies 63 most closely located to the center 103 and four pieces of honeycomb fired bodies 64 located more closely to the center 103 out of honeycomb fired bodies adjacent to the honeycomb fired bodies 63, out of the honeycomb fired bodies 50.

Here, "the honeycomb fired bodies located most closely to the center" are honeycomb fired bodies positioned on the both sides of a portion of the adhesive layer, the portion overlapping the center. Moreover, "the honeycomb fired bodies located more closely to the center" are the honeycomb fired bodies that are bonded to the honeycomb fired bodies located most closely to the center with the adhesive layer interposed therebetween, and located more closely to the center. For example, in FIG. 3, the honeycomb fired body 63 positioned on the right side of the center 103 is "the honeycomb fired body located most closely to the center", and honeycomb fired bodies 64 that are positioned above and below the honeycomb fired body 63, and bonded to the honeycomb fired body 63 with the adhesive layer interposed therebetween are "the honeycomb fired bodies located more closely to the center".

Here, the honeycomb fired body positioned on the right side of the honeycomb fired body 63 and bonded to the honeycomb fired body 63 with the adhesive layer interposed therebetween is not "the honeycomb fired body located more closely to the center".

Therefore, in FIG. 3, the center-portion honeycomb fired bodies 60 are six pieces of honeycomb fired bodies indicated by slanting lines, that is, the two pieces of honeycomb fired bodies 63 and the four pieces of honeycomb fired bodies 64 positioned above and below the two pieces of honeycomb fired bodies 63.

The following description will discuss the adhesive layer.

The adhesive layer includes two kinds of adhesive layers each of which bonds honeycomb fired bodies on both sides thereof with a different adhesive strength from each other, that is, the one adhesive layer and the other adhesive layer.

Moreover, in the honeycomb structure according to the embodiment of the present invention, the center-portion honeycomb fired bodies are bonded to one another with the one adhesive layer interposed therebetween.

In FIG. 1, the one adhesive layer is the adhesive layer 30 that bonds four pieces of honeycomb fired bodies 60 of the center-portion honeycomb fired bodies to one another, and the one adhesive layer corresponds to a cross-shaped portion painted black in FIG. 1.

In the same manner, in FIG. 2, the one adhesive layer is the adhesive layer 30 that bonds the innermost honeycomb fired body 61 to the other center-portion honeycomb fired bodies 62, and in FIG. 3, the one adhesive layer is the adhesive layer 30 that bonds two out of six pieces of center-portion honeycomb fired bodies 63 and 64 to one another.

Here, the other adhesive layer corresponds to the adhesive layer other than the one adhesive layer, and correspond to the adhesive layer 40 that is not painted black in FIGS. 1, 2 and 3.

In the honeycomb structure according to the embodiment of the present invention, the center-portion honeycomb fired bodies are bonded to one another with the one adhesive layer interposed therebetween. Moreover, the honeycomb fired bodies other than the center-portion honeycomb fired bodies are bonded to one another, with the other adhesive layer interposed therebetween or with the one adhesive layer interposed therebetween, and the honeycomb fired bodies other than the center-portion honeycomb fired bodies and the center-portion honeycomb fired bodies are also bonded to one another, with the other adhesive layer interposed therebetween or with the one adhesive layer interposed therebetween.

Moreover, in the honeycomb structure according to the embodiment of the present invention, the adhesive strength $\alpha$ between the honeycomb fired bodies bonded to one another with the one adhesive layer interposed therebetween is higher than the adhesive strength $\beta$ between the honeycomb fired bodies bonded to one another with the other adhesive layer interposed therebetween.

In the honeycomb structure according to the embodiment of the present invention, since the center-portion honeycomb fired bodies are always bonded to one another with the one adhesive layer interposed therebetween, the adhesive strength between the center-portion honeycomb fired bodies is always the high adhesive strength $\alpha$. For this reason, the honeycomb structure is configured to have a structure which hardly allows the honeycomb fired bodies near a center of an end face of the honeycomb structure to slip out of the honeycomb structure even when a high pressure is applied to the center due to exhaust gases upon use of the honeycomb structure as a honeycomb filer or a catalyst supporting carrier.

Moreover, even when a large amount of heat is generated by burning a large amount of PM captured on the center-portion honeycomb fired bodies upon use of the honeycomb structure as a honeycomb filer, cracks hardly occur in the adhesive layer due to the high adhesive strength $\alpha$ between the center-portion honeycomb fired bodies. For this reason, the honeycomb structure is configured to have a structure which hardly allows the honeycomb fired bodies near the center to slip out of the honeycomb structure even after repetitive regenerating processes.

In the honeycomb structure according to an embodiment of the present invention, an innermost honeycomb fired body overlaps the center of the cross-section taken perpendicularly to the longitudinal direction of the ceramic block, and the center-portion honeycomb fired bodies include the innermost honeycomb fired body and honeycomb fired bodies adjacent to the innermost honeycomb fired body.

In the honeycomb structure according to an embodiment of the present invention, the adhesive layer overlaps the center of the cross-section taken perpendicularly to the longitudinal direction of the ceramic block, and the center-portion honeycomb fired bodies include four pieces of honeycomb fired bodies most closely located to the center.

In the honeycomb structure according to an embodiment of the present invention, the adhesive layer overlaps the center of the cross-section taken perpendicularly to the longitudinal direction of the ceramic block, and the center-portion honeycomb fired bodies include two pieces of honeycomb fired bodies most closely located to the center and four pieces of honeycomb fired bodies more closely located to the center out of honeycomb fired bodies adjacent to the two pieces of honeycomb fired bodies most closely located to the center.

To the center-portion honeycomb fired bodies located at the respective positions defined in the embodiments of the present invention, a high pressure is applied by exhaust gases. However, in the embodiments of the present invention, since the center-portion honeycomb fired bodies are bonded to one another with the one adhesive layer interposed therebetween, and the adhesive strengths between the center-portion honeycomb fired bodies are high, the honeycomb structures are configured to have a structure which hardly allows the honeycomb fired bodies near the center to slip out of the honeycomb structure.

In the honeycomb structure according to an embodiment of the present invention, the one adhesive layer is located at an area within a distance of about 50 mm from the center of the cross-section taken perpendicularly to the longitudinal direction of the ceramic block.

The area of the side faces within a distance of about 50 mm from the center of a cross-section of the honeycomb structure particularly tends to receive a high pressure due to exhaust gases. However, in the honeycomb structure according to the embodiment of the present invention, the honeycomb fired bodies located in the area are bonded to one another with the one adhesive layer interposed therebetween and the adhesive strength between the honeycomb fired bodies bonded with the one adhesive layer interposed therebetween is high. Therefore, the honeycomb structure is configured to have a structure which hardly allows the honeycomb fired bodies near the center to slip out of the honeycomb structure.

In the honeycomb structure according to an embodiment of the present invention, the shape of the one adhesive layer in the cross-section includes a cross shape.

In the honeycomb structure according to an embodiment of the present invention, the adhesive strength $\alpha$ measured by the three-point bending test is at least about 0.8 MPa and at most about 1.6 MPa, and the adhesive strength $\beta$ measured by the three-point bending test is at least about 0.4 MPa and at most about 1.2 MPa.

In order to increase the adhesive strength to achieve the adhesive strength measured by the three-point bending test of at least about 0.8 MPa and at most about 1.6 MPa, it is necessary to alter the conventional bonding method to another bonding method, to add a new process thereto, or to alter the composition of the adhesive material, thus leading to high costs and an increase in the number of processes. In the embodiment of the present invention, only the portion required to be bonded with a higher adhesive strength is bonded with a high adhesive strength, and the other portions are bonded by using the conventional method. As a result, it may become easier to minimize the increase in the number of processes and the costs. For this reason, the adhesive layer other than that located near the center is formed by using the conventional method to have an adhesive strength of at least about 0.4 MPa and at most about 1.2 MPa.

The adhesive layer having the adhesive strength $\alpha$ measured by the three-point bending test of about 0.8 MPa or more bonds the center-portion honeycomb fired bodies to one another more firmly. Therefore, the honeycomb structure is configured to have a structure which more hardly allows the honeycomb fired bodies near the center to slip out of the honeycomb structure.

Here, the adhesive strength is preferably about 1.6 MPa or less because it is difficult to bond the honeycomb fired bodies to one another with the adhesive strength $\alpha$ of more than about 1.6 MPa.

In the honeycomb structure according to an embodiment of the present invention, the adhesive strength $\alpha$ is at least about 1.1 times and at most about 4.0 times higher than the adhesive strength $\beta$. Since the relationship between the adhesive strength $\alpha$ and the adhesive strength $\beta$ is defined as described above, the adhesive strength $\alpha$ between the honeycomb fired bodies near the center is relatively higher than the adhesive strength $\beta$ between honeycomb fired bodies bonded to one another with the other adhesive layer interposed therebetween. Therefore, the honeycomb structure is configured to have a structure which more hardly allows the honeycomb fired bodies near the center to slip out of the honeycomb structure.

In the honeycomb structure according to an embodiment of the present invention, the cross-section taken perpendicularly to the longitudinal direction of the ceramic block has a major axis of about 200 mm or more.

Here, "the major axis of the cross-section" is the diameter in the case of a circular cross-section, the major axis in the case of an elliptical cross-section and the longest diagonal line in the case of a polygonal cross-section.

In the honeycomb structure according to the embodiment of the present invention, since the adhesive strength between the center-portion honeycomb fired bodies is high, the honeycomb structure is configured to have a structure which hardly allows the honeycomb fired bodies near the center to slip out of the honeycomb structure, even when the honeycomb structure has a major axis of as large as about 200 mm or more in the cross-section perpendicular to the longitudinal direction. On the contrary, a conventional honeycomb structure has a structure which tends to allow the honeycomb fired bodies near the center to slip out of the honeycomb structure, when the honeycomb structure has a major axis of as large as about 200 mm or more in the cross-section perpendicular to the longitudinal direction.

In the honeycomb structure according to an embodiment of the present invention, 30 pieces or more of the honeycomb fired bodies are combined with one another.

The honeycomb structure having 30 pieces or more of honeycomb fired bodies combined with one another has a large cross-section. However, in the honeycomb structure according to the embodiment of the present invention, since the adhesive strength between the center-portion honeycomb fired bodies is high, the honeycomb structure is configured to have a structure which hardly allows the honeycomb fired bodies near the center to slip out of the honeycomb structure even when 30 pieces or more of honeycomb structures are combined with one another.

The method for manufacturing a honeycomb structure according to an embodiment of the present invention includes: molding a ceramic raw material to manufacture a honeycomb molded body having a large number of cells that are longitudinally placed in parallel with one another with a cell wall interposed therebetween; firing the honeycomb molded body to manufacture a honeycomb fired body; and combining a plurality of the honeycomb fired bodies to one another by bonding with an adhesive layer interposed therebetween to manufacture a ceramic block, the combining including: forming at least two adhesive layers each of which bonds honeycomb fired bodies on the both sides with a different adhesive strength from each other, the forming including: placing center-portion honeycomb fired bodies in a center portion of a cross-section taken perpendicularly to the longitudinal direction of the ceramic block; and bonding the center-portion honeycomb fired bodies to one another by interposing one adhesive layer with an adhesive strength $\alpha$, the adhesive strength $\alpha$ being higher than an adhesive strength $\beta$ between honeycomb fired bodies bonded to one another with an other adhesive layer interposed therebetween.

In the method for manufacturing a honeycomb structure according to an embodiment of the present invention, at least two kinds of adhesive layers each of which bonds honeycomb fired bodies on the both sides with a different adhesive strength from each other are formed in the combining. Further, the center-portion honeycomb fired bodies are bonded to one another with the one adhesive layer having a higher adhesive strength interposed therebetween. For this reason, it may become easier to manufacture a honeycomb structure in which the center-portion honeycomb fired bodies are bonded with a high adhesive strength.

In such a honeycomb structure, even when a high pressure is applied to a center portion of an end face of the honeycomb structure due to exhaust gases upon use of the honeycomb structure as a honeycomb filer or a catalyst supporting carrier, the honeycomb fired bodies near the center hardly slips out of the honeycomb structure.

Moreover, even after the honeycomb structure has been used as a honeycomb filter and then repetitive regenerating processes has been carried out thereon, the honeycomb fired bodies near the center hardly slip out of the honeycomb structure.

In the method for manufacturing a honeycomb structure according to an embodiment of the present invention, an innermost honeycomb fired body overlaps the center of the cross-section taken perpendicularly to the longitudinal direction of the ceramic block, and the center-portion honeycomb fired bodies include the innermost honeycomb fired body and honeycomb fired bodies adjacent to the innermost honeycomb fired body.

In the method for manufacturing a honeycomb structure according to an embodiment of the present invention, the adhesive layer overlaps the center of the cross-section taken perpendicularly to the longitudinal direction of the ceramic block, and the center-portion honeycomb fired bodies include four pieces of honeycomb fired bodies most closely located to the center.

In the method for manufacturing a honeycomb structure according to an embodiment of the present invention, the adhesive layer overlaps the center of the cross-section taken perpendicularly to the longitudinal direction of the ceramic block, and the center-portion honeycomb fired bodies include two pieces of honeycomb fired bodies most closely located to the center and four pieces of honeycomb fired bodies more closely located to the center out of honeycomb fired bodies adjacent to the two pieces of honeycomb fired bodies most closely located to the center.

In the method for manufacturing a honeycomb structure according to the embodiments of the present invention, the center-portion honeycomb fired bodies defined in each of the embodiments of the present invention are bonded to one another with the by interposing one adhesive layer having a higher adhesive strength. Therefore, it may become easier to manufacture a honeycomb structure in which the center-portion honeycomb fired bodies are bonded with a high adhesive strength. In the method for manufacturing a honeycomb structure according to an embodiment of the present invention, the combining includes: using at least two kinds of adhesive pastes each with a different foaming material content from each other as raw materials for the two kinds of the adhesive layers, the at least two kinds of adhesive pastes including: an adhesive paste (first adhesive paste) used as a raw material for the one adhesive layer; and an adhesive paste (second adhesive paste) used as a raw material for the other adhesive layer, the adhesive paste used as a raw material for the one adhesive layer having a higher foaming material content than that of the adhesive paste used as a raw material for the other adhesive layer.

Since at least two kinds of adhesive pastes each with a different foaming material content from each other are used as raw materials for the adhesive layers, the respective adhesive layers formed by using the respective adhesive pastes tends to be allowed to bond the honeycomb fired bodies to one another with a different adhesive strength from each other.

Since the foaming material content of the adhesive paste used as a raw material for the one adhesive layer is higher than that of the adhesive paste used as a raw material for the other adhesive layer, honeycomb fired bodies bonded with the one adhesive layer interposed therebetween tend to be allowed to be bonded with a higher adhesive strength than the adhesive strength between honeycomb fired bodies bonded to one another with the other adhesive layer interposed therebetween.

Here, "the foaming material" refers to a material having temperature-dependent expansion and disappearing properties, which has not yet reached the expanded state. Therefore, "foamed" materials that have been expanded and no longer exert expansion properties are not included in "the foaming material".

Here, the following description will discuss the reason why the higher foaming material content in the adhesive paste leads to the higher adhesive strength between honeycomb fired bodies.

Adhesive pastes generally contain much moisture. When an adhesive paste containing no foaming material is used, the moisture in the adhesive paste tends to permeate to a porous ceramic honeycomb fired body upon contact of the adhesive paste containing moisture with the honeycomb fired body. Consequently, the volume of the adhesive paste is presumably reduced by the amount corresponding to the moisture having permeated. Then, a large number of large air bubbles having a diameter of about 1 mm tend to be formed in the adhesive layer formed by drying the adhesive paste.

Here, when large air bubbles are formed in the adhesive layer, the large air bubbles tend to be joined with one another even by a small stress so as to develop into a large crack. For this reason, the adhesive strength between honeycomb fired bodies bonded to one another with the adhesive layer interposed therebetween tends to be lowered.

In contrast, when an adhesive paste contains a foaming material, expansion of the foaming material tends to cause an increase in the volume of the adhesive paste, while the permeation of moisture to the honeycomb fired bodies causes a reduction in the volume of the adhesive paste. Therefore, the volume reduction of the adhesive paste is presumably compensated for by the expansion of the foaming material.

Since the foaming material is expanded and disappears by heating, only traces of air bubbles are left after the disappearance of the foaming material. The traces of air bubbles are small air bubbles having a diameter of about 300 μm or less. In a portion where the small air bubbles are formed, formation of large air bubbles tends to be avoidable.

Here, unlike the large air bubbles, the small air bubbles formed in the adhesive layer tend not to be joined with one another easily. For this reason, use of the adhesive paste having the larger foaming material content presumably makes it easier to avoid large air bubbles occurring in the adhesive layer, and to bond the honeycomb fired bodies with the higher adhesive strength.

In the method for manufacturing a honeycomb structure according to an embodiment of the present invention, the combining includes: placing the adhesive paste on a side face of the center-portion honeycomb fired body as a raw material for the one adhesive layer; and heating and pressurizing an opposite side face to the side face having the adhesive paste placed thereon of the center-portion honeycomb fired body to bond the center-portion honeycomb fired bodies to one another with the one adhesive layer interposed therebetween.

By carrying out heating and pressurizing on the adhesive paste, the dense adhesive layer is formed. As a result, a fewer number of air bubbles tend to be contained in the adhesive layer and the air bubbles tend to have a smaller size.

When a fewer number of air bubbles are contained in the adhesive layer and the size of the air bubbles is smaller, it may become easier to reduce the possibility that fine cracks occurred in the adhesive layer develop into large cracks through the air bubbles, and consequently to improve the adhesive strength between honeycomb fired bodies.

In the method for manufacturing a honeycomb structure according to the embodiment of the present invention, since the one adhesive layer is formed by pressurizing and heating the adhesive paste, it may become easier to form the one adhesive layer bonding the center-portion honeycomb fired bodies with a high adhesive strength.

In the method for manufacturing a honeycomb structure according to an embodiment of the present invention, the combining includes: placing the adhesive paste containing the foaming material on a side face of the center-portion honeycomb fired body as a raw material for the one adhesive layer; and heating and pressurizing an opposite side face to the side face having the adhesive paste placed thereon of the center-portion honeycomb fired body to bond the center-portion honeycomb fired bodies to one another with the one adhesive layer interposed therebetween.

When the one adhesive layer is formed by pressurizing and heating the adhesive paste containing a foaming material as described above, the foaming material works to avoid large air bubbles occurring in the adhesive layer, and thus making it easier to bond the honeycomb fired bodies with a high adhesive strength. Moreover, since the adhesive layer formed by heating and pressurizing the adhesive paste contains a fewer number of air bubbles and the air bubbles have a smaller size, the honeycomb fired bodies tend to be allowed to be bonded to one another with a high adhesive strength. Thus, it may become easier to form the one adhesive layer which bonds the center-portion honeycomb fired bodies to one another with a high adhesive strength.

In the method for manufacturing a honeycomb structure according to an embodiment of the present invention, the combining includes: center-portion-aggregating to manufacture a center-portion honeycomb aggregated body including the center-portion honeycomb fired bodies; and periphery-aggregating to bond the center-portion honeycomb aggregated body with an other honeycomb fired body.

In the method for manufacturing a honeycomb structure according to the embodiment of the present invention, center-portion-aggregating is carried out to manufacture a center-portion honeycomb aggregated body containing the center-portion honeycomb fired bodies.

Since the center-portion honeycomb aggregated body is formed in the center-portion-aggregating in advance, the center-portion honeycomb fired bodies tend to be allowed to be bonded to one another by interposing the one adhesive layer having a high adhesive strength. Moreover, bonding of other honeycomb fired bodies by interposing the other adhesive layer without the necessity of having a high adhesive strength may be easily carried out by using a simpler method. Therefore, it may become easier to easily manufacture a honeycomb structure having the center-portion honeycomb fired bodies bonded to one another with a high adhesive strength as a whole.

In the method for manufacturing a honeycomb structure according to an embodiment of the present invention, periphery-aggregating includes: bonding a plurality of the honeycomb fired bodies to one another to manufacture a periphery honeycomb aggregated body; and bonding the periphery honeycomb aggregated body to the center-portion honeycomb aggregated body.

Use of the method also makes it easier to manufacture a honeycomb structure having the center-portion honeycomb fired bodies bonded to one another with a high adhesive strength as a whole.

In the method for manufacturing a honeycomb structure according to an embodiment of the present invention, the combining includes: bonding a plurality of the honeycomb fired bodies to one another to manufacture a honeycomb aggregated body; and bonding the honeycomb aggregated bodies to one another with the one adhesive layer interposed therebetween.

In the method for manufacturing a honeycomb structure according to the embodiment of the present invention, a plurality of honeycomb fired bodies are bonded to one another to manufacture a honeycomb aggregated body, and a plurality of honeycomb aggregated bodies are bonded to one another with the one adhesive layer interposed therebetween. In this method, first, the honeycomb aggregated bodies may be manufactured by using a simple method. Moreover, by forming the one adhesive layer having a high adhesive strength between the honeycomb aggregated bodies, some of the honeycomb fired bodies bonded to one another with the one adhesive layer tend to be allowed to be the center-portion honeycomb fired body. Therefore, it may become easier to easily manufacture a honeycomb structure having the center-portion honeycomb fired bodies bonded to one another with a high adhesive strength as a whole.

In the method for manufacturing a honeycomb structure according to an embodiment of the present invention, the combining includes: forming the at least two kinds of adhesive layers having the adhesive strength α measured by the three-point bending test of at least about 0.8 MPa and at most about 1.6 MPa and the adhesive strength β measured by the three-point bending test of at least about 0.4 MPa and at most about 1.2 MPa.

In order to increase the adhesive strength to achieve the adhesive strength measured by the three-point bending test of at least about 0.8 MPa and at most about 1.6 MPa, it is necessary to alter the conventional bonding method to another bonding method, to add a new process thereto, or to alter the composition of the adhesive material, thus leading to high costs and increase in the number of processes and. Therefore, in the embodiment of the present invention, only the portion required to be bonded with a higher adhesive strength is bonded with a high adhesive strength, and the other portions are bonded by using the conventional method. Therefore, it may become easier to minimize the increase in the number of processes and the costs. Therefore, the adhesive layer other than that located near the center is formed by using the conventional method to have an adhesive strength of at least about 0.4 MPa and at most about 1.2 MPa.

Moreover, in the method for manufacturing a honeycomb structure according to an embodiment of the present invention, the combining includes: forming the at least two kinds of adhesive layers having the adhesive strength α and the adhesive strength β, the adhesive strength α being at least about 1.1 times and at most about 4.0 times higher than the adhesive strength β.

In the method for manufacturing a honeycomb structure according to the embodiments of the present invention, since the adhesive strength α between the center-portion honeycomb fired bodies is relatively higher than the adhesive strength β between honeycomb fired bodies bonded to one another with the other adhesive layer interposed therebetween, it may become easier to manufacture a honeycomb structure having a structure which more hardly allows the honeycomb fired bodies near the center to slip out of the honeycomb structure.

In the method for manufacturing a honeycomb structure according to an embodiment of the present invention, the combining includes: combining the honeycomb fired bodies to form the ceramic block having a major axis of about 200 mm or more in the cross-section taken perpendicularly to the longitudinal direction thereof.

In the method for manufacturing a honeycomb structure according to the embodiment of the present invention, it is possible to manufacture a honeycomb structure having a structure which hardly allows the honeycomb fired bodies near the center to slip out of the honeycomb structure, even when the honeycomb structure has a major axis of as large as about 200 mm or more in the cross-section perpendicular to the longitudinal direction. On the contrary, a conventional honeycomb structure has a structure which tends to allow the honeycomb fired bodies near the center to slip out of the honeycomb structure, when the honeycomb structure has a major axis of as large as about 200 mm or more in the cross-section perpendicular to the longitudinal direction.

In the method for manufacturing a honeycomb structure according to an embodiment of the present invention, the combining includes: combining 30 pieces or more honeycomb fired bodies with one another.

Even when 30 pieces or more of honeycomb fired bodies are combined with one another to manufacture a large sized honeycomb structure, the manufactured honeycomb structure is allowed to have a structure in which the honeycomb fired bodies near the center hardly slip out of the honeycomb structure.

The method for manufacturing a honeycomb structure according to an embodiment of the present invention further includes: cutting a periphery of the ceramic block; and forming a coat layer on the periphery of the cut ceramic block.

By carrying out the periphery cutting process, it may become easier to manufacture a honeycomb structure having a predetermined peripheral shape.

Moreover, by forming the coat layer, it may become easier to adjust the peripheral shape of the honeycomb structure, and further to manufacture a honeycomb structure that is free from leakage of exhaust gases from the honeycomb structure, when the exhaust gases are allowed to flow through the honeycomb structure.

In the method for manufacturing a honeycomb structure according to an embodiment of the present invention, out of honeycomb fired bodies to be combined in the combining, a part of the honeycomb fired bodies have a different cross-sectional shape from the cross-sectional shape of an other part of honeycomb fired bodies.

By forming a part of the honeycomb fired bodies have a different cross-sectional shape from the cross-sectional shape of an other part of honeycomb fired bodies, it may become easier to manufacture a honeycomb structure having a predetermined peripheral shape without carrying out periphery-cutting.

(First Embodiment)

With reference to the figures, the following description will discuss a first embodiment that is one embodiment of the honeycomb structure and the method for manufacturing a honeycomb structure.

Figure 4:
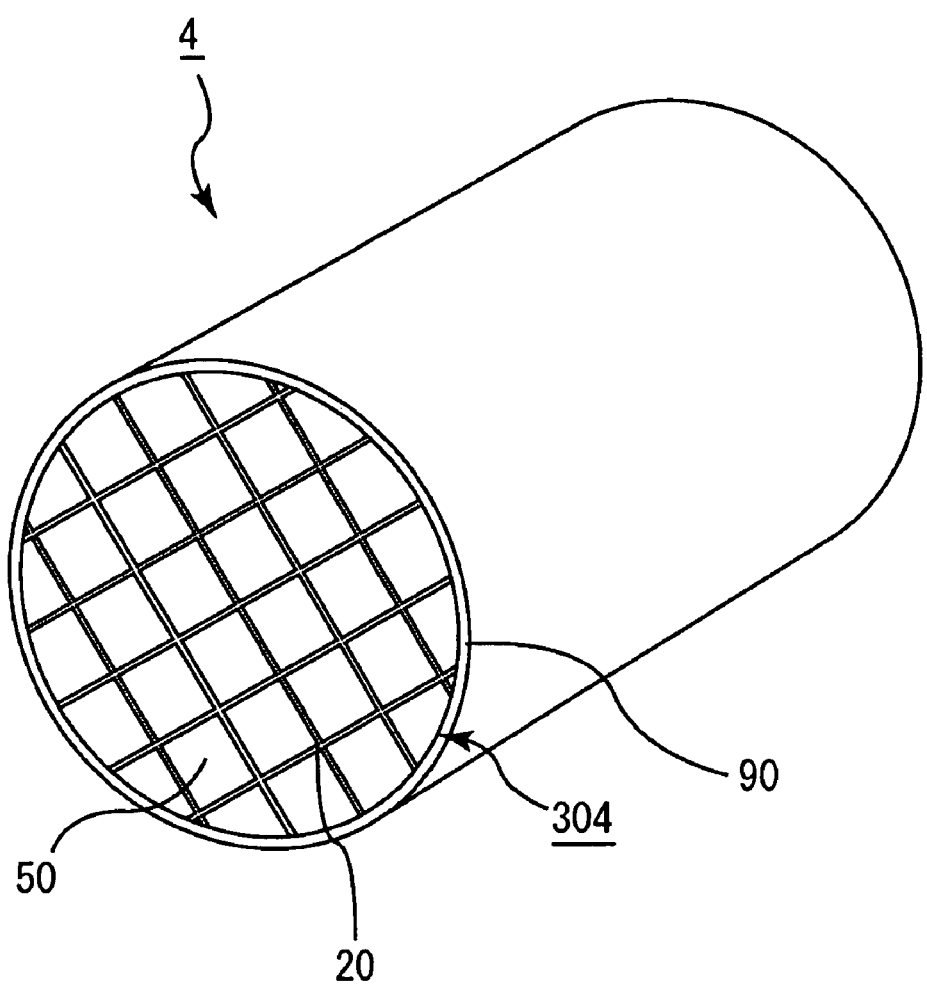
FIG. 4 is a perspective view that schematically shows one example of the honeycomb structure according to an embodiment of the present invention.
Figure 5A:
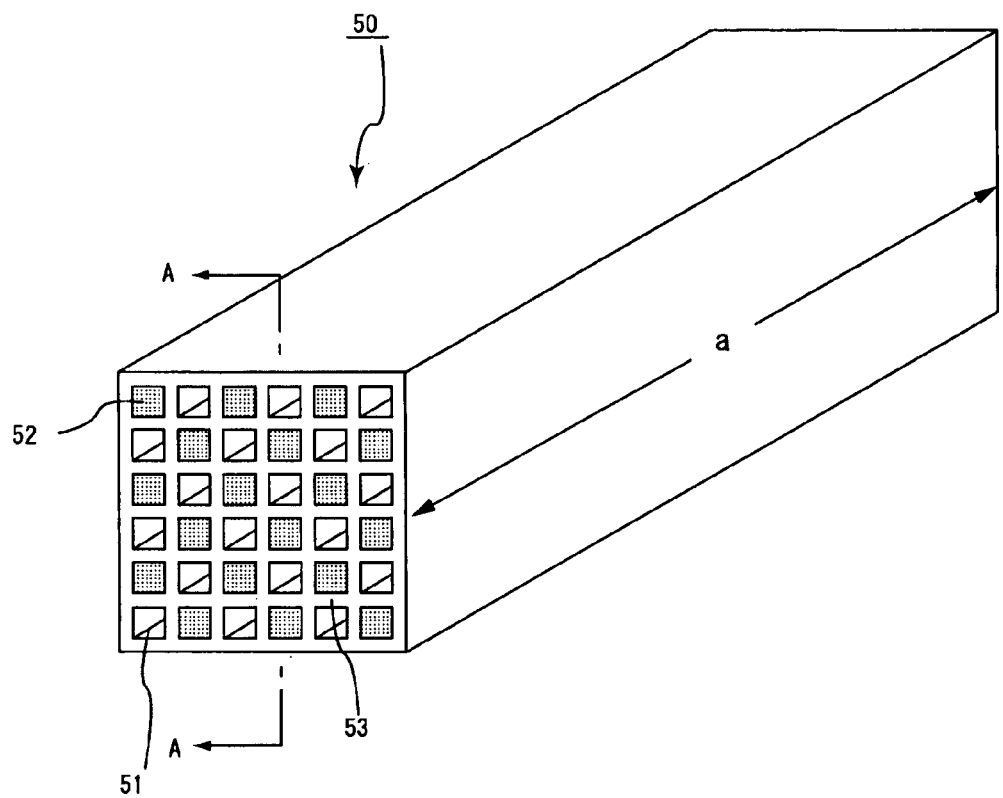
FIG. 5A is a perspective view that schematically shows one example of a honeycomb fired body that constitutes the honeycomb structure according to an embodiment of the present invention.

FIG. 4 is a perspective view that schematically shows one example of the honeycomb structure according to an embodiment of the present invention. FIG. 5A is a perspective view that schematically shows one example of a honeycomb fired body that constitutes the honeycomb structure according to an embodiment of the present invention, and FIG. 5B is an A-A line cross-sectional view of FIG. 5A.

Figure 5B:
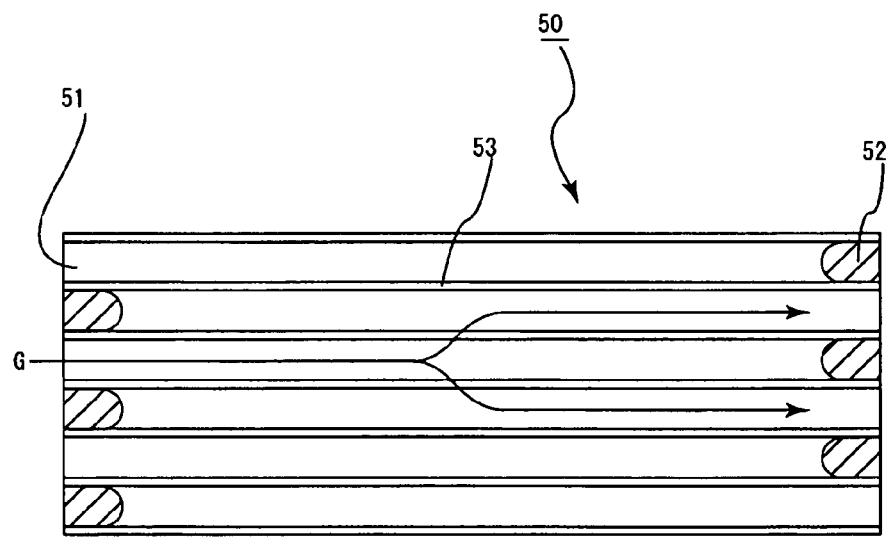
FIG. 5B is an A-A line cross-sectional view of FIG. 5A.

As shown in FIG. 4, a honeycomb structure 4 according to an embodiment of the present invention has a structure in which 36 pieces of porous ceramic honeycomb fired bodies 50 having a shape shown in FIGS. 5A and 5B, are combined with one another with an adhesive layer 20 interposed therebetween to form a ceramic block 304, and a sealing material layer (coat layer) 90 is formed on the periphery of the ceramic block 304.

The honeycomb fired body 50 shown in FIGS. 5A and 5B has a structure in which a large number of cells 51 are longitudinally placed (the direction a in FIG. 5A) in parallel with one another with a cell wall 53 therebetween, the cells 51 having either one of the ends sealed with a plug (sealing material) 52. Therefore, exhaust gases G having flown into one cell 51 with an opening end on one end face flow out of another cell 51 with an opening end on the other end face after having always passed through the cell wall 53 that separates the cells 51.

Therefore, the cell wall 53 functions as a filter for capturing PM and the like.

Figure 6:
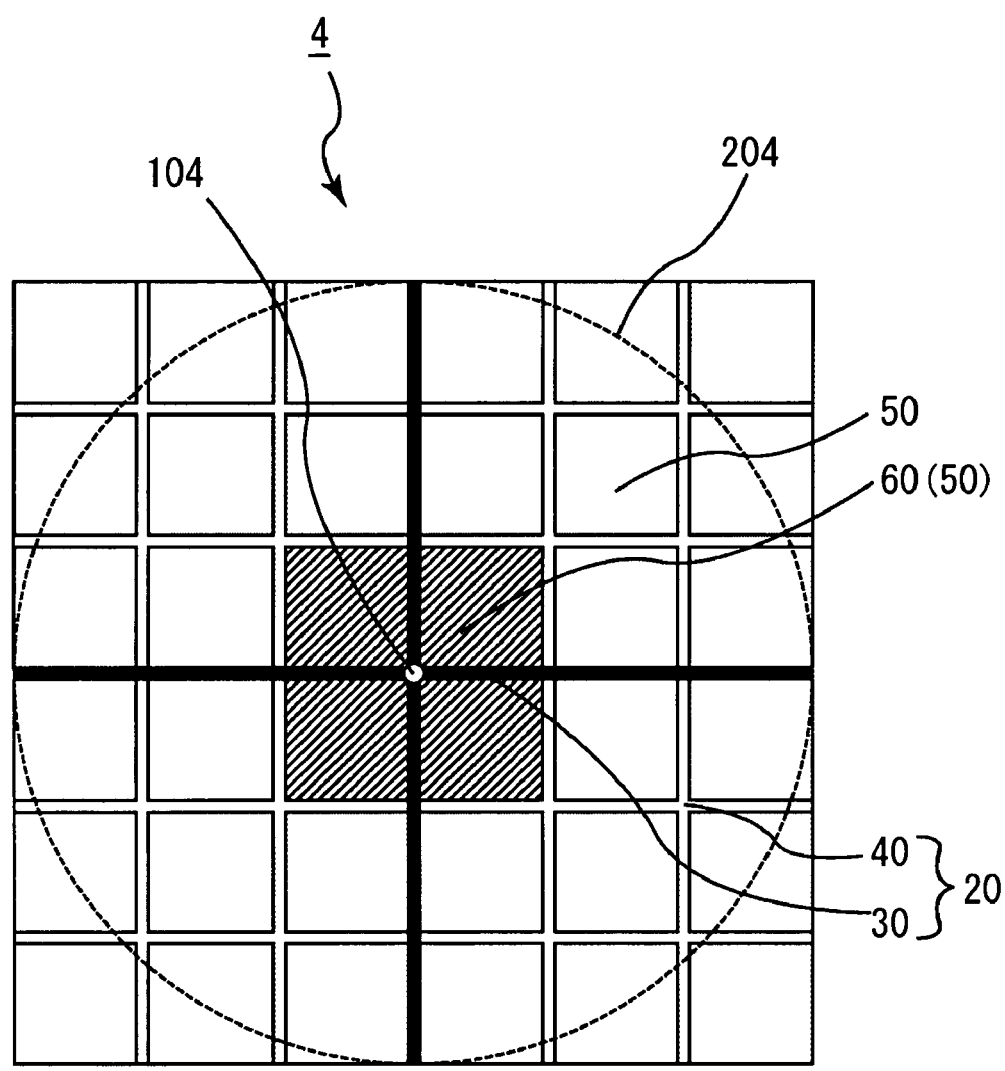
FIG. 6 is a cross-sectional view that schematically shows one example of the honeycomb structure of the first embodiment of the present invention.

FIG. 6 is a cross-sectional view that schematically shows one example of the honeycomb structure of the first embodiment of the present invention.

FIG. 6 shows the cross-section of the honeycomb structure in the same manner as in FIG. 1, and a circle 204 indicated by a dotted line shows a peripheral cut face formed into a round pillar-shape by carrying out peripheral cutting on a rectangular pillar-shaped ceramic block.

Here, the diameter of the circle 204 indicating the peripheral cut face is 200 mm or more.

The honeycomb structure 4 is formed by combining 36 pieces of honeycomb fired bodies 50 in total in 6 columns and 6 rows with one another by interposing an adhesive layer 20. Moreover, four pieces of center-portion honeycomb fired bodies 60 indicated by slanting lines are placed at positions located most closely to the center 104 of the cross-section. Moreover, one adhesive layer 30 is formed at a cross-shaped portion painted black, and the center-portion honeycomb fired bodies 60 are bonded to one another with the one adhesive layer 30 interposed therebetween.

The difference between the honeycomb structure 4 shown in FIG. 6 and the honeycomb structure 1 shown in FIG. 1 is that, in the honeycomb structure 4 shown in FIG. 6, the one adhesive layer 30 is formed to have a cross shape which reaches the upper end and the lower end as well as the right end and the left end of the cross-section.

Here, in the honeycomb structure 4, the one adhesive layer 30 is formed not only in a range where the center-portion honeycomb fired bodies 60 are bonded to one another, but also in a range where honeycomb fired bodies 50 other than the center-portion honeycomb fired bodies 60 are bonded to one another.

That is, in the honeycomb structure of the present embodiment, the range where the one adhesive layer is formed is not necessarily limited only to a range between the center-portion honeycomb fired bodies, and only needs to include a range between the center-portion honeycomb fired bodies.

Out of the adhesive layers 20, an other adhesive layer 40 is formed in a range other than the range where the one adhesive layer 30 is formed.

In the present embodiment, the adhesive strength $\alpha$ between the center-portion honeycomb fired bodies 60 bonded to one another with the one adhesive layer 30 interposed therebetween is higher than the adhesive strength $\beta$ between honeycomb fired bodies bonded to one another with the other adhesive layer 40 interposed therebetween.

Here, the adhesive strength β between honeycomb fired bodies bonded to one another with the other adhesive layer 40 interposed therebetween includes the adhesive strength between the center-portion honeycomb fired body 60 and the honeycomb fired body 50 other than the center-portion honeycomb fired body and the adhesive strength between the honeycomb fired bodies 50 other than the center-portion honeycomb fired body.

The adhesive strength between the honeycomb fired bodies can be measured by the three-point bending test, for example, a method in accordance with JIS R 1601.

The contents of JIS R 1601 are incorporated herein by reference in their entirety.

That is, a sample is cut out from the manufactured honeycomb structure to have an adhesive layer vertically positioned in the middle portion thereof and honeycomb fired bodies positioned on the opposite sides of the adhesive layer, and a loaded point is set to be on a part of the adhesive layer, and then three-point bending is carried out. Alternatively, measuring samples may be formed by sandwiching the adhesive layer between honeycomb fired bodies.

The three-point bending strength can be calculated from the following equation (1).

$$\sigma = 3P(L-L1)/2Bh^2 \quad (1)$$

In the above-mentioned equation (1), "σ" represents the three-point bending strength, "P" represents a load, "L–L1" represents the distance between fulcrums, "B" represents the width of a sample piece, and "h" represents the thickness (height) of the sample piece.

In the honeycomb structure of the present embodiment, the adhesive strength α measured by the three-point bending test is at least about 0.8 MPa and at most about 1.6 MPa (load: at least about 20 kgf and at most about 40 kgf), and the adhesive strength β is at least about 0.4 MPa and at most about 1.2 MPa (load: at least about 10 kgf and at most about 30 kgf). Here, in this case, the distance (L–L1) between fulcrums is 57 mm, the width B of the test piece is 34.3 mm, and the thickness (height) h of the test piece is 25 mm.

Here, the adhesive strength α is at least about 1.1 times and at most about 4.0 times higher than the adhesive strength β.

The adhesive layer used for bonding the honeycomb fired bodies of the present embodiment to one another include a combination of inorganic fibers and an inorganic binder, a combination of inorganic particles and an inorganic binder, or a combination of inorganic fibers, inorganic particles and an inorganic binder as main components.

With respect to the ratios of the respective components, when the inorganic fibers and the inorganic binder, or the inorganic particles and the inorganic binder are contained as main components, the content of the inorganic fibers or the inorganic particles is preferably at least about 70% by weight and at most about 95% by weight relative to at least about 5% by weight and at most about 30% by weight of the inorganic binder as solids content, and when the inorganic fibers, the inorganic particles and the inorganic binder are contained as main components, the content of the inorganic particles is preferably at least about 35% by weight and at most about 65% by weight and the content of the inorganic fibers is preferably at least about 30% by weight and at most about 60% by weight relative to at least about 5% by weight and at most about 30% by weight of the inorganic binder as solids content.

The adhesive layer may contain an organic binder. However, upon use of the honeycomb structure as an exhaust gas filter for vehicles, the temperature thereof rises so high that the organic binder is easily decomposed and disappears, leading to fluctuation of the adhesive strength. Therefore, the organic binder is desirably contained in as small an amount as possible.

Moreover, the one adhesive layer preferably has small air bubbles formed by expansion or the like of a foaming material. The thickness of the adhesive layer is preferably at least about 0.5 mm and at most about 2.0 mm.

The adhesive layer having a thickness of about 0.5 mm or more tends not to have a low adhesive strength, and the adhesive layer having a thickness of about 2.0 mm or less tends not to lead to a low aperture ratio of the cells. As a result, the honeycomb structure tends not to have lower performance upon used as a filter for purifying exhaust gases. Moreover, the adhesive layer having a thickness of 2.0 mm or less tends not to cause an increase in the pressure loss.

The following description will discuss a method for manufacturing a honeycomb structure of the present embodiment.

First, a combining process configured to manufacture a ceramic block by bonding a plurality of honeycomb fired bodies to one another with an adhesive layer interposed therebetween will be described, and then the entire manufacturing processes of the honeycomb structure will be described.

In the method for manufacturing a honeycomb structure of the present embodiment, the combining process includes the following processes: bonding nine pieces of honeycomb fired bodies to one another to form a honeycomb aggregated body; and bonding four pieces of honeycomb aggregated bodies to one another with the one adhesive layer interposed therebetween to manufacture a ceramic block.

Although not particularly limited, the method for manufacturing the honeycomb aggregated body by bonding honeycomb fired bodies to one another preferably includes the following processes: forming an adhesive paste layer between the honeycomb fired bodies; and forming an adhesive layer by drying and solidifying the adhesive paste layer to manufacture a honeycomb aggregated body.

Although not particularly limited, examples of the method for forming the adhesive paste layer between the honeycomb fired bodies include a lamination method and a filling method described below.

First, the following description will discuss a method for forming an adhesive paste layer between the honeycomb fired bodies by using the lamination method.

Figure 7:
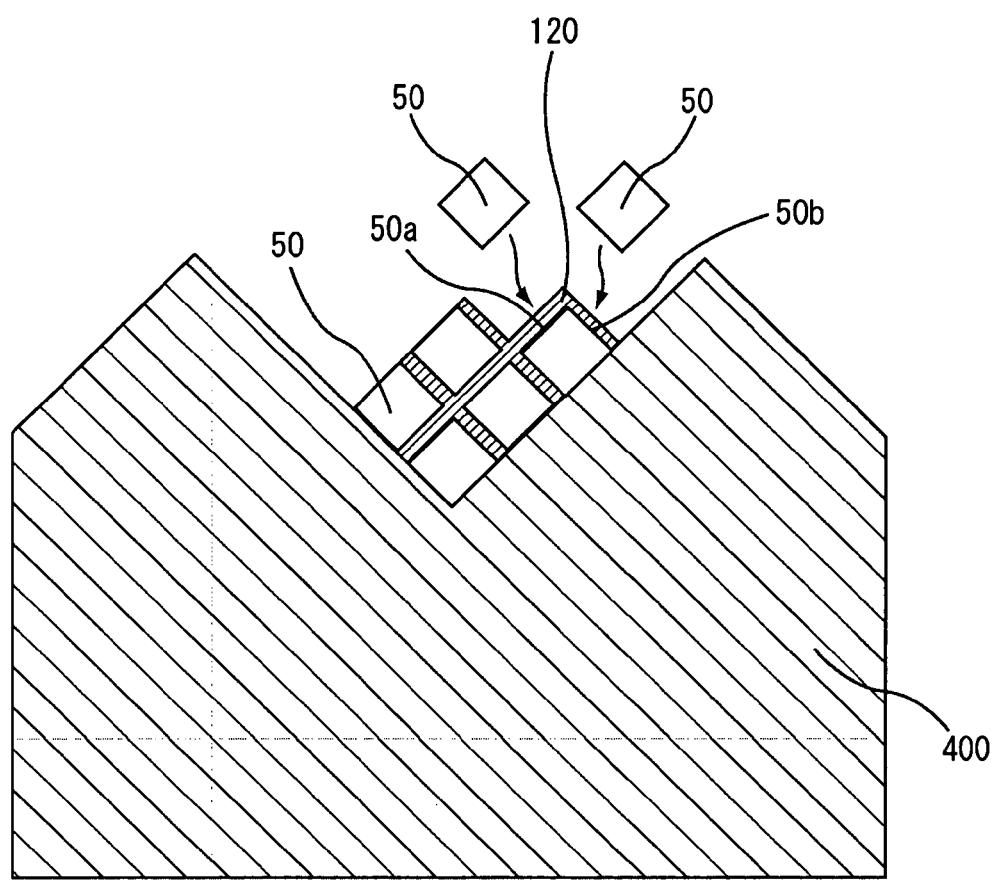
FIG. 7 is an explanatory view that schematically shows a state in which an adhesive paste layer is formed between honeycomb fired bodies by using the lamination method in the manufacturing method according to an embodiment of the present invention.

FIG. 7 is an explanatory view that schematically shows a state in which an adhesive paste layer is formed between the honeycomb fired bodies by using the lamination method in the manufacturing method according to an embodiment of the present invention.

As shown in FIG. 7, in the lamination method, the honeycomb fired bodies 50 are placed to be inclined on a base 400 having an upper portion having a V-shaped cut surface which allows lamination of the honeycomb fired bodies 50 being inclined. Thereafter, the adhesive paste to be the adhesive layer is applied with an even thickness to two side faces 50a and 50b facing upward to form an adhesive paste layer 120. By repeatedly laminating another honeycomb fired body 50 on this adhesive paste layer 120, a laminated body of honeycomb fired bodies including nine pieces of honeycomb fired bodies with the adhesive paste layer interposed therebetween is manufactured.

The following description will discuss a method for forming an adhesive paste layer between the honeycomb fired bodies by using the filling method.

Figure 8:
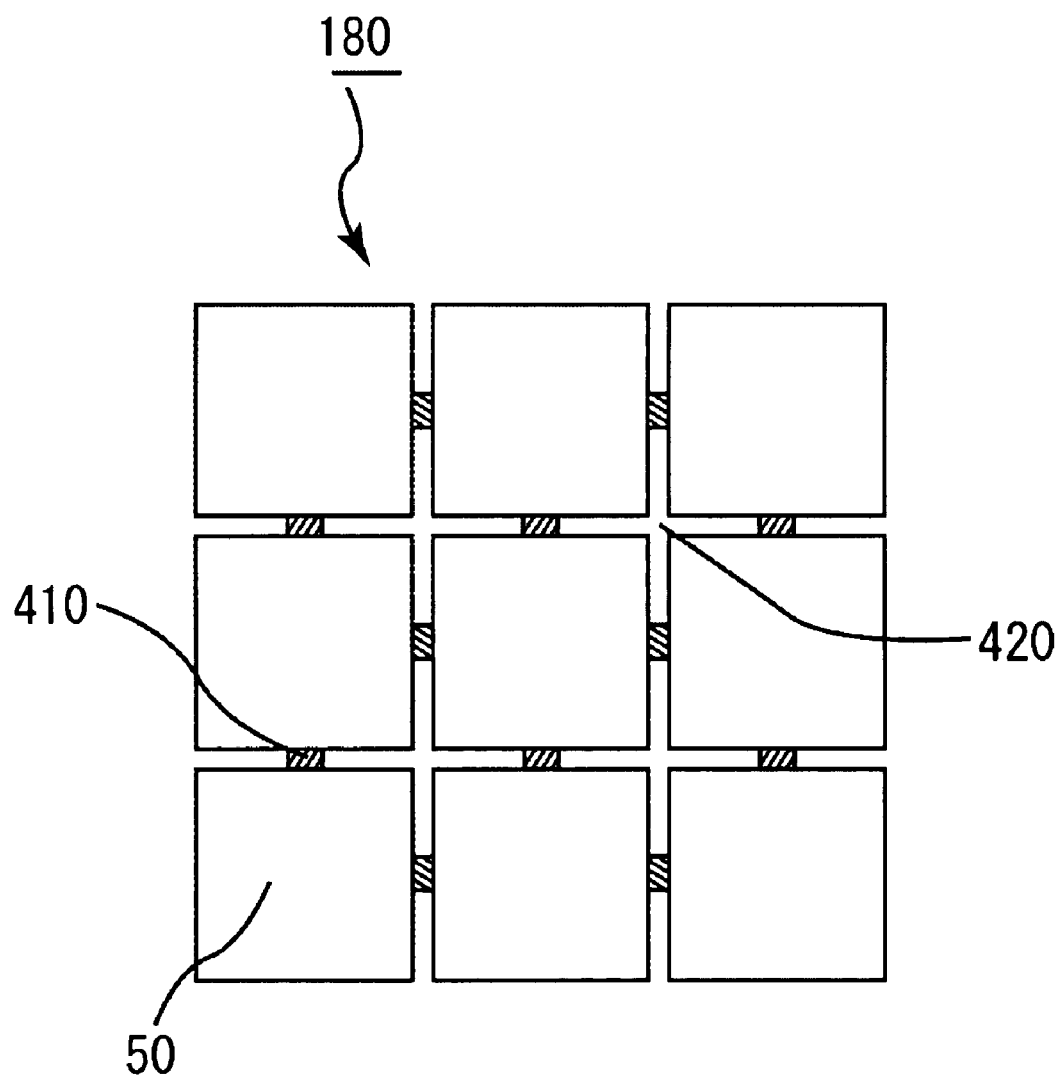
FIG. 8 is a cross-sectional view that schematically shows a cross-section of a parallel-arranged body of honeycomb fired bodies according to an embodiment of the present invention in a direction perpendicular to the longitudinal direction thereof, the view being taken perpendicular to the longitudinal direction of the parallel-arranged body.

FIG. 8 is a cross-sectional view that schematically shows a cross-section of a parallel-arranged body of honeycomb fired bodies according to an embodiment of the present invention in a direction perpendicular to the longitudinal direction thereof, the view being taken perpendicular to the longitudinal direction of the parallel-arranged body.

In the filling method, first, as shown in FIG. 8, a plurality of honeycomb fired bodies 50 are placed in parallel with one another in columns and rows, with a spacer 410 interposed therebetween. The spacer is designed to have the same thickness as the thickness of the adhesive layer to be formed between the honeycomb fired bodies. Therefore, a gap 420 corresponding to the thickness of the spacer is formed between the honeycomb fired bodies.

In the present embodiment, nine pieces of honeycomb fired bodies are placed in parallel with one another in three columns and three rows to manufacture a parallel-arranged body 180 of honeycomb fired bodies.

Successively, a gap formed by the honeycomb fired bodies placed in parallel with one another is filled with an adhesive paste by using a filling apparatus.

Figure 9:
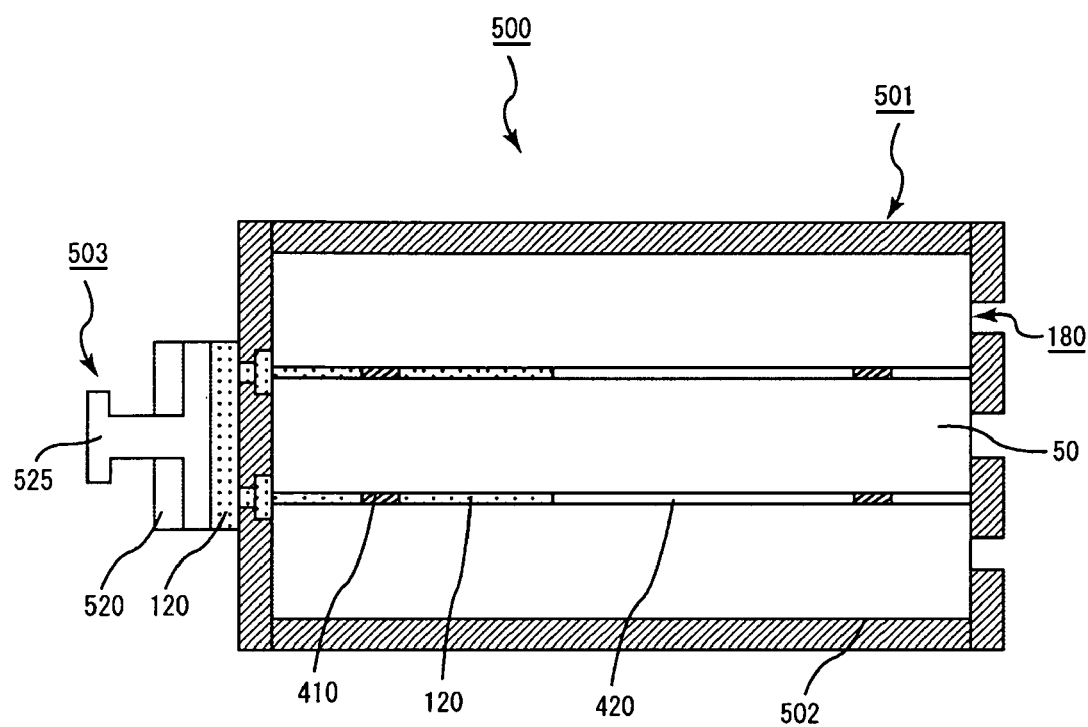
FIG. 9 is a cross-sectional view that schematically shows one example of a cross-section of a filling apparatus and a parallel-arranged body of honeycomb fired bodies placed in the filling apparatus, the view being taken parallel to the longitudinal direction of the parallel-arranged body.

FIG. 9 is a cross-sectional view that schematically shows one example of a cross-section of a filling apparatus and a parallel-arranged body of honeycomb fired bodies placed in the filling apparatus, the view being taken parallel to the longitudinal direction of the parallel-arranged body.

A filling apparatus 500 is provided with a tubiform 501 and a paste supply device 503. The tubiform 501 is provided with an inner space 502 which is allowed to accommodate a parallel-arranged body 180 of honeycomb fired bodies. The paste supply device 503 is provided with a paste chamber 520 for housing an adhesive paste 120 and an extruding mechanism 525 for extruding the adhesive paste 120 out of the paste chamber.

Upon filling the gap formed between the honeycomb fired bodies with the adhesive paste, the parallel-arranged body 180 of honeycomb fired bodies is placed inside the inner space 502 of the tubiform 501, and the paste supply device 503 is set up to the end face of the tubiform 501. Then, the adhesive paste 120 is extruded from the paste chamber 520 of the paste supply device 503 by using the extruding mechanism 525 to fill the gap 420 between the honeycomb fired bodies with the adhesive paste 120.

Through these processes, a laminated body of the honeycomb fired bodies including the nine pieces of honeycomb fired bodies with the adhesive paste layer interposed therebetween is manufactured.

Here, the adhesive paste preferably contains an inorganic binder, inorganic fibers and inorganic particles as its main components. Moreover, the adhesive paste may contain a foaming material.

These inorganic binder, inorganic fibers and inorganic particles, as well as the foaming material, will be described later.

Successively, the laminated body of the honeycomb fired bodies is heated by using a drying apparatus and the like to dry and solidify the adhesive paste layer, and adhesive layer is subsequently formed so that the honeycomb fired bodies are bonded to one another.

Through these processes, a rectangular pillar-shaped honeycomb aggregated body including nine pieces of honeycomb fired bodies can be manufactured.

Here, the adhesive layer formed in these processes corresponds to the other adhesive layer in a honeycomb structure to be manufactured. Moreover, since a honeycomb structure including 36 pieces of honeycomb fired bodies is manufactured in the present embodiment, four pieces of the honeycomb aggregated bodies are manufactured.

Figure 10:
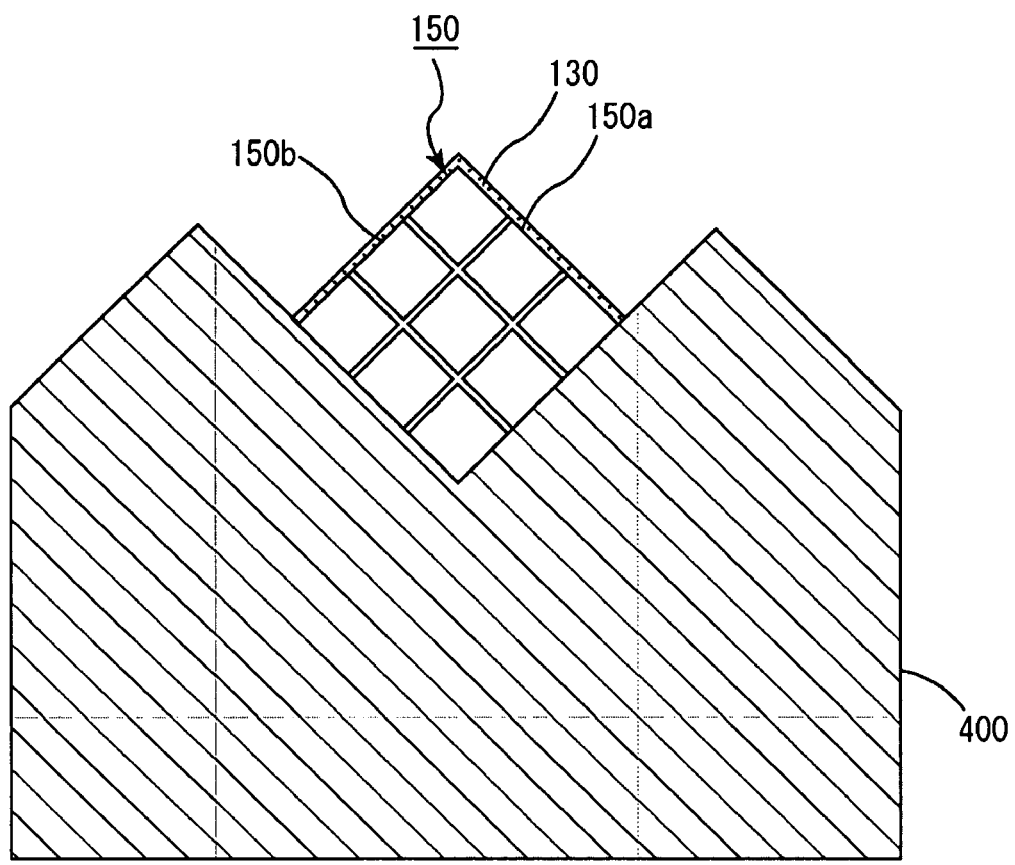
FIG. 10 is an explanatory view that shows a state in which an adhesive paste layer to be one adhesive layer is formed on a honeycomb aggregated body according to an embodiment of the present invention.

FIG. 10 is an explanatory view that shows a state in which an adhesive paste layer to be the one adhesive layer is formed on the honeycomb aggregated body according to an embodiment of the present invention.

Moreover, FIGS. 1A to 11C are explanatory views that show a state in which the honeycomb aggregated bodies are bonded to one another with the one adhesive layer interposed therebetween in a method for manufacturing a honeycomb structure of the first embodiment.

Examples of the method for bonding the honeycomb aggregated bodies to one another to form a ceramic block include the following methods.

First, as shown in FIG. 10, a honeycomb aggregated body 150 including honeycomb fired bodies bonded to one another with the other adhesive layer therebetween is placed to be inclined on a V-shaped base 400, and then an adhesive paste to be the one adhesive layer is applied with an even thickness to two side faces 150a and 150b facing upward so as to form an adhesive paste layer 130.

The adhesive paste used for forming the one adhesive layer contains a foaming material in addition to the material for the above-mentioned adhesive paste.

Moreover, the foaming material content in the adhesive paste used as the raw material for the one adhesive layer is greater than the foaming material content in the adhesive paste used as the raw material for the other adhesive layer.

Examples of the foaming material include two kinds: a material that expands due to heat; and a material that generates a gas by a chemical reaction. Out of these, the material that expands due to heat includes a microcapsule, a foaming resin and the like. The material that generates a gas by a chemical reaction includes an inorganic foaming agent, an expansive agent and the like.

Figure 11C:
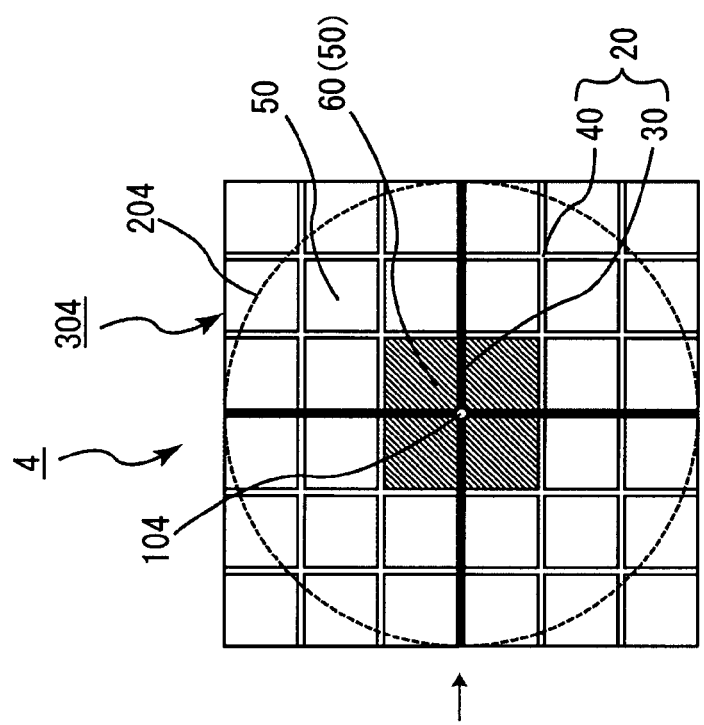
FIGS. 11A to 11C are explanatory views that show a state in which the honeycomb aggregated bodies are bonded to one another with the one adhesive layer interposed therebetween in a method for manufacturing a honeycomb structure of the first embodiment.
Figure 11B:
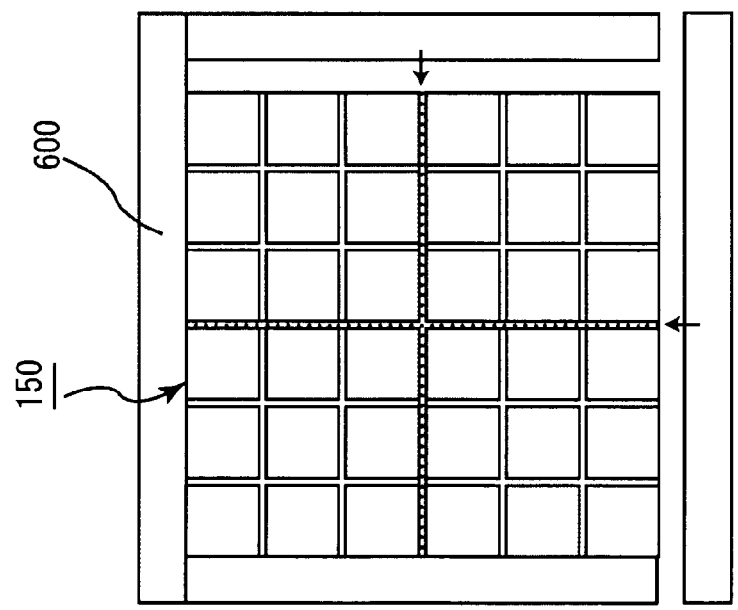
Figure 11A:
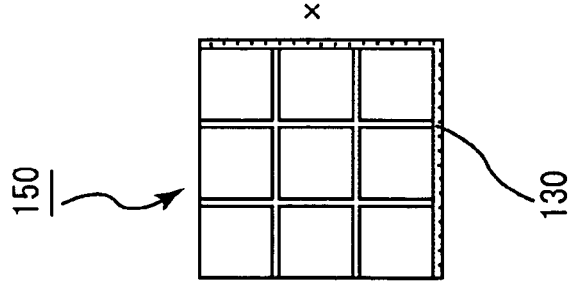

Next, as shown in FIGS. 11A and 11B, four pieces of honeycomb aggregated bodies 150, each having the adhesive paste layer 130 formed on two side faces, are arranged so that the adhesive paste layers 130 are in contact with each other. Then, the periphery of the entire honeycomb aggregated bodies thus arranged is sandwiched by pressurizing and heating plates 600. Thereafter, heating and pressurizing process is carried out on the opposite faces to the side faces having the adhesive paste layer 130 placed thereon of the honeycomb aggregated bodies 150. In FIG. 11B, a pressurizing direction is indicated by an arrow.

The pressurizing and heating plates are not particularly limited, and any plates may be used, as long as they can carry out heating and pressurizing simultaneously; for example, a device in which SUS plates and temperature-adjustable heaters are combined, a hot pressing device or the like may be desirably used.

Moreover, the heating and pressurizing process may be simultaneously carried out in vertical directions and horizontal directions, or may be successively carried out in vertical directions and horizontal directions separately.

Here, the heating and pressurizing are preferably carried out under the following condition. The heating temperature is preferably at least about 150° C. and at most about 500° C., and more preferably at least about 200° C. and at most about 400° C. The applied pressure is preferably at least about 0.2 MPa and at most about 2.0 MPa, and more preferably at least about 0.4 MPa and at most about 1.0 MPa. The heating and pressurizing time is preferably at least about 5 minutes and at most about 60 minutes, and more preferably at least about 10 minutes and at most about 30 minutes. Under the above-mentioned heating and pressurizing conditions, the adhesive paste layer can be positively dried and solidified. As a result, it is possible to form an adhesive layer having a high adhesive strength (at least about 0.8 MPa and at most about 1.6 MPa) measured by the three-point bending test.

Through such a heating and pressurizing process on the side faces of the honeycomb aggregated bodies, the adhesive paste layer is dried and solidified so that, as shown in FIG. 11C, the one adhesive layer 30 with a cross shape can be formed, and a ceramic block 304 including 36 pieces of honeycomb fired bodies can be manufactured.

Here, in the cross-section taken perpendicular to the longitudinal direction of the ceramic block 304, the adhesive layer 30 overlaps the center 104, and the center-portion honeycomb fired bodies are defined to be four pieces of honeycomb fired bodies 60 indicated by slanting lines and located most closely to the center 104.

Here, the above description has discussed the method in which honeycomb aggregated bodies each having honeycomb fired bodies bonded to one another by interposing an adhesive layer (the other adhesive layer) which has been dried and solidified are used to manufacture a ceramic block. However, a ceramic block may be manufactured by using laminated bodies of honeycomb fired bodies in which the adhesive paste has not been dried and solidified as honeycomb aggregated bodies. In this method, upon heating and pressurizing the honeycomb aggregated bodies, the adhesive paste layer to be the one adhesive layer and the adhesive paste layer to be the other adhesive layer are simultaneously dried and solidified.

The following description will discuss entire manufacturing processes for manufacturing the honeycomb structure.

A molding process is carried out to manufacture a honeycomb molded body by extrusion-molding a raw material composition containing ceramic powders and a binder.

First, as a ceramic raw material, silicon carbide powders having different average particle diameters, an organic binder, a plasticizer in liquid form, a lubricant and water are mixed by using a wet mixer to prepare a wet mixture for manufacturing a honeycomb molded body.

Successively, this wet mixture is loaded into an extrusion molding machine.

When the wet mixture is loaded into the extrusion molding machine, the wet mixture is extrusion-molded into a honeycomb molded body having a predetermined shape.

Next, the honeycomb molded body is cut into a predetermined length, and dried by using a drying apparatus, such as a microwave drying apparatus, a hot-air drying apparatus, a dielectric drying apparatus, a reduced-pressure drying apparatus, a vacuum drying apparatus and a freeze drying apparatus, and a sealing process is carried out by filling predetermined cells with a plug material paste to be a plug for sealing the cells.

Here, conditions conventionally used upon manufacturing a honeycomb fired body are applicable for carrying out the cutting process, the drying process and the sealing process.

Next, a degreasing process is carried out to obtain a honeycomb degreased body by removing the organic components in the honeycomb molded body by heating the honeycomb molded body in a degreasing furnace. Then, the honeycomb degreased body is transported to a firing furnace, and a firing process is carried out to manufacture a honeycomb fired body.

By using the above-mentioned processes, the honeycomb fired body is manufactured.

Here, conditions conventionally used upon manufacturing a honeycomb fired body are applicable for carrying out the degreasing process and the firing process.

Thereafter, the combining process described above is carried out on a plurality of honeycomb fired bodies to prepare a ceramic block. Further, a periphery cutting process is carried out to form the ceramic block into a round pillar-shape by cutting the side faces of the ceramic block using a diamond cutter or the like.

Moreover, a coating process is carried out to form a coat layer on the periphery of the ceramic block formed into a round pillar-shape by applying a sealing material paste to the periphery of the ceramic block, then drying and solidifying the sealing material paste.

Here, the sealing material paste may preferably contain the same materials as those of the adhesive paste. Alternatively, the sealing material paste may contain a different material.

The sealing material paste may also contain a foaming material.

Through the above-mentioned processes, a round pillar-shaped honeycomb structure can be manufactured in which a coat layer is formed on the periphery of a ceramic block including a plurality of honeycomb fired bodies bonded to one another with an adhesive layer interposed therebetween.

Here, the coat layer does not necessarily need to be formed, and may be formed on demand.

In the above-mentioned method for manufacturing the honeycomb structure, in order to form at least two kinds of adhesive layers each with a different adhesive strength upon bonding honeycomb fired bodies, two kinds of methods are used in combination, that is, a method in which two kinds of adhesive pastes each having a different foaming material content are used and a method in which heating and pressurizing process is carried out upon forming the one adhesive layer. However, the method forming the one adhesive layer is not particularly limited, as long as at least two kinds of adhesive layers each with a different adhesive strength can be formed upon bonding honeycomb fired bodies, and for example, only one of the two methods may be used.

That is, the same adhesive paste may be used as the material for the one adhesive layer and the other adhesive layer, and heating and pressurizing process may be carried out only upon forming the one adhesive layer.

Alternatively, an adhesive paste having a higher foaming material content than the foaming material content in the adhesive paste used as a raw material for the other adhesive layer may be used as a raw material for the one adhesive layer, and the one adhesive layer and the other adhesive layer may be formed without carrying out the heating and pressurizing process.

Moreover, by using a method other than the above-mentioned methods, at least two kinds of adhesive layers each with a different adhesive strength may be formed upon bonding honeycomb fired bodies.

The following description will summarize the effects of the honeycomb structure and the method for manufacturing a honeycomb structure of the present embodiment.

(1) In the honeycomb structure of the present embodiment, the adhesive strength α between the center-portion honeycomb fired bodies bonded to one another with the one adhesive layer interposed therebetween is higher than the adhesive strength β between honeycomb fired bodies bonded to one another with the other adhesive layer interposed therebetween.

For this reason, even when a high pressure is applied to the center portion of the end face of the honeycomb structure due to exhaust gases upon use of the honeycomb structure as a honeycomb filter or a catalyst supporting carrier, the honeycomb structure is configured to have a structure which hardly allows the honeycomb fired bodies near the center to slip out of the honeycomb structure.

Moreover, even when a large amount of heat is generated by burning a large amount of PM captured on the center-portion honeycomb fired bodies upon use of the honeycomb structure as a honeycomb filer, cracks hardly occur in the adhesive layers due to the high adhesive strength α between the center-portion honeycomb fired bodies. For this reason, the honeycomb structure is configured to have a structure which hardly allows the honeycomb fired bodies near the center to slip out of the honeycomb structure even after repetitive regenerating processes.

(2) In the honeycomb structure of the present embodiment, the adhesive strength α measured by the three-point bending test is at least about 0.8 MPa and at most about 1.6 MPa, and the adhesive strength β measured by the three-point bending test is at least about 0.4 MPa and at most about 1.2 MPa. Moreover, the adhesive strength α is at least about 1.1 times and at most about 4.0 times higher than the adhesive strength β.

Since the relationship between the adhesive strength α and the adhesive strength β is defined as described above, the adhesive strength α between the honeycomb fired bodies near the center is relatively higher than the adhesive strength β between honeycomb fired bodies bonded to one another with the other adhesive layer interposed therebetween. As a result, the honeycomb structure is configured to have a structure which hardly allows the honeycomb fired bodies near the center to slip out of the honeycomb structure.

(3) In the honeycomb structure of the present embodiment, the cross-section taken perpendicular to the longitudinal direction of the ceramic block has a major axis of about 200 mm or more. Moreover, in the present embodiment, 30 pieces or more (36 pieces) of honeycomb fired bodies are combined with one another.

In the honeycomb structure of the present embodiment, since the adhesive strength between the center-portion honeycomb fired bodies is high, the honeycomb structure is configured to have a structure which hardly allows the honeycomb fired bodies near the center to slip out of the honeycomb structure, even when the honeycomb structure includes 36 pieces of honeycomb fired bodies combined with one another so that the major axis of the cross-section perpendicular to the longitudinal direction is as large as about 200 mm or more. On the contrary, a conventional honeycomb structure has a structure which tends to allow the honeycomb fired bodies near the center to slip out of the honeycomb structure, when the honeycomb structure has a major axis of as large as about 200 mm or more in the cross-section perpendicular to the longitudinal direction.

(4) In the method for manufacturing a honeycomb structure of the present embodiment, at least two kinds of adhesive layers each of which bonds honeycomb fired bodies on the both sides with a different adhesive strength from each other are formed in the combining process. Moreover, the center-portion honeycomb fired bodies are bonded to one another by interposing the one adhesive layer having a higher adhesive strength. Therefore, a honeycomb structure having the center-portion honeycomb fired bodies bonded with the high adhesive strength tends to be manufactured.

Thus, in such a honeycomb structure, the honeycomb structure is configured to have a structure which hardly allows the honeycomb fired bodies near the center to slip out of the honeycomb structure even when a high pressure is applied to the center portion of the end face of the honeycomb structure due to exhaust gases upon use of the honeycomb structure as a honeycomb filter or a catalyst supporting carrier.

Moreover, even after the honeycomb structure has been used as a honeycomb filter and then repetitive regenerating processes has been carried out thereon, the honeycomb fired bodies near the center hardly slip out of the honeycomb structure.

(5) In the method for manufacturing a honeycomb structure of the present embodiment, at least two kinds of adhesive pastes each with a different foaming material content are used in combining process, and the foaming material content in the adhesive paste used as a raw material for the one adhesive layer is higher than the foaming material content in the adhesive paste used as a raw material for the other adhesive layer.

Moreover, heating and pressurizing process is carried out on the opposite faces to the side faces having the adhesive paste placed thereon of the center-portion honeycomb fired bodies, and thus, the center-portion honeycomb fired bodies are bonded to one another with the one adhesive layer interposed therebetween.

When the one adhesive layer is formed by pressurizing and heating the adhesive paste containing a foaming material as described above, the foaming material works to avoid large air bubbles occurring in the adhesive layer, and thus making it easier to bond the honeycomb fired bodies with a high adhesive strength. Moreover, since the adhesive layer formed by heating and pressurizing the adhesive paste contains a fewer number of air bubbles and the air bubbles have a smaller size, the honeycomb fired bodies tend to be allowed to be bonded to one another with a high adhesive strength. Thus, it may become easier to form the one adhesive layer which bonds the center-portion honeycomb fired bodies to one another with a high adhesive strength.

(6) In the method for manufacturing a honeycomb structure of the present embodiment, a plurality of honeycomb fired bodies are bonded to one another to form the honeycomb aggregated body, and the honeycomb aggregated bodies are bonded to one another with the one adhesive layer interposed therebetween. In this method, first, the honeycomb aggregated bodies tend to be manufactured by using a simple method. Moreover, by forming the one adhesive layer having a high adhesive strength between the honeycomb aggregated bodies, some of the honeycomb fired bodies bonded to one another with the one adhesive layer tend to be allowed to be the center-portion honeycomb fired body. Therefore, it may become easier to manufacture a honeycomb structure having the center-portion honeycomb fired bodies bonded to one another with a high adhesive strength as a whole.

(7) In the method for manufacturing a honeycomb structure of the present embodiment, at least two kinds of adhesive layers are formed so that the adhesive strength α measured by the three-point bending test is at least about 0.8 MPa and at most about 1.6 MPa, and the adhesive strength β measured by the three-point bending test is at least about 0.4 MPa and at most about 1.2 MPa. Moreover, the two kinds of the adhesive layers are formed so that the adhesive strength α is at least about 1.1 times and at most about 4.0 times higher than the adhesive strength β.

Since the relationship between the adhesive strength α and the adhesive strength β is defined as described above, the adhesive strength α between the center-portion honeycomb fired bodies is relatively higher than the adhesive strength β between honeycomb fired bodies bonded to one another with the other adhesive layer interposed therebetween. As a result, the honeycomb structure is configured to have a structure which more hardly allows the honeycomb fired bodies near the center to slip out of the honeycomb structure.

(8) In the method for manufacturing a honeycomb structure of the present embodiment, 30 pieces or more (36 pieces) of honeycomb fired bodies are combined with one another to manufacture the honeycomb structure having a diameter of about 200 mm or more in the cross-section of the ceramic block taken perpendicularly to the longitudinal direction thereof.

In the method for manufacturing a honeycomb structure of the present embodiment, since the adhesive layer is formed to bond the center-portion honeycomb fired bodies with a higher adhesive strength, it may become easier to manufacture a honeycomb structure having a structure which hardly allows the honeycomb fired bodies near the center to slip out of the honeycomb structure even when the honeycomb structure includes 36 pieces of honeycomb fired bodies combined with one another so that the major axis of the cross-section of the ceramic block taken perpendicularly to the longitudinal direction thereof is as large as about 200 mm or more. On the contrary, a conventional honeycomb structure has a structure which tends to allow the honeycomb fired bodies near the center to slip out of the honeycomb structure, when the ceramic block has a major axis of as large as about 200 mm or more in the cross-section perpendicular to the longitudinal direction.

The following description will discuss Examples that specifically disclose the first embodiment of the present invention. Here, the present invention is not intended to be limited only by these Examples.

EXAMPLE 1

(Manufacturing Process of Honeycomb Fired Body)

An amount of 52.8% by weight of a silicon carbide coarse powder having an average particle diameter of 22 μm and 22.6% by weight of a silicon carbide fine powder having an average particle diameter of 0.5 μm were mixed. To the resulting mixture, 2.1% by weight of an acrylic resin, 4.6% by weight of an organic binder (methylcellulose), 2.8% by weight of a lubricant (UNILUB, manufactured by NOF Corporation), 1.3% by weight of glycerin, and 13.8% by weight of water were added, and then kneaded to prepare a wet mixture. The obtained wet mixture was extrusion-molded, so that a raw honeycomb molded body having virtually the same shape as the shape shown in FIG. 5A and having cells not sealed was manufactured.

Next, the raw honeycomb molded body was dried by using a microwave drying apparatus to obtain a dried honeycomb molded body. A paste having the same composition as that of the raw molded body was then filled into predetermined cells, and the dried honeycomb molded body was again dried by using a drying apparatus.

The dried honeycomb molded body was degreased at 400° C., and then fired at 2200° C. under normal pressure argon atmosphere for three hours, so that a honeycomb fired body including a silicon carbide sintered body, with a porosity of 45%, an average pore diameter of 15 μm, a size of 34.3 mm×34.3 mm×150 mm, the number of cells (cell density) of 300 pcs/inch2 and a thickness of the cell wall of 0.25 mm (10 mil), was manufactured.

(Preparation of Adhesive Paste)

An amount of 30% by weight of alumina fibers having an average fiber length of 20 μm, 21% by weight of silicon carbide particles having an average particle diameter of 0.6 μm, 15% by weight of silica sol (solids content 30% by weight), 5.6% by weight of carboxymethyl cellulose, and 28.4% by weight of water were mixed and kneaded to prepare an adhesive paste.

(Preparation of Adhesive Paste Containing Foaming Material)

An amount of 4.0 parts by weight of microcapsules serving as a foaming material were added to 100 parts by weight of the adhesive paste to prepare an adhesive paste containing the foaming material.

Capsules prepared by sealing isobutane gas in shell members of a thermoplastic organic material (acrylonitrile) were used as the microcapsules, the shell member having a diameter of 10 to 50 μm and an appropriate foaming magnification of about 4 times.

(Combining Process)

Honeycomb fired bodies were placed on a base having an upper portion having a V-shaped cut surface as shown in FIG. 7, along the V-shape of the base. Thereafter, the adhesive paste was applied by using a squeeze to two side faces facing upward so as to form an adhesive paste layer. By repeatedly laminating another honeycomb fired body on this adhesive paste layer, a laminated body of honeycomb fired bodies including nine pieces of honeycomb fired bodies with the adhesive paste layer interposed therebetween was manufactured.

The laminated body of the honeycomb fired bodies was heated to 120° C. so that the adhesive paste layer were solidified to be formed into an adhesive layer; thus, a rectangular pillar-shaped honeycomb aggregated body including nine pieces of honeycomb fired bodies was manufactured.

By repeating these processes, four pieces of honeycomb aggregated bodies were manufactured.

The honeycomb aggregated bodies were placed on a base having an upper portion having a V-shaped cut surface as shown in FIG. 10, along the V-shape of the base. Thereafter, the adhesive paste containing the foaming material was applied by using a squeeze to two side faces facing upward so as to form an adhesive paste layer containing the foaming material.

Next, as shown in FIGS. 11A and 11B, the four pieces of honeycomb aggregated bodies, each having two side faces on which the adhesive paste layer containing the foaming material had been formed were arranged so that the adhesive paste layers containing the foaming material were in contact with each other. Then, the periphery of the entire honeycomb aggregated bodies thus arranged was sandwiched by pressurizing and heating plates including SUS plates and heaters combined together to have a thickness of 2 cm. Thereafter, heating and pressurizing process was carried out on the opposite faces to the side faces having the adhesive paste layers placed thereon of the honeycomb aggregated bodies, so that the adhesive paste was solidified to form an adhesive layer, with formation of small air bubbles in the adhesive layer by foaming of the foaming material.

Here, the heating temperature (a temperature of the pressurizing and heating plates) was set to 300° C., the applied pressure was set to 0.6 MPa, and the heating and pressurizing time was set to 15 minutes.

Through the combining process, a ceramic block including 36 pieces of honeycomb fired bodies combined with one another was manufactured.

(Periphery Cutting Process and Coat Layer Forming Process)

Next, the periphery of the ceramic block was cut into a round pillar-shape by using a diamond cutter.

Successively, a sealing material paste layer having a thickness of 0.2 mm was formed on the periphery of the ceramic block by using a sealing material paste including the same material as that of the adhesive paste (adhesive paste containing no foaming material). The sealing material paste layer was dried at 120° C. so that a round pillar-shaped honeycomb structure having a size of 200 mm in diameter×150 mm in length with a coat layer formed on the periphery thereof was manufactured.

EXAMPLE 2

A honeycomb structure was manufactured by following the same processes as in Example 1 except that in the combining process, an adhesive paste containing no foaming material was used as the adhesive paste applied to the honeycomb aggregated body.

EXAMPLE 3

A honeycomb structure was manufactured by following the same processes as in Example 1 except that in the combining process, after four pieces of honeycomb aggregated bodies had been placed, the adhesive paste containing the foaming material was solidified by heating these honeycomb aggregated bodies at 120° C. in a drying apparatus without using the pressurizing and heating plates to form the adhesive layer.

REFERENCE EXAMPLE 1

A honeycomb structure was manufactured by following the same processes as in Example 1 except that in the combining process, an adhesive paste containing no foaming material was used as the adhesive paste applied to the honeycomb aggregated bodies, and that the temperature of the pressurizing and heating plates was set to 100° C. upon carrying out the heating process by using the pressurizing and heating plates.

REFERENCE EXAMPLE 2

A honeycomb structure was manufactured by following the same processes as in Example 1 except that 0.5 part by weight of the foaming material was added to the adhesive paste with respect to 100 parts by weight of the adhesive paste, and that in the combining process, after four pieces of honeycomb aggregated bodies had been placed, the adhesive paste was solidified by heating these honeycomb aggregated bodies at 120° C. in a drying apparatus without using the pressurizing and heating plates to form the adhesive layer.

COMPARATIVE EXAMPLE 1

In the combining process, a laminated body of honeycomb fired bodies including 36 pieces of honeycomb fired bodies was manufactured by applying an adhesive paste containing no foaming material to a honeycomb fired body on a base having a V-shaped cross-section to form an adhesive paste layer, and by repeating a laminating process in which another honeycomb fired body is laminated on the adhesive paste layer.

By heating the laminated body of the honeycomb fired bodies at 120° C. in a drying apparatus, the adhesive paste layer was solidified to be formed into an adhesive layer so that a rectangular pillar-shaped ceramic block including 36 honeycomb fired bodies was manufactured.

A honeycomb structure was manufactured by following the same processes as in Example 1, except for the above-mentioned processes.

(Measurement of Adhesive Strength Between Honeycomb Fired Bodies)

Each of the manufactured honeycomb structures was measured for the adhesive strength α between the center-portion honeycomb fired bodies bonded to one another with the one adhesive layer interposed therebetween and the adhesive strength β between honeycomb fired bodies bonded to one another with an other adhesive layer interposed therebetween by using three-point bending test carried out in accordance with JIS R 1601.

That is, a sample was cut out from each manufactured honeycomb structure so as to have the adhesive layer being vertically positioned in the middle portion and the honeycomb fired bodies being positioned on both sides of the adhesive layer sandwiched therebetween. A loaded point was set to be on a part of the adhesive layer, and then the three-point bending test was carried out by using an Instron tensile meter. The bending strengths were calculated based upon the following equation (1).

$$\sigma = 3P(L-L1)/2Bh^2 \quad (1)$$

In this case, the distance between fulcrums (L−L1) was 57 mm; the width B of the sample piece was 34.3 mm; and the thickness (height) h of the sample piece was 25 mm.

Table 1 shows the adhesive strengths α and the adhesive strengths β thus measured, and the ratios (α/β) of the adhesive strength α and the adhesive strength β.

(Durability to Cycle Driving Operation)

First, each of the manufactured honeycomb structures in all Examples, Reference Examples and Comparative Example was placed in an exhaust passage of an engine, and a commercially available catalyst supporting honeycomb structure made of cordierite (diameter: 145 mm, length: 100 mm, cell density: 400 pcs/inch2, amount of supported platinum: 5 g/L) was placed in the exhaust passage of an engine at a position closer to a gas-inlet side than the honeycomb structure as an exhaust gas purifying apparatus. Particulates were captured for 7 hours, while the engine was driven at the number of revolutions of 3000 min-1 and a torque of 50 Nm. The amount of the captured particulates was 8 g/L.

Next, the engine was driven at the number of revolutions of 1250 min-1 and a torque of 60 Nm, and when the temperature of the filter became constant, the state was kept for one minute. Thereafter, a post injection was performed, and then the temperature of exhaust gases was raised by utilizing the oxidation catalyst present at the front side of the exhaust gas purifying apparatus to burn particulates.

The conditions for the post injection were set so that the temperature of the center portion of the honeycomb structures was raised and became almost constant at 600° C. within 1 minute from the initiation. Then, the above-mentioned processes were repeated 10 times, and observations were performed visually or using a magnifying microscope (magnification: 5 times) to determine whether or not any cracks had occurred in the adhesive layer bonding the center-portion honeycomb fired bodies to each other and whether or not the honeycomb structures had any slipping portion having slipped therefrom (honeycomb fired bodies shifted from the predetermined positions). Table 1 shows the results of the external appearance observations.

Here, Table 1 also shows the amounts of addition (% by weight) of the foaming material in the adhesive paste used for forming the one adhesive layer that bonds the center-portion honeycomb fired bodies to one another, and the heating temperature and the applied pressure (° C./MPa) upon bonding the honeycomb aggregated bodies to one another by using the pressurizing and heating plates.

Moreover, symbols "-" in Table 1 indicate cases when an adhesive paste containing no foaming material was used, or when the heating and pressurizing process using the pressurizing and heating plates was not carried out.

This is presumably because, in the respective Examples, the adhesive strength α is as high as 0.8 MPa or more, and 1.1 times or more higher than the adhesive strength β, that is, the adhesive strength α between the center-portion honeycomb fired bodies is sufficiently high.

TABLE 1

| | One adhesive layer | | Honeycomb structure | | | | |
|---|---|---|---|---|---|---|---|
| | | | Adhesive strength | | | External appearance observation | |
| | Foaming material (% by weight) | Heating and pressurizing (° C./MPa) | Adhesive strength α(MPa) | Adhesive strength β(MPa) | α/β | Cracks in adhesive layer | Slipping of honeycomb fired bodies |
| Example 1 | 4.0 | 300/0.6 | 1.37 | 0.65 | 2.17 | Absent | Absent |
| Example 2 | — | 300/0.6 | 1.16 | 0.65 | 2.00 | Absent | Absent |
| Example 3 | 4.0 | — | 0.97 | 0.65 | 1.67 | Absent | Absent |
| Reference Example 1 | — | 100/0.6 | 0.70 | 0.65 | 1.17 | Partially present | Absent |
| Reference Example 2 | 0.5 | — | 0.67 | 0.65 | 1.03 | Partially present | Absent |
| Comparative Example 1 | — | — | 0.65 | 0.65 | 1.00 | Present | Present |

As clearly shown by the results in Table 1, in the respective Examples and Comparative Examples, no slipping portions of the center-portion honeycomb fired bodies (the honeycomb fired bodies shifted from the predetermined positions) were observed after cycle driving operations. This is presumably because the adhesive strengths α between the center-portion honeycomb fired bodies bonded to one another with the one adhesive layer interposed therebetween are higher than the adhesive strengths β between honeycomb fired bodies bonded to one another with the other adhesive layer interposed therebetween.

On the contrary, in the Comparative Example, in the honeycomb structure in which the adhesive strength α between the center-portion honeycomb fired bodies bonded to one another with the one adhesive layer interposed therebetween was as low as the adhesive strength β between honeycomb fired bodies bonded to one another with the other adhesive layer interposed therebetween, slipping portions of the center-portion honeycomb fired bodies (honeycomb fired bodies shifted from the predetermined positions) from the honeycomb structure were observed after cycle driving operations.

The results of the respective Examples, Reference Examples and Comparative Example indicate that there is a correlation between the relationship between the adhesive strength α and the adhesive strength β obtained by the three-point bending test and easy slipping of the honeycomb fired bodies near the center from the honeycomb structure. That is, when the adhesive strength α is higher than the adhesive strength β, since the strength of the one adhesive layer against a pressure on the end face of the honeycomb structure due to exhaust-gas flows is relatively higher than the strength of the other adhesive layer, the honeycomb fired bodies near the center hardly slip from the honeycomb structure (hardly shift from the predetermined positions).

Moreover, in the respective Examples, no cracks occurred in the adhesive layer bonding the center-portion honeycomb fired bodies to one another. In contrast, in the respective Reference Examples, cracks occurred in one portion of the adhesive layer bonding the center-portion honeycomb fired bodies to one another, but no cracks developed.

(Second Embodiment)

The following description will discuss a second embodiment that is an other embodiment of the present invention.

Figure 12A:
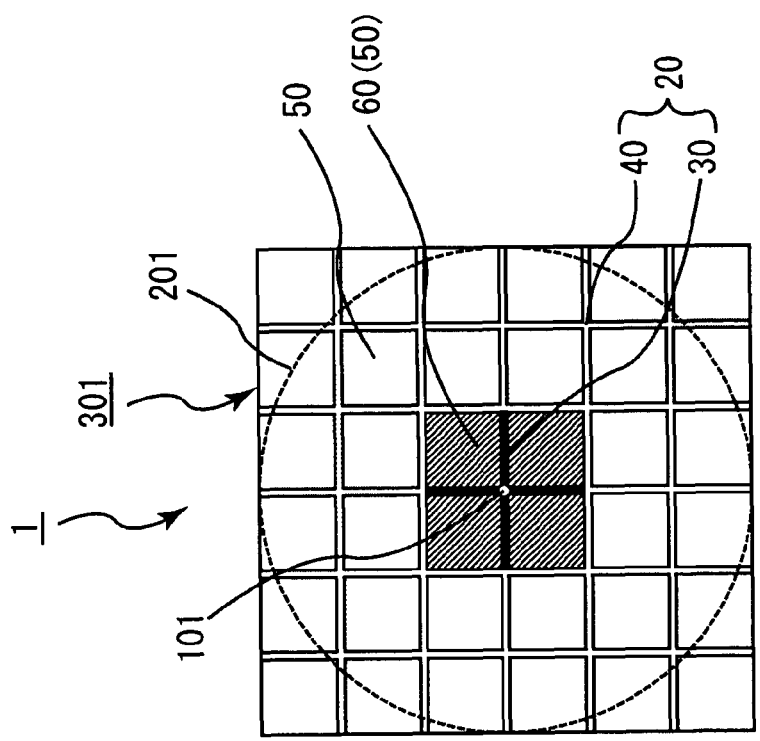

FIGS. 12A to 12D are explanatory views that schematically show one example of a method for manufacturing a honeycomb structure of the second embodiment. Moreover, FIG. 12D schematically shows one example of the honeycomb structure of the second embodiment.

In a honeycomb structure of the second embodiment, the one adhesive layer 30 is formed only between center-portion honeycomb fired bodies 60, and is not allowed to reach the end portions of the cross-section. Except the above-mentioned structure, the honeycomb structure of the second embodiment is configured to be the same as the honeycomb structure of the first embodiment.

Here, this structure is the same as that of the honeycomb structure shown in FIG. 1.

With reference to FIGS. 12A to 12D, out of the processes of the method for manufacturing a honeycomb structure of the second embodiment, the following description will discuss the processes different from those of the method for manufacturing a honeycomb structure of the first embodiment.

First, a center-portion-aggregating process is carried out as follows. As shown in FIG. 12A, an adhesive paste containing a foaming material is applied to a gap formed by four pieces of honeycomb fired bodies 50 to be center-portion honeycomb fired bodies in a honeycomb structure to be completed, so as to form an adhesive paste layer 130. The opposite side faces to the side face having the adhesive paste placed thereon of the honeycomb fired bodies 50 are heated and pressurized with these four pieces of honeycomb fired bodies 50 being sandwiched by pressurizing and heating plates 600.

Figure 12B:
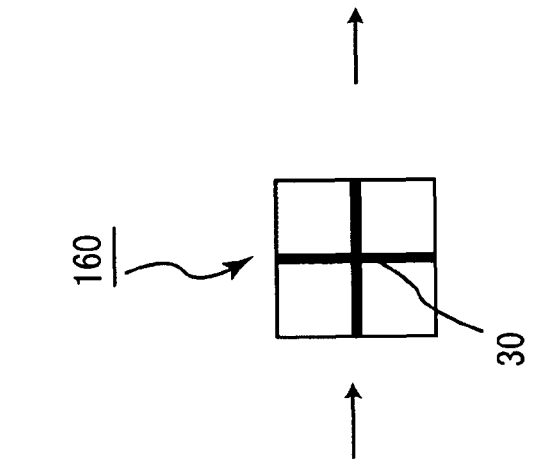

Through the center-portion-aggregating process, a center-portion honeycomb aggregated body 160, which is a honeycomb aggregated body including the honeycomb fired bodies combined with one another by interposing the one adhesive layer 30 having a high adhesive strength, is manufactured (see FIG. 12B).

Next, a periphery-aggregating process is carried out by bonding the center-portion honeycomb aggregated body 160 shown in FIG. 12B and 32 pieces of honeycomb fired bodies

Figure 12C:
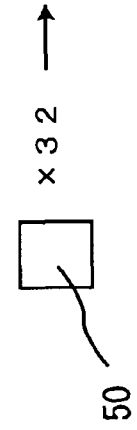

50 shown in FIG. 12C to one another to manufacture a ceramic block 301 including 36 pieces of honeycomb fired bodies. Thereafter, a periphery cutting process is carried out along a peripheral cut face 201, and another process is carried out on demand to manufacture a honeycomb structure 1 as shown in FIG. 12D.

Although not particularly limited, the method for forming an adhesive paste layer between the center-portion honeycomb aggregated body 160 and the honeycomb fired body 50 as well as between the respective honeycomb fired bodies 50 may be carried out by using, for example, the above-mentioned lamination method or filling method.

In addition to the effects (1) to (5), and (7) and (8), described in the first embodiment, the present embodiment can exert the following effects.

(9) In the method for manufacturing a honeycomb structure of the present embodiment, the center-portion-aggregating process for manufacturing the center-portion honeycomb aggregated body containing center-portion honeycomb fired bodies is carried out. By manufacturing the center-portion honeycomb aggregated body first of all in the center-portion-aggregating process, the center-portion honeycomb fired bodies tend to be allowed to be bonded to one another by interposing the one adhesive layer having a high adhesive strength. Moreover, the bonding process of other honeycomb fired bodies by interposing the other adhesive layer without the necessity of having a high adhesive strength, can be carried out by using a simpler method. For this reason, a honeycomb structure having the center-portion honeycomb fired bodies bonded to one another with a high adhesive strength tends to be easily manufactured as a whole.

(Third Embodiment)

The following description will discuss a third embodiment that is a still other embodiment of the present invention.

FIGS. 13A to 13E are explanatory views that schematically show one example of a method for manufacturing a honeycomb structure of the third embodiment. Moreover, FIG. 13E schematically shows one example of the honeycomb structure in accordance with the third embodiment. The honeycomb structure of the third embodiment is configured to be the same as the honeycomb structure of the second embodiment, and the second embodiment and the third embodiment differs from each other in only a part of processes of the manufacturing method for the honeycomb structure.

With reference to FIGS. 13A to 13E, the following description will discuss those points of the method for manufacturing a honeycomb structure of the third embodiment that are different from those of the method for manufacturing a honeycomb structure of the first embodiment.

First, as shown in FIG. 13A, a center-portion-aggregating process is carried out by following the same processes as in the method for manufacturing a honeycomb structure of the second embodiment to manufacture a center-portion honeycomb structure 160 (see FIG. 13B).

Separately, four pieces of honeycomb fired bodies 50 shown in FIG. 13C are bonded to one another to manufacture a honeycomb aggregated body 170 (see FIG. 13D) including four pieces of honeycomb fired bodies. This honeycomb aggregated body is referred to as a periphery honeycomb aggregated body. The periphery honeycomb aggregated body 170 can be manufactured by using the method described in the method for manufacturing a honeycomb structure of the first embodiment.

Here, the adhesive layer formed in this process corresponds to the other adhesive layer 40.

Moreover, by carrying out a periphery-aggregating process for bonding a single piece of a center-portion honeycomb aggregated body 160 and eight pieces of periphery honeycomb aggregated bodies 170 to one another, a ceramic block 301 including 36 pieces of honeycomb fired bodies is manufactured. Thereafter, a periphery cutting process is carried out along a peripheral cut face 201, and another process is carried out on demand to manufacture a honeycomb structure 1 shown in FIG. 13E.

Here, although not particularly limited, the method for forming the adhesive paste layer between the center-portion honeycomb aggregated body 160 and the periphery honeycomb aggregated bodies 170 as well as between the respective periphery honeycomb aggregated bodies 170 may be carried out by using, for example, the above-described lamination method or filling method.

In addition to the effects (1) to (5), and (7) to (9), described in the first embodiment and the second embodiment, the present embodiment can exert the following effects.

(10) In the method for manufacturing a honeycomb structure of the present embodiment, a plurality of honeycomb fired bodies are bonded to one another in the periphery-aggregating process to manufacture the periphery honeycomb aggregated body. Moreover, the center-portion honeycomb aggregated body including center-portion honeycomb fired bodies was manufactured separately. Then, the center-portion honeycomb aggregated body and the periphery honeycomb aggregated bodies are bonded to each other.

Use of the method also makes it easier to easily manufacture a honeycomb structure having the center-portion honeycomb fired bodies bonded to one another with a high adhesive strength as a whole.

(Fourth Embodiment)

The following description will discuss a fourth embodiment that is a still other embodiment of the present invention.

FIGS. 14A to 14D are explanatory views that schematically show one example of a method for manufacturing a honeycomb structure of the fourth embodiment. Moreover, FIG. 14D schematically shows one example of the honeycomb structure of the fourth embodiment. In a honeycomb structure 5 shown in FIG. 14D, the one adhesive layer 30 is formed on the entire side faces of the central-portion honeycomb fired body 60.

Here, the entire adhesive layer located in an area within a distance of about 50 mm from the center 105 of the cross-section of a ceramic block 305 is the one adhesive layer 30.

Except the above-mentioned structure, the honeycomb structure of the fourth embodiment is configured to be the same as the honeycomb structure of the first embodiment.

With reference to FIGS. 14A to 14D, out of the processes of the method for manufacturing a honeycomb structure of the fourth embodiment, the following description will discuss the processes different from those of the method for manufacturing a honeycomb structure of the first embodiment.

First, as shown in FIG. 14A, an adhesive paste containing a foaming material is applied to a gap formed by four pieces of honeycomb fired bodies 50 to be center-portion honeycomb fired bodies in a honeycomb structure to be completed, so as to form an adhesive paste layer 130. Next, the adhesive paste containing a foaming material is also applied to the periphery of the four pieces of honeycomb fired bodies 50 to form the adhesive paste layer 130. Two pieces of honeycomb fired bodies 50 are placed on each of the open peripheries of the four pieces of honeycomb fired bodies; that is, total eight pieces of honeycomb fired bodies are placed on the open peripheries of the four pieces of honeycomb fired bodies.

Here, no adhesive paste layer is formed between each of the two pieces of honeycomb fired bodies 50 placed on the periphery of the four pieces of honeycomb fired bodies.

Next, the opposite side faces to the side face having the adhesive paste placed thereon of the periphery honeycomb fired bodies 50 are heated and pressurized with the 12 pieces of honeycomb fired bodies being sandwiched by pressurizing and heating plates 600 to carry out a center-portion-aggregating process.

Through the center-portion-aggregating process, a center-portion honeycomb aggregated body 161 (see FIG. 14B) is manufactured in which the four pieces of honeycomb fired bodies placed in the center and the honeycomb fired bodies placed on the periphery of these four pieces of honeycomb fired bodies are combined with one another by interposing the one adhesive layer 30 having a high adhesive strength.

Moreover, by carrying out a periphery-aggregating process for bonding one center-portion honeycomb aggregated body 161 shown in FIG. 14B and 24 pieces of honeycomb fired bodies 50 shown in FIG. 14C to one another, a ceramic block 305 including 36 pieces of honeycomb fired bodies is manufactured. Thereafter, a periphery cutting process is carried out along a peripheral cut face 205, and another process is carried out on demand to manufacture a honeycomb structure 5 as shown in FIG. 14D. Although not particularly limited, the method for forming an adhesive paste layer between the respective honeycomb fired bodies 50 is preferably carried out by using the filling method. This is because no adhesive paste layer is formed between the honeycomb fired bodies placed on the periphery of the four pieces of honeycomb fired bodies located at the center in the center-portion-aggregating process.

In addition to the effects (1) to (5), and (7) to (9), described in the first embodiment and the second embodiment, the present embodiment can exert the following effect.

(11) In the honeycomb structure of the present embodiment, the one adhesive layer is located in an area within a distance of about 50 mm from the center of the cross-section of the ceramic block perpendicular to the longitudinal direction thereof.

The area of the side faces within a distance of about 50 mm from the center of the cross-section of the honeycomb structure particularly tends to receive a high pressure due to exhaust gases. However, in the honeycomb structure of the present embodiment, the honeycomb fired bodies located in the area are bonded to one another with the one adhesive layer interposed therebetween and the adhesive strength between the honeycomb fired bodies bonded with the one adhesive layer interposed therebetween is high. Therefore, the honeycomb structure is configured to have a structure which hardly allows the honeycomb fired bodies near the center to slip out of the honeycomb structure.

(Fifth Embodiment)

The following description will discuss a fifth embodiment that is a still other embodiment of the present invention.

FIGS. 15A to 15F are explanatory views that schematically show one example of a method for manufacturing a honeycomb structure of the fifth embodiment. Moreover, FIG. 15F schematically shows one example of the honeycomb structure of the fifth embodiment.

In the honeycomb structure 6 of the fifth embodiment, one adhesive layer 30 is formed between center-portion honeycomb fired bodies 60. Here, the honeycomb structure 6 is described under an assumption that the honeycomb structure 6 is configured by groups obtained by dividing the honeycomb structure vertically into two sections and horizontally into three sections and respectively including six pieces of honeycomb fired bodies in two columns and three rows. The one adhesive layer 30 is formed in a range of the adhesive layer corresponding to the borders of the respective groups.

Except the above-mentioned structure, the honeycomb structure of the fifth embodiment is configured to be the same as the honeycomb structure of the first embodiment.

With reference to FIGS. 15A to 15F, out of the processes of the method for manufacturing a honeycomb structure of the fifth embodiment, the following description will discuss the processes different from those of the method for manufacturing a honeycomb structure of the first embodiment.

First, as shown in FIG. 15A, a center-portion-aggregating process is carried out by following the same processes as in the method for manufacturing the honeycomb structure of the second embodiment to manufacture a center-portion honeycomb aggregated body 160 (see FIG. 15B).

Separately, by bonding honeycomb fired bodies 50 shown in FIG. 15C to one another, two pieces of periphery honeycomb aggregated bodies 170 (see FIG. 15D), each including four pieces of honeycomb fired bodies, and four pieces of periphery honeycomb aggregated bodies 171 (see FIG. 15D), each including six pieces of honeycomb fired bodies, are manufactured by following the same manufacturing method for a honeycomb structure of the third embodiment.

Moreover, by using the same method for manufacturing a honeycomb structure of the first embodiment, the adhesive paste layer 130 containing a foaming material is formed in a necessary ranges along the side faces of the center-portion honeycomb aggregated body 160, the periphery honeycomb aggregated bodies 170 and the periphery honeycomb aggregated bodies 171.

Moreover, as shown in FIG. 15E, a single piece of a center-portion honeycomb aggregated body 160, two pieces of periphery honeycomb aggregated bodies 170 and four pieces of periphery honeycomb aggregated bodies 171 are arranged so that the faces having the adhesive paste layer containing a foaming material formed thereon are in contact with each other. Then, the periphery of the entire arranged honeycomb aggregated bodies is sandwiched by pressurizing and hearing plates 600. Then, a heating and pressurizing process is carried out on the opposite side faces to the side faces having the adhesive paste thereon of the periphery honeycomb aggregated bodies.

Here, upon the heating and pressurizing process, SUS plates or the like, each having a recessed portion formed at a position where the adhesive paste overflows, are preferably used as the pressurizing and heating plates.

By carrying out the periphery-aggregating process to bond one center-portion honeycomb aggregated body 160, two pieces of periphery honeycomb aggregated bodies 170 and four pieces of periphery honeycomb aggregated bodies 171 to one another, a ceramic block 306 including 36 pieces of honeycomb fired bodies is manufactured. Thereafter, a periphery cutting process is carried out along a peripheral cut face 206, and another process is carried out on demand to manufacture a honeycomb structure 6 shown in FIG. 15F.

Here, in the present embodiment, the adhesive layer formed between the center-portion honeycomb aggregated body 160 and the periphery honeycomb aggregated bodies 170 or the periphery honeycomb aggregated bodies 171 is the one adhesive layer 30 which bonds the honeycomb fired bodies to one another with a high adhesive strength.

The present embodiment can exert the effects (1) to (5) and (7) to (10), described in the first embodiment, the second embodiment and the third embodiment.

(Sixth Embodiment)

The following description will discuss a sixth embodiment that is a still other embodiment of the present invention.

FIGS. 16A to 16D are explanatory views that schematically show one example of a method for manufacturing a honeycomb structure of the sixth embodiment. Moreover, FIG. 16D schematically shows one example of the honeycomb structure of the sixth embodiment.

In a honeycomb structure 7 of the sixth embodiment, the one adhesive layer 30 is formed into a cross shape that reaches the upper end and lower end as well as the right end and left end of the cross-section.

The honeycomb structure 7 has an octagonal pillar shape. Unlike the honeycomb structure of the first embodiment, since the honeycomb structure 7 is manufactured without cutting the periphery of a ceramic block having a square pillar shape, the honeycomb structure 7 has no peripheral cut face. Moreover, at positions corresponding to four corners of the square cross-section of the honeycomb structure 1 of the first embodiment, triangular pillar shaped honeycomb fired bodies 80 each having a triangular shape in its cross-section taken perpendicular to the longitudinal direction are placed. The honeycomb structure 7 of the present embodiment includes eight pieces of the triangular pillar shaped honeycomb fired bodies 80 and 24 pieces of square pillar shaped honeycomb fired bodies 50, that is, 32 pieces of honeycomb fired bodies in total.

The other structures are the same as those of the honeycomb structure of the first embodiment.

With reference to FIGS. 16A to 16D, out of the processes of the method for manufacturing a honeycomb structure of the sixth embodiment, the following description will discuss the processes different from those of the method for manufacturing a honeycomb structure of the first embodiment.

First, honeycomb fired bodies are manufactured, and the manufactured honeycomb fired bodies include eight pieces of triangular pillar-shaped honeycomb fired bodies 80. In order to manufacture the triangular pillar-shaped honeycomb fired bodies 80, a triangular shaped die of the extrusion molding machine may be used in the molding process.

Therefore, out of the honeycomb fired bodies to be combined in the combining process, some of the honeycomb fired bodies have a triangular cross-sectional shape, which is different from the cross-sectional shape (square shape) of the other honeycomb fired bodies.

Next, as shown in FIG. 16B, a honeycomb aggregated body 151 including eight pieces of honeycomb fired bodies is manufactured by using six pieces of honeycomb fired bodies 50 having a square pillar-shape and two pieces of honeycomb fired bodies 80 having a triangular pillar-shape. Here, the adhesive layer to be formed in this process corresponds to adhesive layer to be the other adhesive layer.

Next, by using the same manufacturing method for a honeycomb structure of the first embodiment, an adhesive paste layer 130 containing a foaming material is formed in a necessary range along the side faces of the honeycomb aggregated body 151.

Next, as shown in FIG. 16C, four pieces of honeycomb aggregated bodies 151 are arranged so that the faces having the adhesive paste layer containing a foaming material formed thereon are in contact with each other, and the periphery of the entire honeycomb aggregated bodies thus arranged is sandwiched by pressurizing and heating plates 600. Then, heating and pressurizing process is carried out on the opposite side faces to the side faces having the adhesive paste thereon of the honeycomb aggregated bodies.

As described above, an octagonal pillar-shaped ceramic block 307 including 32 pieces of the honeycomb fired bodies is manufactured by bonding the four pieces of honeycomb aggregated bodies 151 to one another.

In the present embodiment, it is not necessary to carry out the periphery cutting process. A coat layer forming process may be carried out on demand.

Moreover, the adhesive layer formed between the respective honeycomb aggregated bodies 151 is the one adhesive layer 30 bonding the honeycomb fired bodies to one another with a high adhesive strength.

The present embodiment can exert the effects (1) to (8), described in the first embodiment.

In the method for manufacturing a honeycomb structure of the present embodiment, out of honeycomb fired bodies to be combined with one another in the combining process, a part of the honeycomb fired bodies have a different cross-sectional shape from the cross-sectional shape of the other honeycomb fired bodies.

Use of the honeycomb fired bodies having the different cross-sectional shape from the cross-sectional shape of the other honeycomb fired bodies makes it easier to manufacture a honeycomb structure having a predetermined shape without carrying out the periphery cutting process.

(Seventh Embodiment)

The following description will discuss a seventh embodiment that is a still other embodiment of the present invention.

FIGS. 17A to 17D are explanatory views that schematically show one example of a method for manufacturing a honeycomb structure of the seventh embodiment. Moreover, FIG. 17D schematically shows one example of the honeycomb structure of the seventh embodiment. In a honeycomb structure 8 of the seventh embodiment, the entire adhesive layer that bonds 20 pieces of honeycomb fired bodies arranged in two columns and six rows and in six columns and two rows including four pieces of center-portion honeycomb fired bodies 60 is the one adhesive layer 30.

Except the above-mentioned structure, the honeycomb structure of the seventh embodiment is configured to be the same as the honeycomb structure of the sixth embodiment.

With reference to FIGS. 17A to 17D, out of the processes of the method for manufacturing a honeycomb structure of the seventh embodiment, the following description will discuss the processes different from those of the methods for manufacturing a honeycomb structure of the first embodiment and the sixth embodiment.

In the present embodiment, first, as shown in FIG. 17A, an adhesive paste containing a foaming material is applied to the a gap by 20 pieces of honeycomb fired bodies 50 arranged in two columns and six rows and in six columns and two rows including four pieces of center-portion honeycomb fired bodies 60 in a honeycomb structure to be completed so that an adhesive paste layer 130 is formed.

Successively, the opposite side faces to the side face having the adhesive paste placed thereon of the honeycomb fired bodies located outermost are heated and pressurized with the pieces of honeycomb fired bodies being sandwiched by pressurizing and heating plates 600 to carry out a center-portion-aggregating process.

Through the center-portion-aggregating process, a center-portion honeycomb aggregated body 162, which is a cross-shaped honeycomb aggregated body including the 20 pieces of honeycomb fired bodies combined with one another by interposing the one adhesive layer 30 having a high adhesive strength, is manufactured (see FIG. 17B).

Next, a periphery-aggregating process is carried out in which one center-portion honeycomb aggregated body 162 shown in FIG. 17B, four pieces of square pillar-shaped honeycomb fired bodies 50 and eight pieces of triangular pillar-shaped honeycomb fired bodies 80 shown in FIG. 17C are bonded to one another to manufacture a ceramic block 308 including 32 pieces of honeycomb fired bodies.

In the present embodiment, the periphery cutting process does not always need to be carried out. A coat layer forming process may be carried out on demand.

The present embodiment can exert the effects (1) to (5), (7) to (9) and (11) described in the first embodiment, the second embodiment, the fourth embodiment and the sixth embodiment.

Moreover, use of the honeycomb fired bodies having the different cross-sectional shape from the cross-sectional shape of the other honeycomb fired bodies makes it easier to manufacture a honeycomb structure having a predetermined shape without carrying out the periphery cutting process.

(Eighth Embodiment)

The following description will discuss the eighth embodiment that is a still other embodiment of the present invention.

Figure 18:
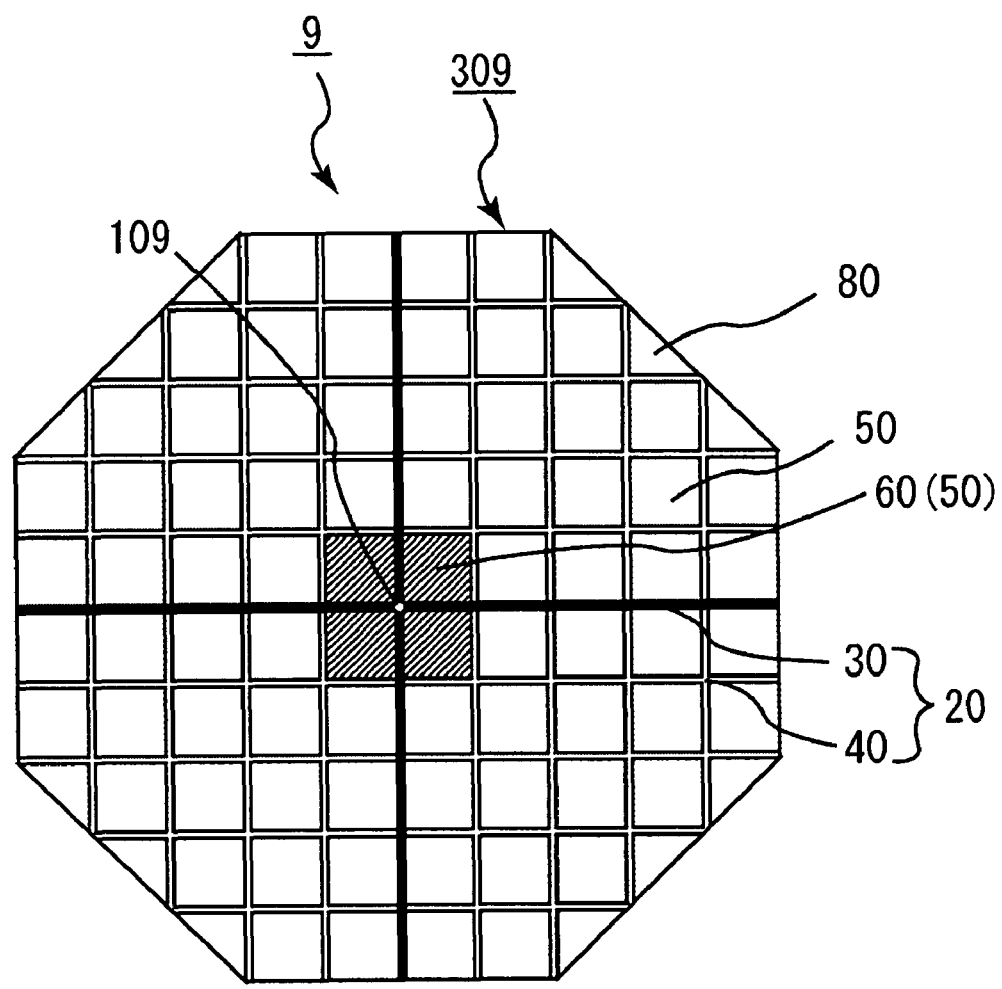
FIG. 18 is a cross-sectional view that schematically shows one example of the honeycomb structure of the eighth embodiment.

FIG. 18 is a cross-sectional view that schematically shows one example of the honeycomb structure of the eighth embodiment.

A honeycomb structure 9 of the eighth embodiment has the same shape as that of the honeycomb structure 7 of the sixth embodiment except that the number of honeycomb fired bodies is different.

The honeycomb structure 9 of the eighth embodiment has an octagonal cross-section formed by honeycomb fired bodies combined with one another in ten columns and ten rows, with each of four corners of the square shaped honeycomb structure being cut out in a triangular shape. Triangular pillar-shaped honeycomb fired bodies 80 are placed on respective upper right and upper left positions as well as on respective lower right and lower left positions, relative to the center of the cross-section.

Here, the honeycomb structure of the present embodiment includes 12 pieces of the triangular pillar-shaped honeycomb fired bodies 80 and 76 pieces of the square pillar-shaped honeycomb fired bodies 50, that is, 88 pieces of honeycomb fired bodies in total.

Like the honeycomb structure 7 of the sixth embodiment, the one adhesive layer 30 is formed in a cross shape so as to reach the upper end and the lower end as well as the right end and the left end of the cross-section.

The method for manufacturing a honeycomb structure of the eighth embodiment is the same as the method for manufacturing a honeycomb structure of the sixth embodiment, except that upon manufacturing a honeycomb aggregated body, the number of honeycomb fired bodies to be bonded is different. Therefore, the description thereof is omitted.

The present embodiment can exert the effects (1) to (8), described in the first embodiment and the sixth embodiment.

Moreover, use of the honeycomb fired bodies having the different cross-sectional shape from the cross-sectional shape of the other honeycomb fired bodies makes it easier to manufacture a honeycomb structure having a predetermined shape without carrying out the periphery cutting process.

(Ninth Embodiment)

The following description will discuss a ninth embodiment that is a still other embodiment of the present invention.

Figure 19:
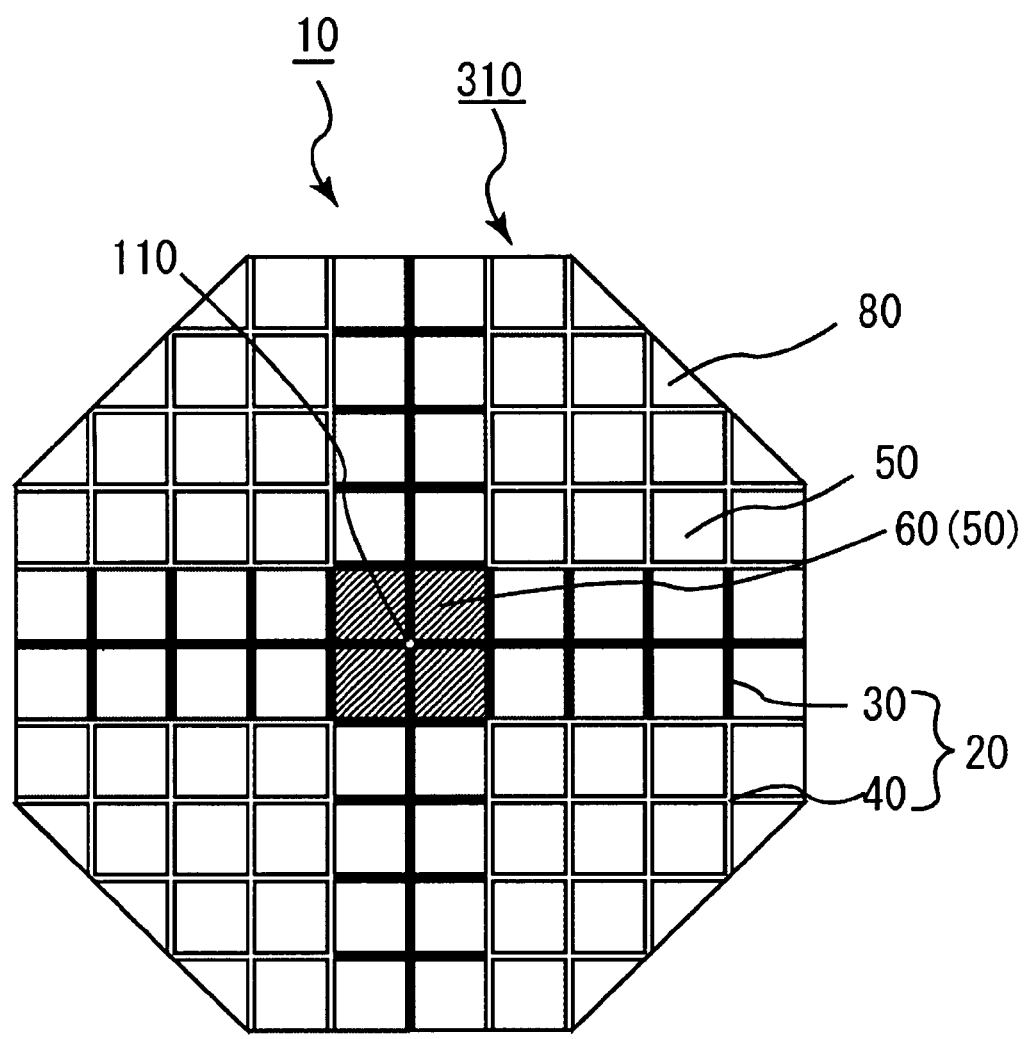
FIG. 19 is a cross-sectional view that schematically shows one example of the honeycomb structure of the ninth embodiment.

FIG. 19 is a cross-sectional view that schematically shows one example of the honeycomb structure of the ninth embodiment.

The honeycomb structure 10 of the ninth embodiment has the same shape as that of the honeycomb structure 9 of the eighth embodiment except that the one adhesive layer 30 is formed in a different range.

In a honeycomb structure 10 of the ninth embodiment, like the honeycomb structure 8 of the seventh embodiment, the entire adhesive layer that bonds 36 pieces of honeycomb fired bodies arranged in two columns and ten rows and in ten columns and two rows including four pieces of center-portion honeycomb fired bodies 60 is the one adhesive layer 30.

The method for manufacturing a honeycomb structure of the ninth embodiment is the same as the method for manufacturing a honeycomb structure of the seventh embodiment, except that upon manufacturing the honeycomb structure, the number of honeycomb fired bodies is different. Therefore, the description thereof is omitted.

The present embodiment can exert the effects (1) to (5), (7) to (9) and (11) described in the first embodiment, the second embodiment, the fourth embodiment and the sixth embodiment.

Moreover, use of the honeycomb fired bodies having the different cross-sectional shape from the cross-sectional shape of the other honeycomb fired bodies makes it easier to manufacture a honeycomb structure having a predetermined shape without carrying out the periphery cutting process.

(Tenth Embodiment)

The following description will discuss a tenth embodiment that is a still other embodiment of the present invention.

Figure 20:
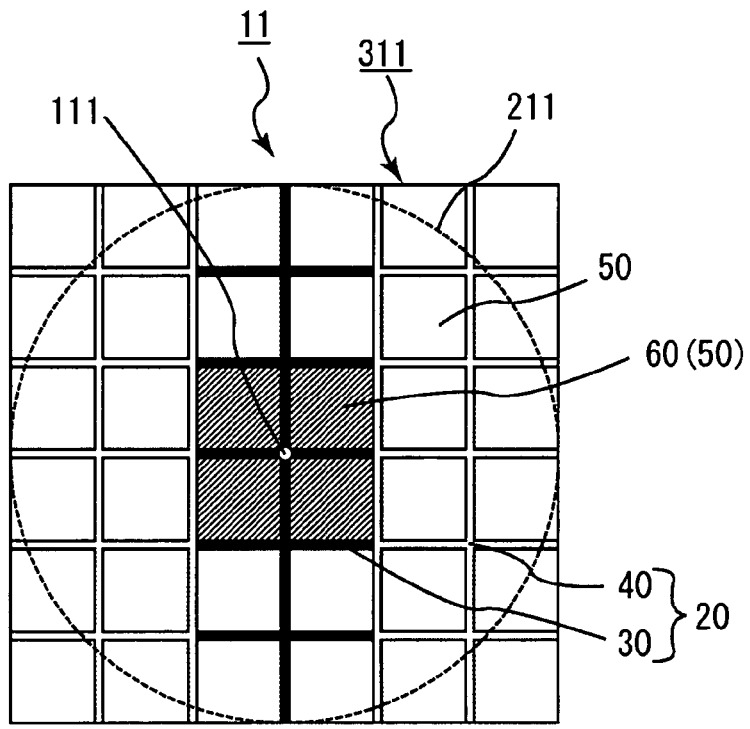
FIG. 20 is a cross-sectional view that schematically shows one example of the honeycomb structure of the tenth embodiment.

FIG. 20 is a cross-sectional view that schematically shows one example of the honeycomb structure of the tenth embodiment.

In a honeycomb structure 11 of the tenth embodiment, the entire adhesive layer that bonds 12 pieces of honeycomb fired bodies arranged in two columns and six rows including four pieces of center-portion honeycomb fired bodies 60 is the one adhesive layer 30. Except the above-mentioned structure, the honeycomb structure of the tenth embodiment is configured to be the same as the honeycomb structure of the second embodiment.

In the method for manufacturing a honeycomb structure of the tenth embodiment, 12 pieces of honeycomb fired bodies are bonded to one another with the one adhesive layer interposed therebetween by following the same processes as in the method for manufacturing a honeycomb structure of the second embodiment to manufacture a center-portion honeycomb aggregated body. Thereafter, by following the same processes as in the second embodiment or the third embodiment, a ceramic block 311 is formed by bonding the center-portion honeycomb fired body to other honeycomb fired bodies or periphery honeycomb aggregated bodies. Next, a periphery cutting process is carried out along a peripheral cut face 211, and another process is carried out on demand to manufacture the honeycomb structure 11.

The present embodiment can exert the effects (1) to (5) and (7) to (10) described in the first embodiment, the second embodiment and the third embodiment.

(Eleventh Embodiment)

The following description will discuss an eleventh embodiment that is a still other embodiment of the present invention.

Figure 21:
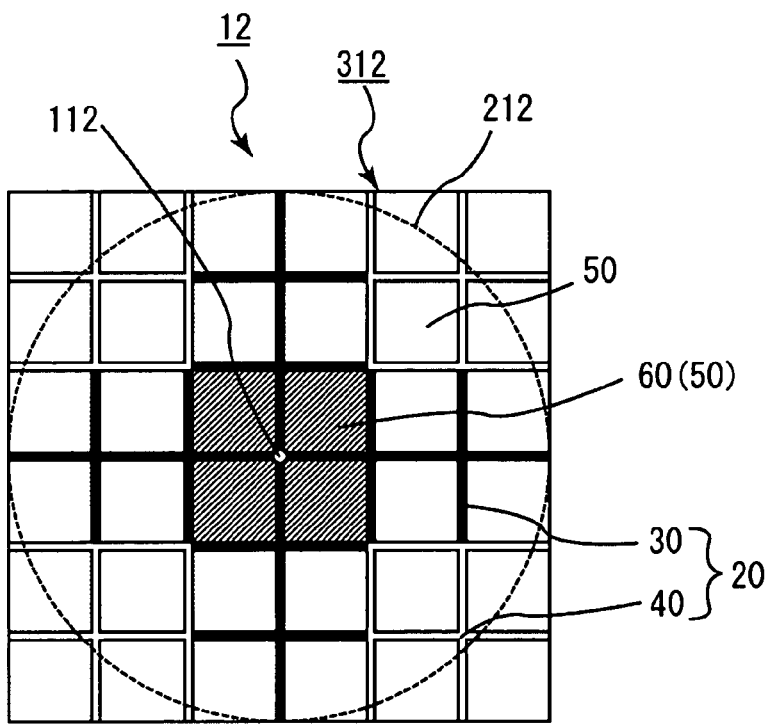
FIG. 21 is a cross-sectional view that schematically shows one example of the honeycomb structure of the eleventh embodiment.

FIG. 21 is a cross-sectional view that schematically shows one example of the honeycomb structure of the eleventh embodiment.

In a honeycomb structure 12 of the eleventh embodiment, the entire adhesive layer that bonds 20 pieces of honeycomb fired bodies arranged in two columns and six rows and in six columns and two rows including four pieces of center-portion honeycomb fired bodies 60 is the one adhesive layer 30. Except the above-mentioned structure, the honeycomb structure of the eleventh embodiment is configured to be the same as the honeycomb structure of the second embodiment.

In the method for manufacturing a honeycomb structure of the eleventh embodiment, 20 pieces of honeycomb fired bodies are bonded to one another with the one adhesive layer interposed therebetween by following the same processes as in the method for manufacturing a honeycomb structure of the seventh embodiment to manufacture a center-portion honeycomb aggregated body. Here, the shape of this center-portion honeycomb aggregated body is the same as that of the center-portion honeycomb aggregated body 162 shown in FIG. 17B.

Thereafter, by following the same processes as in the method for manufacturing a honeycomb structure of the second embodiment or the third embodiment, a ceramic block 312 is formed by bonding the center-portion honeycomb fired bodies to other honeycomb fired bodies or a periphery honeycomb aggregated body. Next, a periphery cutting process is carried out along a peripheral cut face 212, and another process is carried out on demand to manufacture the honeycomb structure 12.

The present embodiment can exert the effects (1) to (5), (7) to (9) and (11) described in the first embodiment, the second embodiment, the third embodiment and the fourth embodiment.

(Twelfth Embodiment)

The following description will discuss a twelfth embodiment that is a still other embodiment of the present invention.

Figure 22D:
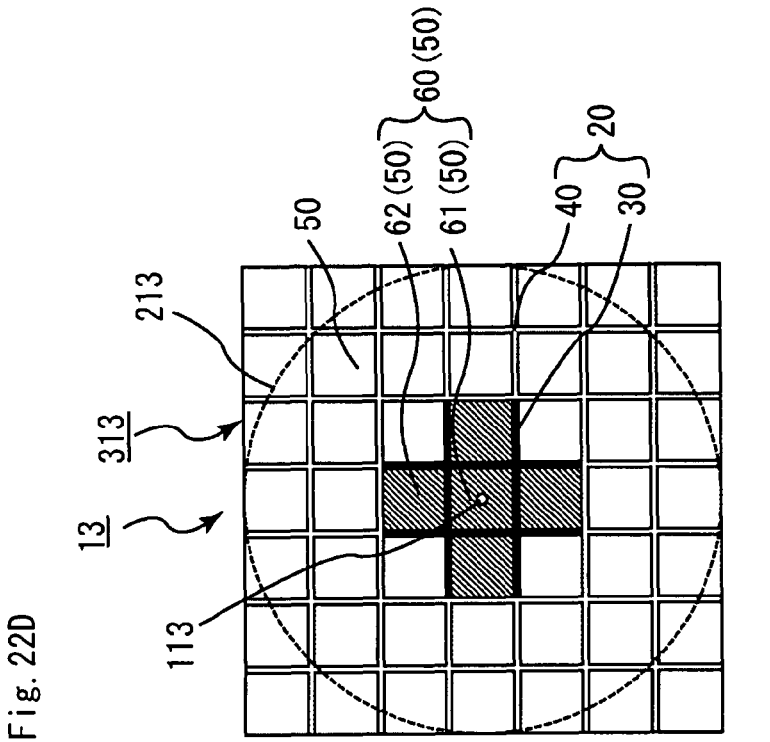
FIGS. 22A to 22D are explanatory views that schematically show one example of the method for manufacturing a honeycomb structure of the twelfth embodiment.

FIGS. 22A to 22D are explanatory views that schematically show one example of the method for manufacturing a honeycomb structure of the twelfth embodiment. Moreover, FIG. 22D schematically shows one example of the honeycomb structure of the twelfth embodiment.

In the honeycomb structure 13 of the twelfth embodiment shown in FIG. 22D, 49 pieces of honeycomb fired bodies 50 are bonded to one another with the adhesive layer 20 interposed therebetween in seven columns and seven rows. That is, the honeycomb fired bodies are combined with one another in an odd number of columns and an odd number of rows. Therefore, the center-portion honeycomb fired bodies 60 are defined to be the total five pieces of honeycomb fired bodies indicated by slanting lines.

Here, the one adhesive layer 30 is formed on the respective side faces of these five pieces of center-portion honeycomb fired bodies 60, except for those side faces located on the outermost positions. Moreover, the one adhesive layer is located in an area having a distance of about 50 mm from the center of the ceramic block 313.

Except the above-mentioned structure, the honeycomb structure of the twelfth embodiment is configured to be the same as the honeycomb structure of the first embodiment.

The method for manufacturing a honeycomb structure of the twelfth embodiment is the same as the method for manufacturing a honeycomb structure of the second embodiment except that the number of honeycomb fired bodies to be bonded upon manufacturing a center-portion honeycomb aggregated body is different and that the number of honeycomb fired bodies to form the honeycomb structure to be manufactured is different.

Figure 22B:
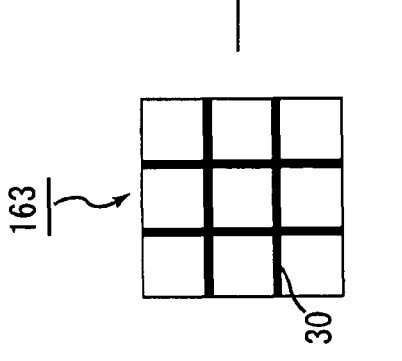
Figure 22C:
Figure 22A:
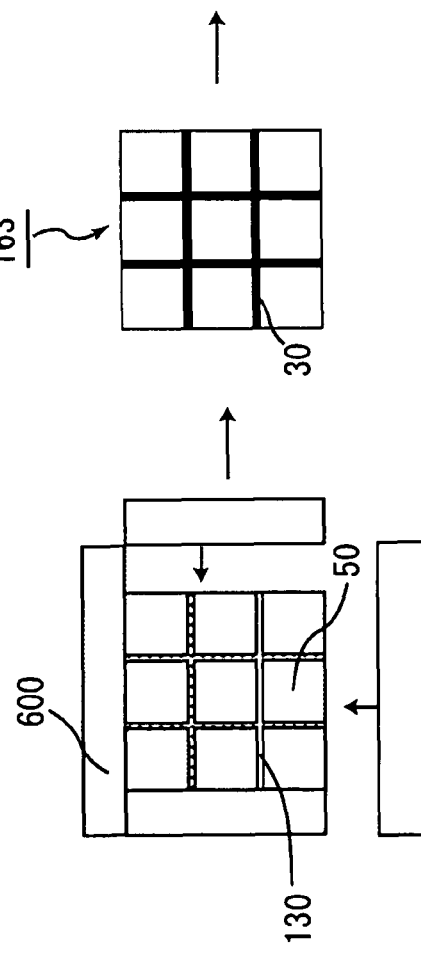

That is, as shown in FIG. 22A, the adhesive paste containing a foaming material is applied to a gap formed by nine pieces of honeycomb fired bodies 50 including five pieces of honeycomb fired bodies 50 to be the center-portion honeycomb fired bodies in a honeycomb structure to be completed, so as to form the adhesive paste layers 130.

Moreover, heating and pressurizing process is carried out on the opposite side faces to the side faces having the adhesive paste thereon to the side faces of the honeycomb fired bodies, with these nine pieces of honeycomb fired bodies 50 being sandwiched by pressurizing and heating plates 600, to carry out a center-portion-aggregating process for manufacturing a center-portion honeycomb aggregated body 163 shown in FIG. 22B.

Next, a periphery-aggregating process is carried out by bonding 40 pieces of honeycomb fired bodies 50, shown in FIG. 22C, to this center-portion honeycomb aggregated body 163 to manufacture a ceramic block 313 including 49 pieces of honeycomb fired bodies. Thereafter, a periphery cutting process is carried out along a peripheral cut face 213, and another process is carried out on demand to manufacture a honeycomb structure 13.

The present embodiment can exert the effects (1) to (5), (7) to (9) and (11) described in the first embodiment, the second embodiment and the fourth embodiment.

(Thirteenth Embodiment)

The following description will discuss a thirteenth embodiment that is a still other embodiment of the present invention.

FIGS. 23A to 23D are explanatory views that schematically show one example of the method for manufacturing a honeycomb structure of the thirteenth embodiment. Moreover, FIG. 23D schematically shows one example of the honeycomb structure of the thirteenth embodiment.

The honeycomb structure 14 of the thirteenth embodiment shown in FIG. 23D has the same shape as that of the honeycomb structure 13 of the twelfth embodiment except that the one adhesive layer is formed in a different range.

In the honeycomb structure 14 of the thirteenth embodiment, the entire adhesive layer that bonds 33 pieces of honeycomb fired bodies arranged in three columns and seven rows and in seven columns and three rows including five pieces of center-portion honeycomb fired bodies 60 is the one adhesive layer 30.

In the method for manufacturing a honeycomb structure of the thirteenth embodiment, a center-portion honeycomb aggregated body is manufactured by following the same processes as in the method for manufacturing a honeycomb structure of the seventh embodiment, except that the number of honeycomb fired bodies to be bonded is different.

That is, as shown in FIG. 23A, an adhesive paste containing a foaming material is applied to a gap formed by 33 pieces of honeycomb fired bodies 50 including five pieces of honeycomb fired bodies 50 to form center-portion honeycomb fired bodies in the honeycomb structure to be completed, so as to form adhesive paste layers 130.

Moreover, heating and pressurizing process is carried out on the opposite side faces to the side faces having the adhesive paste thereon of the honeycomb fired bodies, with these 33 pieces of honeycomb fired bodies 50 being sandwiched by pressurizing and heating plates 600, so that a center-portion honeycomb aggregated body 164 shown in FIG. 23B is manufactured.

Next, a periphery-aggregating process is carried out by bonding 16 pieces of honeycomb fired bodies 50, shown in FIG. 23C, to this center-portion honeycomb aggregated body 164 to manufacture a ceramic block 314 including 49 pieces of honeycomb fired bodies. Thereafter, a periphery cutting process is carried out along a peripheral cutting face 214, and another process is carried out on demand to manufacture a honeycomb structure 14.

The present embodiment can exert the effects (1) to (5), (7) to (9) and (11) described in the first embodiment, the second embodiment and the fourth embodiment.

(Fourteenth Embodiment)

The following description will discuss a fourteenth embodiment that is a still other embodiment of the present invention.

Figures 24A, 24B, 24C, 24D:
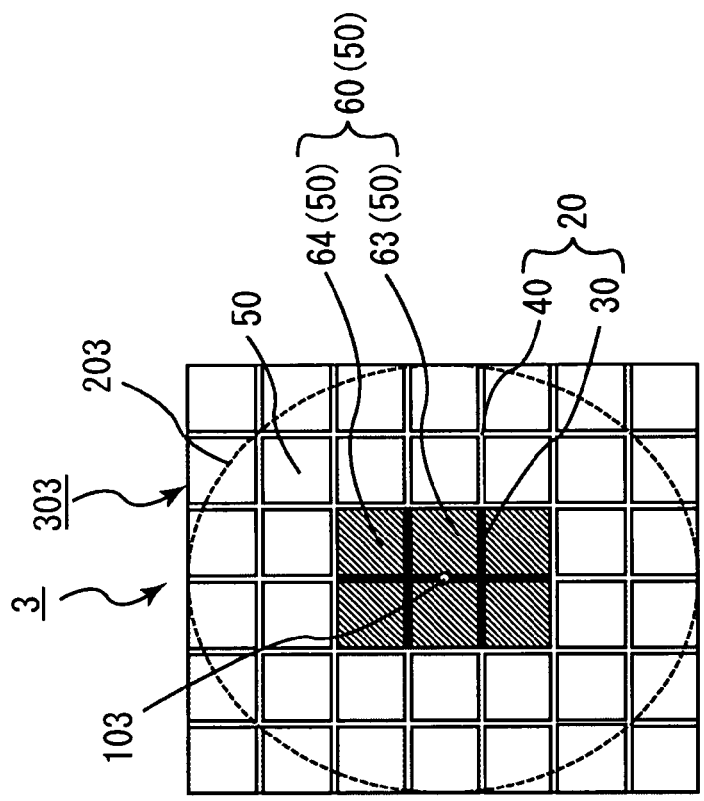
FIGS. 24A to 24D are explanatory views that schematically show one example of the method for manufacturing a honeycomb structure of the fourteenth embodiment.

FIGS. 24A to 24D are explanatory views that schematically show one example of the method for manufacturing a honeycomb structure of the fourteenth embodiment. Moreover, FIG. 24D schematically shows one example of the honeycomb structure of the fourteenth embodiment.

In the honeycomb structure 3 in the fourteenth embodiment shown in FIG. 24D, 42 pieces of honeycomb fired bodies 50 are bonded to one another with adhesive layers 20 interposed therebetween in seven columns and six rows. That is, the honeycomb fired bodies are combined with one another an odd number of columns and an even number of rows. Therefore, the center-portion honeycomb fired bodies 60 correspond to the total six pieces of honeycomb fired bodies indicated by slanting lines.

Here, the one adhesive layer 30 is formed in a range for bonding these six pieces of center-portion honeycomb fired bodies 60 to one another.

Except the above-mentioned structure, the honeycomb structure of the fourteenth embodiment is configured to be the same as the honeycomb structure of the first embodiment.

The method for manufacturing a honeycomb structure of the fourteenth embodiment is the same as the method for manufacturing a honeycomb structure of the second embodiment except that the number of honeycomb fired bodies to be bonded upon manufacturing a center-portion honeycomb aggregated body is different and that the number of honeycomb fired bodies to form the honeycomb structure to be manufactured is different.

That is, as shown in FIG. 24A, an adhesive paste containing a foaming material is applied to a gap formed by six pieces of honeycomb fired bodies 50 to be the center-portion honeycomb fired bodies in a honeycomb structure to be completed, so as to form the adhesive paste layer 130. Then, heating and pressurizing process is carried out on the opposite side faces to the side faces having the adhesive paste thereon of the honeycomb fired bodies, with these six pieces of honeycomb fired bodies 50 being sandwiched by pressurizing and heating plates 600, to carry out a center-portion-aggregating process for manufacturing a center-portion honeycomb aggregated body 165 shown in FIG. 24B.

Next, a periphery-aggregating process is carried out by bonding 36 pieces of honeycomb fired bodies 50, shown in FIG. 24C, to this center-portion honeycomb aggregated body 165 to manufacture a ceramic block 303 including 42 pieces of honeycomb fired bodies. Thereafter, a periphery cutting process is carried out along a peripheral cut face 203, and another process is carried out on demand to manufacture a honeycomb structure 3.

The present embodiment can exert the effects (1) to (5) and (7) to (9) described in the first embodiment and the second embodiment.

(Other Embodiments)

The method for forming a center-portion honeycomb aggregated body (method for forming the one adhesive layer) is not particularly limited as long as it permits formation of an adhesive layer having a high adhesive strength, and may be carries out by using only the method for using an adhesive paste containing a foaming material as described in the first embodiment, or may include only the method for carrying out heating and pressurizing process.

Moreover, upon bonding the center-portion honeycomb aggregated body to another honeycomb fired body in each embodiment, as described in the third embodiment, a periphery honeycomb aggregated body may be manufactured and the center-portion honeycomb aggregated body may be bonded to the periphery honeycomb aggregated body. Alternatively, upon bonding the center-portion honeycomb aggregated body to another honeycomb fired body in each embodiment, no periphery aggregated body may be manufactured as described in the second embodiment.

An inorganic binder, inorganic fibers and inorganic particles, and a foaming material each contained in the adhesive paste are not particularly limited. Examples of the inorganic binder contained in the adhesive paste include silica sol, alumina sol, and the like. These may be used alone, or in a combination of two or more. Out of the inorganic binders, silica sol is preferably used.

Examples of the inorganic fibers contained in the adhesive paste include ceramic fibers, such as silica-alumina, mullite, alumina and silica. Each of these may be used alone or two or more kinds of these may be used in combination. Out of the inorganic fibers, alumina fibers are preferably used.

Examples of the inorganic particles contained in the adhesive paste include carbides, nitrides, and the like, more specifically, inorganic powder made from silicon carbide, silicon nitride, boron nitride and the like. Each of these may be used alone, or two or more kinds of these may be used in combination. Out of the above-mentioned inorganic particles, silicon carbide is preferably used due to its superior thermal conductivity.

Examples of microcapsules out of the foaming materials contained in the adhesive pastes include thermally expandable particles obtained by forming a shell wall made from a copolymer material such as vinylidene chloride, acrylonitrile, melamine, and phenol by an in-site polymerizing method or the like, and capsulating a low-boiling point material (hydrocarbons such as butane and pentane) or a gas (carbon dioxide gas and the like). Here, examples of the foaming resin include acrylonitrile, polypropylene, polystyrene, polyethylene terephthalate, polycarbonate and the like.

Examples of the inorganic foaming material include pearlite particles, shirasu balloons and the like.

Moreover, examples of the expansive agent include ammonium chloride, ammonium hydrogencarbonate, sodium hydrogencarbonate, ammonium carbonate, amyl acetate, butyl acetate, ammonium aluminum sulfate, potassium aluminum sulfate, potassium hydrogen tartrate, diazodiamino benzene and the like.

Out of these foaming materials, microcapsules and foaming resins are desirable.

Use of the microcapsules or the foaming resin allows the resin component to disappear by drying, firing, burning or the like. In contrast, the foaming material (for example, the above-mentioned expansive agent) that depends on a chemical reaction occasionally causes the curing reaction when added, and may fail to function as a foaming material. The inorganic foaming material may cause remaining inorganic component in voids (air bubbles) even after the firing.

Any of these foaming materials is desirably added in amount of at least about 0.5% and at most about 10% by weight to the adhesive paste relative to its entire weight.

The amount of about 0.5% or more by weight tends to sufficiently exert the effects of the foaming material and formation of large air bubbles tends not to be occurred. As a result, the adhesive strength may not be degraded. In contrast, the amount of about 10% or less by weight tends not to cause too many small air bubbles and degradation of the adhesive strength tends not to be occurred.

With respect to the shape of the honeycomb structure according to an embodiment of the present invention, it is not particularly limited to the round pillar-shape, and the honeycomb structure may have any desired pillar shape of a pillar including a round pillar, an oval pillar, a polygonal pillar and the like.

The porosity of the honeycomb fired body is not particularly limited, and desirably at least about 35% and at most about 60%.

Upon use of the honeycomb structure according to an embodiment of the present invention as a filter, the porosity of about 35% or more tends not to cause clogging in the honeycomb structure. In contrast, the porosity of about 60% or less tends not to cause a reduction in the strength of the honeycomb fired body with the result that the honeycomb structure tends not to be easily broken.

The average pore diameter of the honeycomb fired body is desirably at least about 5 µm and at most about 30 µm.

Upon use of the honeycomb structure as a filter, the average pore diameter of about 5 µm or more tends not to cause clogging due to particulates. In contrast, the average pore diameter of about 30 µm or less tends not to cause particulates to easily pass through the pores. As a result, the honeycomb fired body tends to capture the particulates and it may become easier to function as a filter.

Here, the porosity and the average pore diameter can be measured through conventionally known methods such as a mercury porosimetry, Archimedes method, and a measuring method using a scanning electronic microscope (SEM).

The cell density in the cross-section perpendicular to the longitudinal direction of the honeycomb fired body is not particularly limited. However, a desirable lower limit thereof is about 31.0 pcs/cm2 (about 200 pcs/in2) and a desirable upper limit is about 93 pcs/cm2 (about 600 pcs/in2). A more desirable lower limit is about 38.8 pcs/cm2 (about 250 pcs/in2) and a more desirable upper limit is about 77.5 pcs/cm2 (about 500 pcs/in2).

Further, the thickness of the cell walls of the honeycomb fired body is not particularly limited, and desirably at least about 0.1 mm and at most about 0.4 mm.

The main component of constituent materials of the honeycomb fired body is not limited to silicon carbide.

Examples of other ceramic materials may include ceramic powder, for example, nitride ceramics such as aluminum nitride, silicon nitride, boron nitride and titanium nitride; carbide ceramics such as zirconium carbide, titanium carbide, tantalum carbide and tungsten carbide; oxide ceramics such as alumina, zirconia, cordierite, mullite, and aluminum titanate; and the like.

Out of these components, non-oxide ceramics are preferable, and silicon carbide is more preferable because this is excellent in thermal resistance properties, mechanical strength, thermal conductivity and the like. Moreover, examples of the constituent material of the honeycomb fired body also include silicon-containing ceramics, in which metallic silicon is blended with the above-described ceramics, as well as a ceramic material such as ceramic bound by silicon or silicate compounds. And out of these, those ceramics (silicon-containing silicon carbide) in which metallic silicon is blended with silicon carbide are desirably used.

Especially, a silicon-containing silicon carbide ceramic containing about 60% by weight or more of silicon carbide is desirable.

The particle diameter of the ceramic powder is not particularly limited, and the ceramic powder that tends not to cause the case where the size of the honeycomb fired body manufactured by the following firing treatment becomes smaller than that of the honeycomb molded body after degreased is preferable.

The organic binder in the wet mixture is not particularly limited, and examples thereof include methylcellulose, carboxy methylcellulose, hydroxy ethylcellulose, polyethylene glycol, and the like. Methylcellulose is desirable out of these. A blending amount of the organic binder is desirably at least about 1 parts by weight and at most about 10 parts by weight with respect to 100 parts by weight of ceramic powder.

The plasticizer in the wet mixture is not particularly limited, and examples thereof include glycerin and the like.

The lubricant is not particularly limited, and examples thereof include polyoxyalkylene-based compounds such as polyoxyethylene alkyl ether and polyoxypropylene alkyl ether, and the like.

Specific examples of the lubricant include polyoxyethylene monobutyl ether, polyoxypropylene monobutyl ether, and the like.

Moreover, the plasticizer and the lubricant may not be contained in the wet mixture powders in some cases.

In addition, a dispersant solution may be used upon preparing a wet mixture, and examples of the dispersant solution include water, an organic solvent such as benzene, alcohol such as methanol, and the like.

Furthermore, a molding auxiliary may be added to the wet mixture.

The molding auxiliary is not particularly limited, and examples thereof include ethylene glycol, dextrin, fatty acid, fatty acid soap, polyalcohol and the like.

Furthermore, a pore-forming agent such as balloons that are fine hollow spheres including oxide-based ceramics, spherical acrylic particles, graphite and the like may be added to the wet mixture, if necessary.

The balloon is not particularly limited, and examples thereof include alumina balloon, glass micro balloon, shirasu balloon, fly ash balloon (FA balloon), mullite balloon and the like. Alumina balloon is desirable out of these.

Upon use of the honeycomb structure as a filter, the plug material paste for sealing the cells is not particularly limited, a plug to be manufactured through the subsequent processes desirably has a porosity of at least about 30% and at most about 75%, and for example, it is possible to use a plug material paste having the same composition as that of the wet mixture of the raw material.

The catalyst to convert or purify exhaust gases may be supported on the honeycomb structure, desirable examples of the catalyst to be supported include noble metals such as platinum, palladium and rhodium, and platinum is more desirable. Moreover, an alkali metal such as potassium and sodium, and an alkali earth metal such as barium can be used as other catalysts. These catalysts may be used alone, or two or more kinds of these may be used in combination.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A honeycomb structure comprising:
   a ceramic block having a longitudinal direction and comprising:
     a plurality of honeycomb fired bodies each having a plurality of cell walls extending along the longitudinal direction to define a plurality of cells, the plurality of honeycomb fired bodies including center-portion honeycomb fired bodies located at a center portion in a cross-section perpendicular to the longitudinal direction and peripheral honeycomb fired bodies surrounding the center-portion honeycomb fired bodies;
     a first adhesive layer interposed between the center-portion honeycomb fired bodies to connect the center-portion honeycomb fired bodies; and
     a second adhesive layer interposed between each of the center-portion honeycomb fired bodies and each of the peripheral honeycomb fired bodies and between the peripheral honeycomb fired bodies, an adhesive strength α between said center-portion honeycomb fired bodies bonded via the first adhesive layer being higher than an adhesive strength β between honeycomb fired bodies bonded via the second adhesive layer.

2. The honeycomb structure according to claim 1, wherein the center-portion honeycomb fired bodies comprise
an innermost honeycomb fired body located at a center of the ceramic block in the cross-section perpendicular to the longitudinal direction, and
honeycomb fired bodies adjacent to said innermost honeycomb fired body.

3. The honeycomb structure according to claim 1, wherein the first adhesive layer is located at a center of the ceramic block in the cross-section perpendicular to the longitudinal direction, and said center-portion honeycomb fired bodies include four honeycomb fired bodies most closely located to the center.

4. The honeycomb structure according to claim 1, wherein the first adhesive layer is located at a center of the ceramic block in the cross-section perpendicular to the longitudinal direction, and said center-portion honeycomb fired bodies include two honeycomb fired bodies most closely located to the center and four honeycomb fired bodies more closely located to the center out of honeycomb fired bodies adjacent to the two honeycomb fired bodies most closely located to the center.

5. The honeycomb structure according to claim 1, wherein said first adhesive layer is located in an area within a distance of about 50 mm from a center of the ceramic block in the cross-section perpendicular to the longitudinal direction.

6. The honeycomb structure according to claim 1, wherein a shape of said first adhesive layer in the cross-section includes a cross shape.

7. The honeycomb structure according to claim 1, wherein the adhesive strength α measured with a three-point bending test is at least about 0.8 MPa and at most about 1.6 MPa, and the adhesive strength β measured with the three-point bending test is at least about 0.4 MPa and at most about 1.2 MPa.

8. The honeycomb structure according to claim 7, wherein the adhesive strength α is at least about 1.1 times and at most about 4.0 times higher than the adhesive strength β.

9. The honeycomb structure according to claim 1, wherein the cross-section perpendicular to the longitudinal direction has a major axis of about 200 mm or more.

10. The honeycomb structure according to claim 1, wherein 30 pieces or more of said honeycomb fired bodies are combined with one another.

11. The honeycomb structure according to claim 1, wherein said first and second adhesive layers comprise inorganic fibers and an inorganic binder; inorganic particles and an inorganic binder; or inorganic fibers, inorganic particles and an inorganic binder.

12. The honeycomb structure according to claim 11, wherein said first and second adhesive layers contain inorganic fibers and an inorganic binder, or inorganic particles and an inorganic binder, and the content of the inorganic fibers or the inorganic particles is at least about 70% by weight and at most about 95% by weight relative to at least about 5% by weight and at most about 30% by weight of the inorganic binder as solids content.

13. The honeycomb structure according to claim 11, wherein
said first and second adhesive layers contain inorganic fibers, inorganic particles and an inorganic binder, and
the content of the inorganic particles is at least about 35% by weight and at most about 65% by weight and the content of the inorganic fibers is at least about 30% by weight and at most about 60% by weight relative to at least about 5% by weight and at most about 30% by weight of the inorganic binder as solids content.

14. The honeycomb structure according to claim 1, wherein said first adhesive layer has small air bubbles formed by expansion of a foaming material.

15. The honeycomb structure according to claim 1, wherein a thickness of said first adhesive layer or the second adhesive layer is at least about 0.5 mm and at most about 2.0 mm.

16. The honeycomb structure according to claim 1, wherein said first adhesive layer or the second adhesive layer is formed by drying and solidifying an adhesive paste layer.

* * * * *